(12) United States Patent
Holmberg et al.

(10) Patent No.: US 11,592,636 B2
(45) Date of Patent: *Feb. 28, 2023

(54) WALL BOX ADAPTED TO BE MOUNTED AT A MID-SPAN ACCESS LOCATION OF A TELECOMMUNICATIONS CABLE

(71) Applicant: CommScope Technologies LLC, Hickory, NC (US)

(72) Inventors: Matthew Holmberg, Le Center, MN (US); James J. Solheid, Minneapolis, MN (US); Erik J. Gronvall, Bloomington, MN (US); Paula Lockhart, New Prague, MN (US); Thomas Marcouiller, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/344,232

(22) Filed: Jun. 10, 2021

(65) Prior Publication Data

US 2022/0011530 A1 Jan. 13, 2022

Related U.S. Application Data

(63) Continuation of application No. 16/573,711, filed on Sep. 17, 2019, now Pat. No. 11,036,018, which is a
(Continued)

(51) Int. Cl.
*B65D 88/40* (2006.01)
*G02B 6/44* (2006.01)
(Continued)

(52) U.S. Cl.
CPC .......... *G02B 6/445* (2013.01); *G02B 6/3897* (2013.01); *G02B 6/4441* (2013.01);
(Continued)

(58) Field of Classification Search
CPC ..... B65D 11/10; B65D 11/105; B65D 11/188; G02B 6/445; G02B 6/4441; G02B 6/4455; G02B 6/4454; G02B 6/4457
(Continued)

(56) References Cited

U.S. PATENT DOCUMENTS 4,805,979 A 2/1989 Bossard et al.
5,080,459 A 1/1992 Wettengel et al.
(Continued)

FOREIGN PATENT DOCUMENTS

DE 38 25 756 C1 9/1989
EP 0 637 767 A2 2/1995
(Continued)

*Primary Examiner* — King M Chu
(74) *Attorney, Agent, or Firm* — Merchant & Gould P.C.

(57) ABSTRACT

A wall box includes an enclosure having a base and a cover connected to the base. The base and the cover enclose an interior region. The wall box further includes a plurality of fiber optic adapters mounted to the enclosure. The fiber optic adapters include an inner port positioned inside the interior region and an outer port positioned at an outer surface of the enclosure. A tray stack is mounted within the interior region. The tray stack includes a tray mount pivotally connected to the enclosure. The tray mount includes a top surface and an oppositely disposed bottom surface. A first splice tray mounting area is disposed on the top surface and a second splice tray mounting area is disposed on the bottom surface. A plurality of trays is disposed in the first splice tray mounting area. A tray is disposed in the second splice tray mounting area.

14 Claims, 88 Drawing Sheets

Related U.S. Application Data continuation of application No. 15/414,094, filed on Jan. 24, 2017, now Pat. No. 10,422,970, which is a continuation of application No. 14/481,550, filed on Sep. 9, 2014, now Pat. No. 9,557,504, which is a continuation of application No. 13/367,100, filed on Feb. 6, 2012, now Pat. No. 8,837,894, which is a continuation of application No. 12/350,337, filed on Jan. 8, 2009, now Pat. No. 8,111,966.

(60) Provisional application No. 61/077,350, filed on Jul. 1, 2008, provisional application No. 61/046,656, filed on Apr. 21, 2008, provisional application No. 61/039,049, filed on Mar. 24, 2008, provisional application No. 61/029,214, filed on Feb. 15, 2008, provisional application No. 61/020,100, filed on Jan. 9, 2008.

(51) Int. Cl.
*G02B 6/38* (2006.01)
*H02G 3/08* (2006.01)

(52) U.S. Cl.
CPC ......... *G02B 6/4454* (2013.01); *G02B 6/4455* (2013.01); *G02B 6/4457* (2013.01); *H02G 3/081* (2013.01); *H02G 3/083* (2013.01)

(58) Field of Classification Search
USPC ....................................................... 220/4.02
See application file for complete search history.

(56) References Cited

U.S. PATENT DOCUMENTS

| | | |
|---|---|---|
| 5,133,039 A | 7/1992 | Dixit |
| 5,274,731 A * | 12/1993 | White ................. G02B 6/4454 385/139 |
| 5,313,546 A | 5/1994 | Toffetti |
| 5,479,533 A | 12/1995 | Tanaka |
| 5,495,549 A | 2/1996 | Schneider et al. |
| 5,631,993 A | 5/1997 | Cloud et al. |
| 5,652,820 A | 7/1997 | Glaser et al. |
| 5,668,911 A | 9/1997 | Debortoli |
| 5,692,299 A | 12/1997 | Daems et al. |
| 5,754,723 A | 5/1998 | Fremgen |
| 5,754,724 A | 5/1998 | Peterson et al. |
| 5,778,122 A | 7/1998 | Giebel et al. |
| 5,787,219 A | 7/1998 | Mueller et al. |
| 5,790,739 A | 8/1998 | Strause |
| 5,790,740 A | 8/1998 | Cloud et al. |
| 5,790,741 A | 8/1998 | Vincent et al. |
| 5,825,964 A | 10/1998 | Goetter et al. |
| 5,862,290 A | 1/1999 | Burek et al. |
| 5,883,999 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,982,870 A | 11/1999 | Pershan et al. |
| 5,982,972 A | 11/1999 | Tucker et al. |
| 6,152,767 A | 11/2000 | Roosen et al. |
| 6,175,079 B1 | 1/2001 | Johnston et al. |
| 6,226,434 B1 | 5/2001 | Koshiyama et al. |
| 6,249,632 B1 | 6/2001 | Wittmeier et al. |
| 6,275,639 B1 | 8/2001 | Bolt et al. |
| 6,275,640 B1 | 8/2001 | Hunsinger et al. |
| 6,385,381 B1 | 5/2002 | Janus et al. |
| 6,411,767 B1 | 6/2002 | Burros et al. |
| 6,483,977 B2 | 11/2002 | Battey et al. |
| 6,507,691 B1 | 1/2003 | Hunsinger et al. |
| 6,539,160 B2 | 3/2003 | Battey et al. |
| 6,542,688 B1 | 4/2003 | Battey et al. |
| 6,621,975 B2 | 9/2003 | Laporte et al. |
| 6,661,961 B1 | 12/2003 | Allen et al. |
| 6,721,484 B1 | 4/2004 | Blankenship et al. |
| 6,766,094 B2 | 7/2004 | Smith et al. |
| 6,788,786 B1 | 9/2004 | Kessler et al. |
| 6,797,878 B1 | 9/2004 | Radelet |
| 6,798,967 B2 | 9/2004 | Battey et al. |
| 6,856,748 B1 | 2/2005 | Elkins, II et al. |
| 6,926,449 B1 | 8/2005 | Keenum et al. |
| 6,963,689 B2 | 11/2005 | Battey et al. |
| 7,220,144 B1 | 5/2007 | Elliot et al. |
| 7,239,789 B2 | 7/2007 | Grubish et al. |
| 7,330,546 B2 | 2/2008 | Kessler et al. |
| 7,359,611 B1 | 4/2008 | Kaplan |
| 7,589,277 B2 | 9/2009 | Kessler et al. |
| 7,751,675 B2 | 7/2010 | Holmberg et al. |
| 8,111,966 B2 | 2/2012 | Holmberg et al. |
| 8,471,145 B2 | 6/2013 | Suzuki |
| 8,695,823 B2 | 4/2014 | Pincek |
| 8,837,894 B2 | 9/2014 | Holmberg et al. |
| 9,557,504 B2 | 1/2017 | Holmberg et al. |
| 10,422,970 B2 | 9/2019 | Holmberg et al. |
| 10,444,456 B2 * | 10/2019 | Cooke ................. G02B 6/4452 |
| 2003/0103750 A1 | 6/2003 | Laporte et al. |
| 2004/0001686 A1 | 1/2004 | Smith et al. |
| 2005/0175307 A1 | 8/2005 | Battey et al. |
| 2005/0271344 A1 | 12/2005 | Grubish et al. |
| 2006/0083475 A1 | 4/2006 | Grubish et al. |
| 2008/0279521 A1 | 11/2008 | Kowalczyk et al. |

FOREIGN PATENT DOCUMENTS

| | | |
|---|---|---|
| EP | 0 797 114 A2 | 9/1997 |
| EP | 1 203 974 A2 | 5/2002 |
| EP | 1 832 907 A1 | 9/2007 |
| EP | 1 870 750 A2 | 12/2007 |
| GB | 2 367 379 A | 4/2002 |
| WO | WO 98/08125 | 2/1998 |

* cited by examiner

FIG. 50
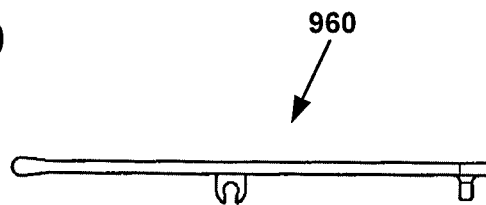
FIG. 51     FIG. 52
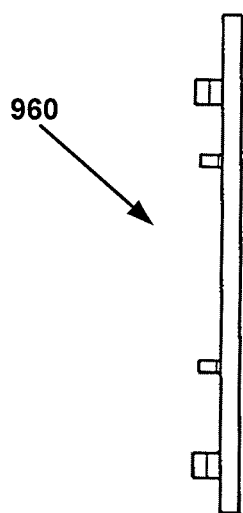 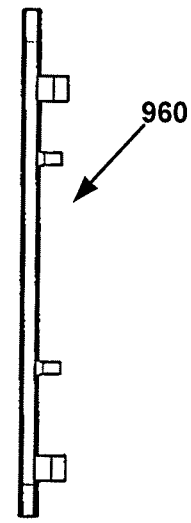
FIG. 53
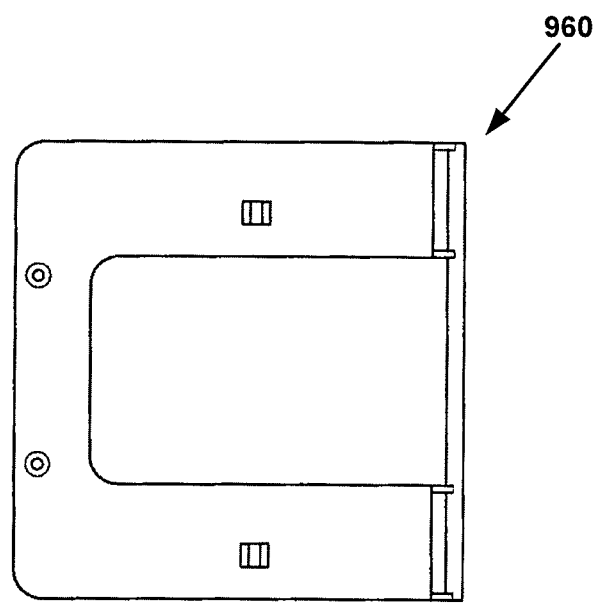

FIG. 59
FIG. 60
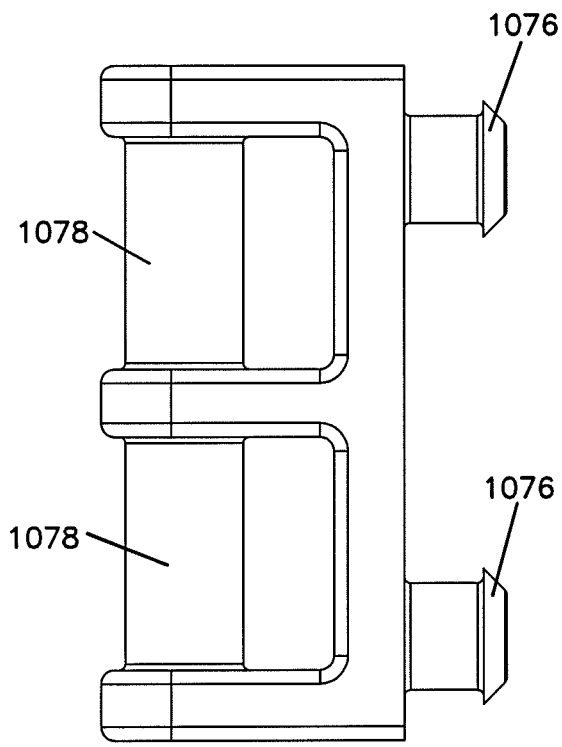
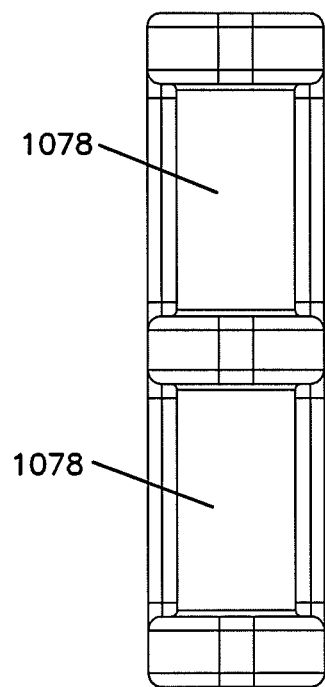
FIG. 61
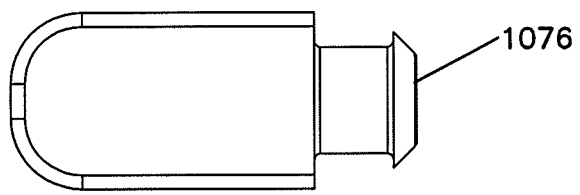

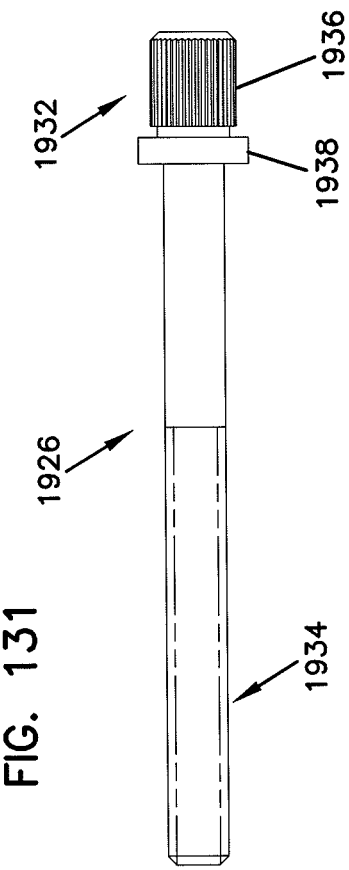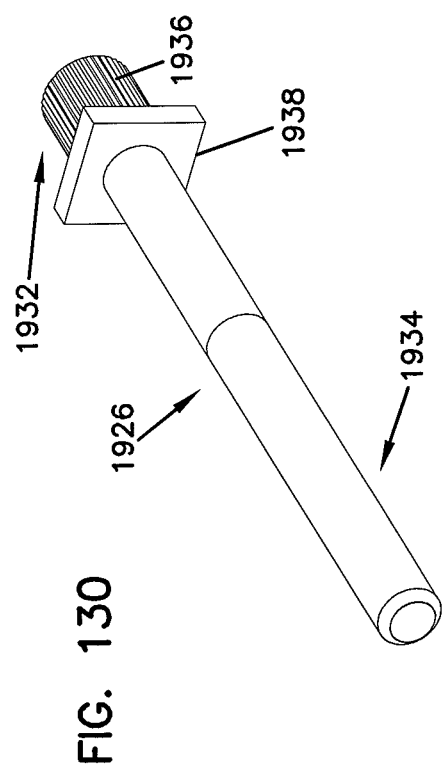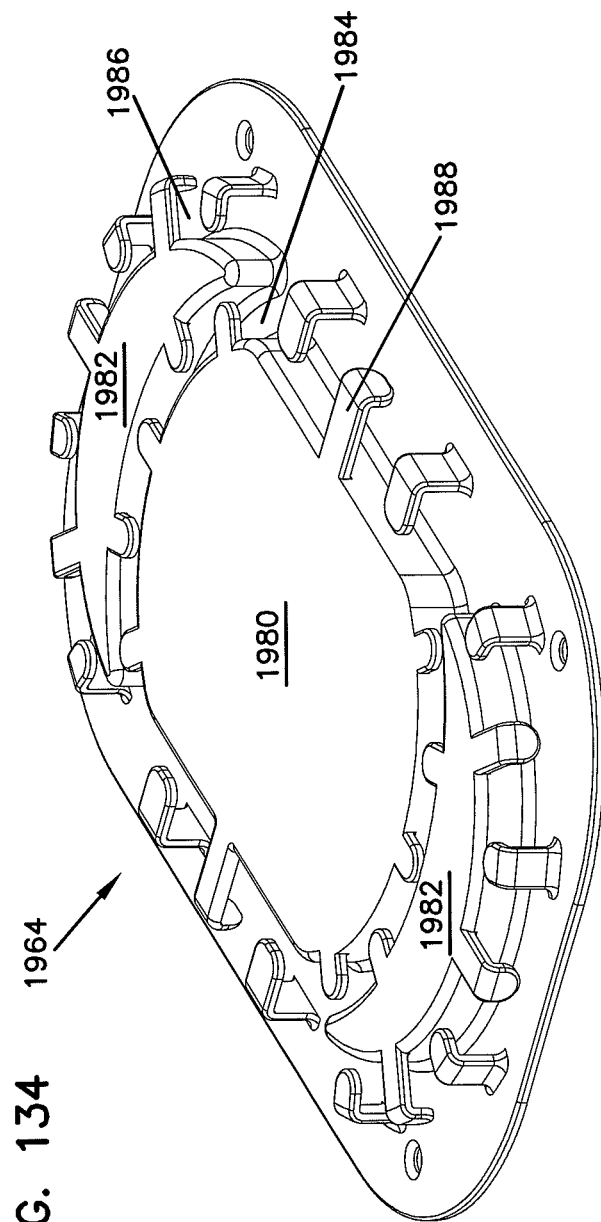

WALL BOX ADAPTED TO BE MOUNTED AT A MID-SPAN ACCESS LOCATION OF A TELECOMMUNICATIONS CABLE

CROSS REFERENCE TO RELATED APPLICATIONS

This application is a continuation of application Ser. No. 16/573,711, filed Sep. 17, 2019, now U.S. Pat. No. 11,036,018; which is a continuation of application Ser. No. 15/414,094, filed Jan. 24, 2017, now U.S. Pat. No. 10,422,970; which is a continuation of application Ser. No. 14/481,550 filed Sep. 9, 2014, now U.S. Pat. No. 9,557,504; which is a continuation of application Ser. No. 13/367,100, filed Feb. 6, 2012, now U.S. Pat. No. 8,837,894; which is a continuation of application Ser. No. 12/350,337, filed Jan. 8, 2009, now U.S. Pat. No. 8,111,966; which application claims the benefit of provisional application Ser. No. 61/020,100, filed Jan. 9, 2008, entitled "Wall Box Adapted to be Mounted at a Mid-Span Access Location of a Telecommunications Cable, "; provisional application Ser. No. 61/029,214, filed Feb. 15, 2008, entitled "Wall Box Adapted to be Mounted at a Mid-Span Access Location of a Telecommunications Cable, "; provisional application Ser. No. 61/039,049, filed Mar. 24, 2008, entitled "Wall Box Adapted to be Mounted at a Mid-Span Access Location of a Telecommunications Cable, "; provisional application Ser. No. 61/046,656, filed Apr. 21, 2008, entitled "Wall Box Adapted to be Mounted at a Mid-Span Access Location of a Telecommunications Cable, "; and provisional application Ser. No. 61/077,350, filed Jul. 1, 2008, entitled "Wall Box Adapted to be Mounted at a Mid-Span Access Location of a Telecommunications Cable, ", which applications are incorporated herein by reference in their entirety.

TECHNICAL FIELD

The principles disclosed herein relate to fiber optic cable systems. More particularly, the present disclosure relates to fiber optic cable systems for providing fiber to the premises.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables are separated out from main cable lines. Breakout locations can also be referred to as tap locations, drop cable locations, splice locations or branch locations. Branch cables can also be referred to as drop cables, drop lines, breakout cables or stub cables. Branch cables are often connected to drop terminals 104 that include connector interfaces for facilitating coupling the fibers of the branch cables to a plurality of different subscriber locations. Breakout locations are often enclosed by a field mounted enclosure which protects optical splices (e.g., fusion or mechanical splices) or other types of optical couplings (e.g., connectorized optical couplings) provided at the breakout location. Since breakout locations are often provided at mid-span locations on the main cable being accessed, it is desirable for field mounted enclosures to be readily mountable at mid-span access locations without requiring the main cable to be "threaded" lengthwise through the enclosure.

Fiber optic networks can extend to multi-dwelling units such as apartment buildings and condominiums. FIG. 2 shows a fiber optic network including a cable 150 routed into a multi-dwelling unit 152. Within the multi-dwelling unit 152, branch cables/fibers are optically coupled to the fibers of the cable 150 at optical coupling locations (e.g., fusion splices, mechanical splices or connectorized optical couplings). The optical coupling locations can be enclosed within one or more wall boxes that are typically equipped with doors/covers that can be opened to provide easy access to the optical coupling locations. The wall boxes are typically provided at different floors of the multi-dwelling unit with each wall box having optical coupling locations corresponding to a plurality of different subscribers (e.g., each resident on a given floor).

SUMMARY

Certain aspects of the disclosure relate to a wall box for use in a fiber optic network. The wall box can include structure that facilitates mounting the wall box at a mid-span access location of a fiber optic cable.

An aspect of the present disclosure relates to a wall box including an enclosure. The enclosure has a base and a front cover connected to the base. The base and the front cover cooperate to enclose an interior region of the enclosure. The wall box further includes a plurality of fiber optic adapters mounted to the enclosure. The fiber optic adapters include an inner port positioned inside the interior region and an outer port positioned at an outer surface of the enclosure. A tray stack is mounted within the interior region of the enclosure. The tray stack includes a tray mount pivotally connected to the enclosure. The tray mount includes a top surface and an oppositely disposed bottom surface. A first splice tray mounting area is disposed on the top surface and a second splice tray mounting area is disposed on the bottom surface.

A plurality of trays is disposed in the first splice tray mounting area. A tray is disposed in the second splice tray mounting area.

Another aspect of the present disclosure relates to a wall box including an enclosure. The enclosure has a base and a cover pivotally connected to the base. The base and the cover cooperate to enclose an interior region of the enclosure. A hinge assembly pivotally connects the cover to the base. The hinge assembly includes at least one pin member and at least one hinge portion. The hinge portion has a free end defining an opening that is adapted to selectively receive the pin member. A retention member is adapted to retain the pin member in the opening of the hinge portion. The retention member is a resilient member having a first end portion and an oppositely disposed second end portion. The second end portion is adapted to block at least a portion of the opening in a relaxed position to retain the pin member in the opening. The wall box further includes a plurality of fiber optic adapters mounted to the enclosure. The fiber optic adapters include an inner port positioned inside the interior region and an outer port positioned at an outer surface of the enclosure.

A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIGS. 47-53 show a pivotal tray mount used with the wall box of FIG. 3.

FIGS. 57-61 show various views of a dual hinge pin component used with the tray stack of FIGS. 54-56.

FIGS. 130-131 are various views of a fastener suitable for use with the wall box of FIG. 125.

FIG. 134 is a perspective view of a cable management tray suitable for use with the wall box of FIG. 125.

DETAILED DESCRIPTION

Figure 1:
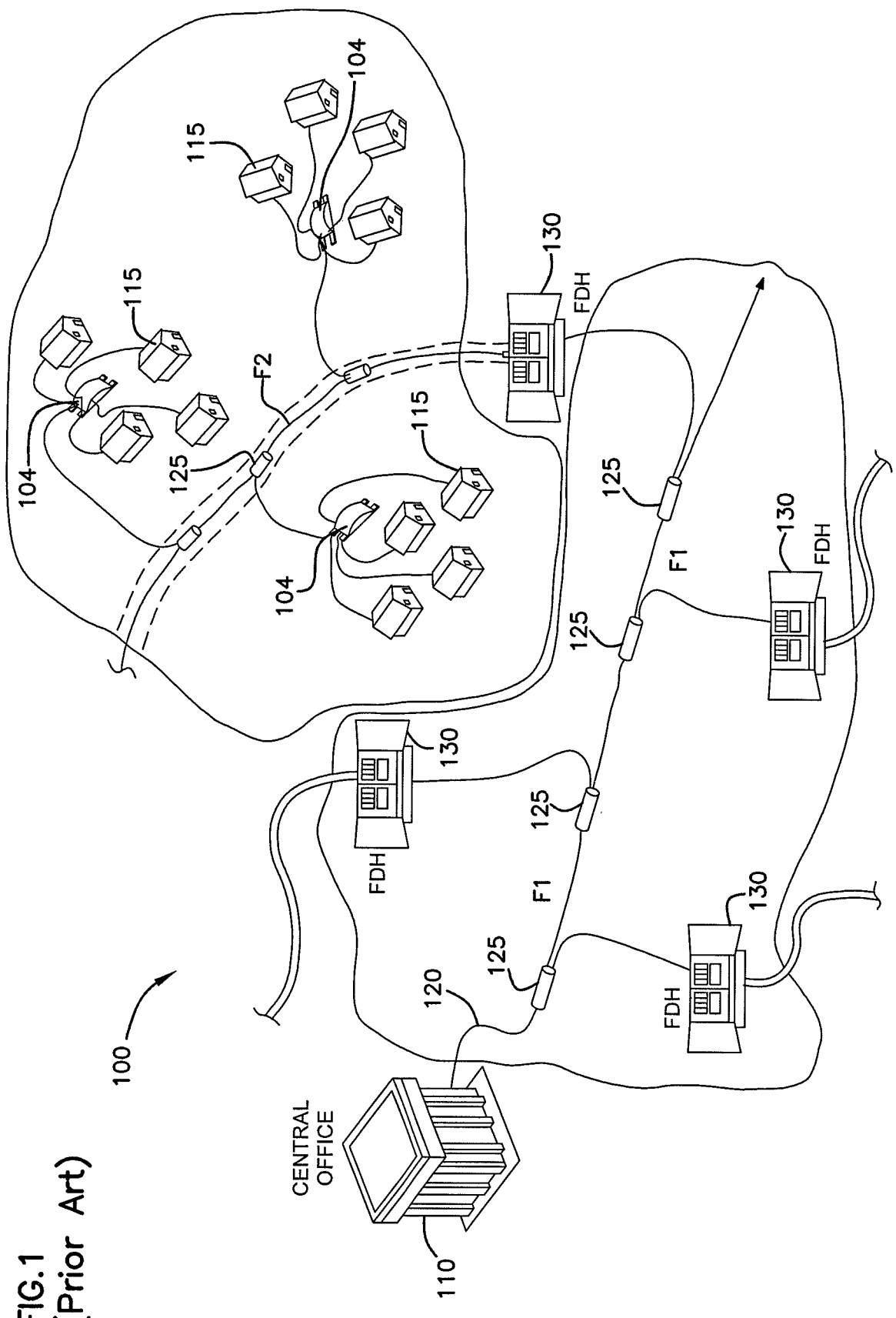
FIG. 1 shows a prior art passive fiber optic network.
Figure 2:
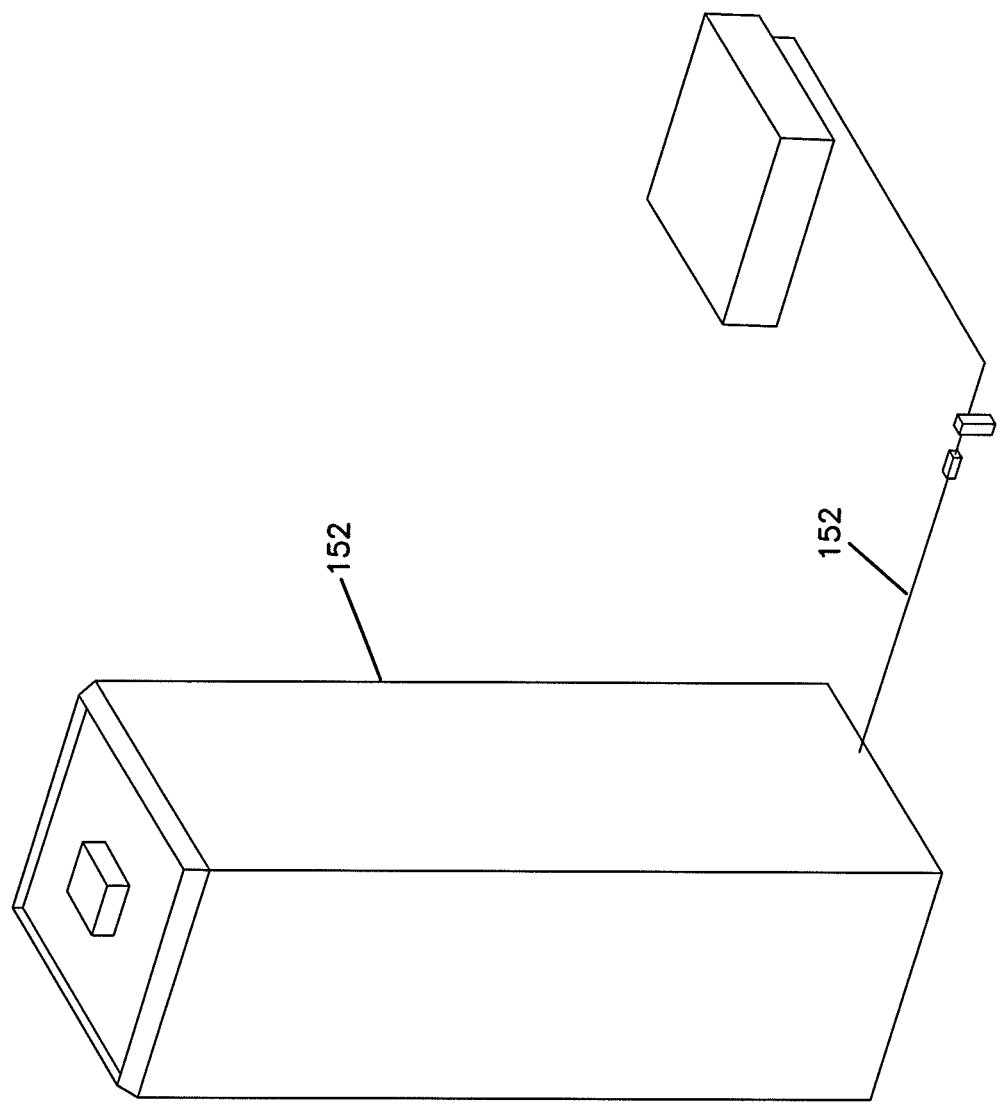
FIG. 2 shows another prior art passive fiber optic network.
Figure 3:
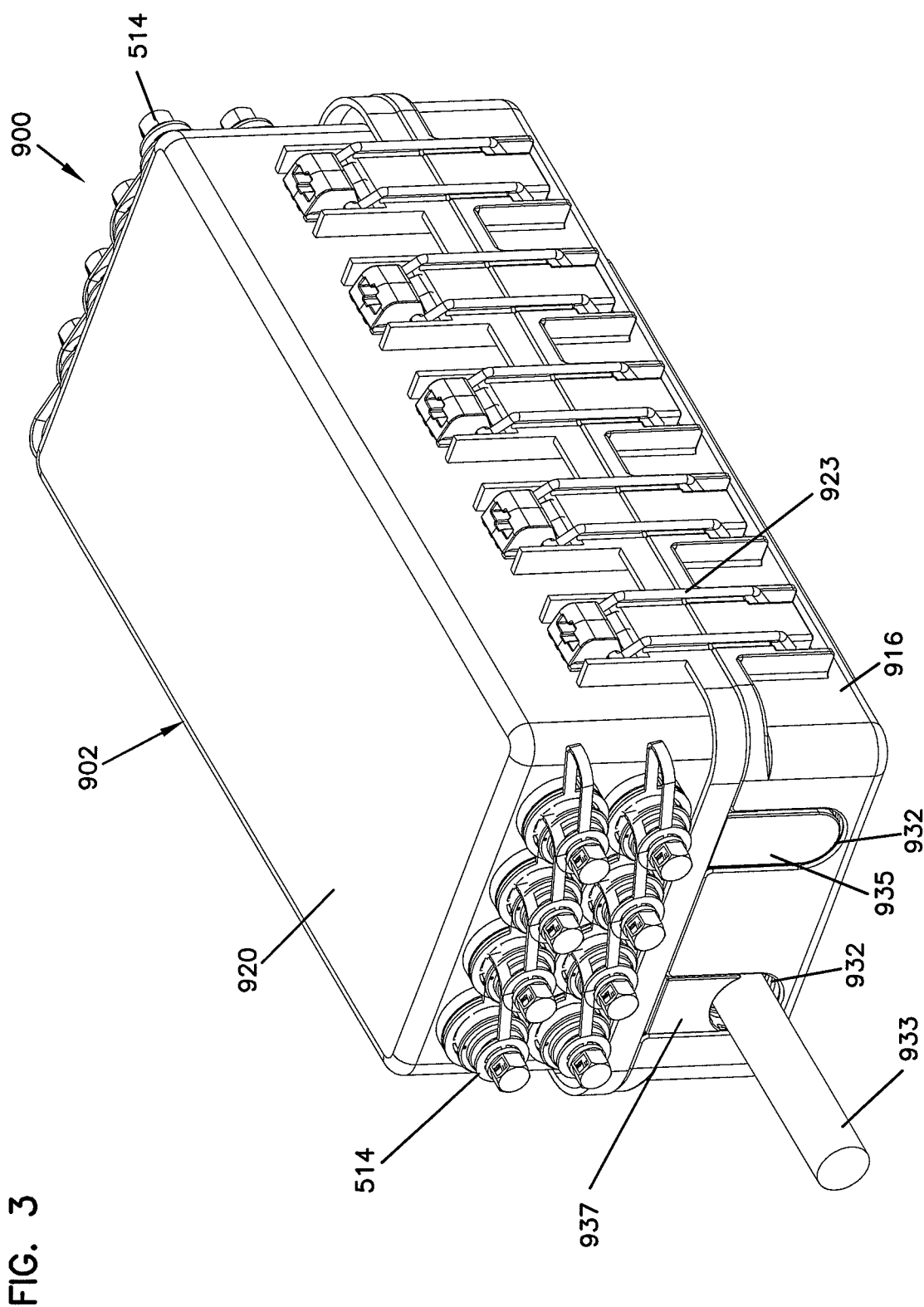
FIG. 3 is a perspective view of another wall box in accordance with the principles of the present disclosure, a cable is shown routed through a first pass-through path defined by the wall box.
Figure 4:
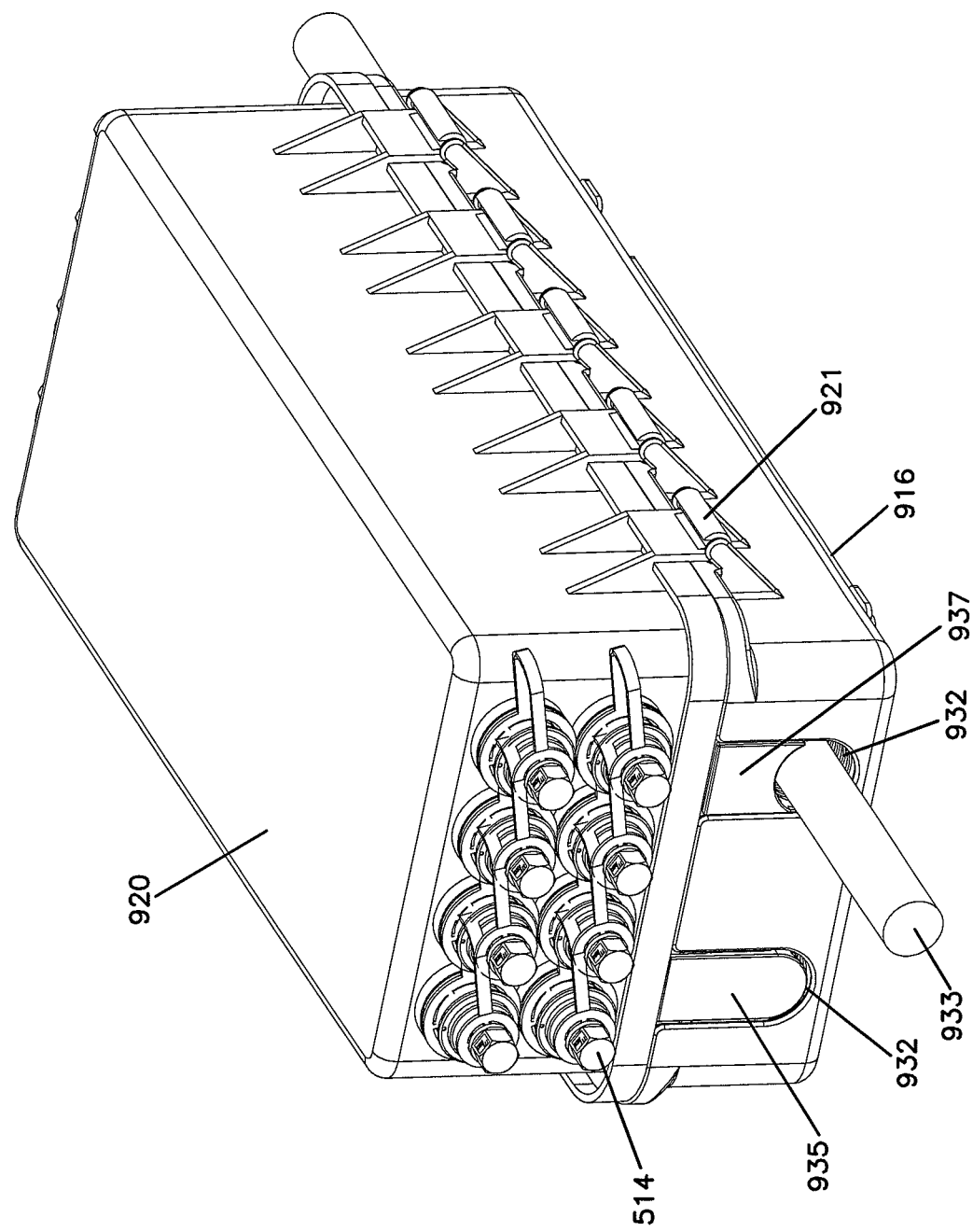
FIG. 4 is a perspective view of the wall box of FIG. 3 from an opposite perspective as the view of FIG. 3.

The present disclosure relates generally to wall boxes configured to be easily mounted at mid-span locations along the length of a fiber optic telecommunications cable. It is preferred for wall boxes in accordance with the principles of the present disclosure to be used for indoor applications such as multi-dwelling units, or commercial buildings where a plurality of subscribers is located. However, it will be appreciated that wall boxes in accordance with the principles of the present disclosure can be used for either indoor or outdoor applications wherever it is desired to easily mount an enclosure at a mid-span location of a telecommunications cable. Certain embodiments can be sealed for use in below grade applications (e.g., for use in hand holes).

FIGS. 3-13 show a wall box 900 having features in accordance with the principles of the present disclosure. The wall box 900 includes an enclosure 902 having a base 916 and a front cover 920 that cooperate to enclose an interior region of the enclosure 902. The front cover 920 is pivotally connected to the base 916 by hinges 921 located at a first side of the enclosure 902. A plurality of latches 923 is located at the side of the enclosure opposite from the hinges 921. The latches 923 are configured to secure the front cover 920 in a closed position relative to the base 916. Groupings of fiber optic adapters 514 are mounted at opposite ends of the front cover 920.

Figure 14:
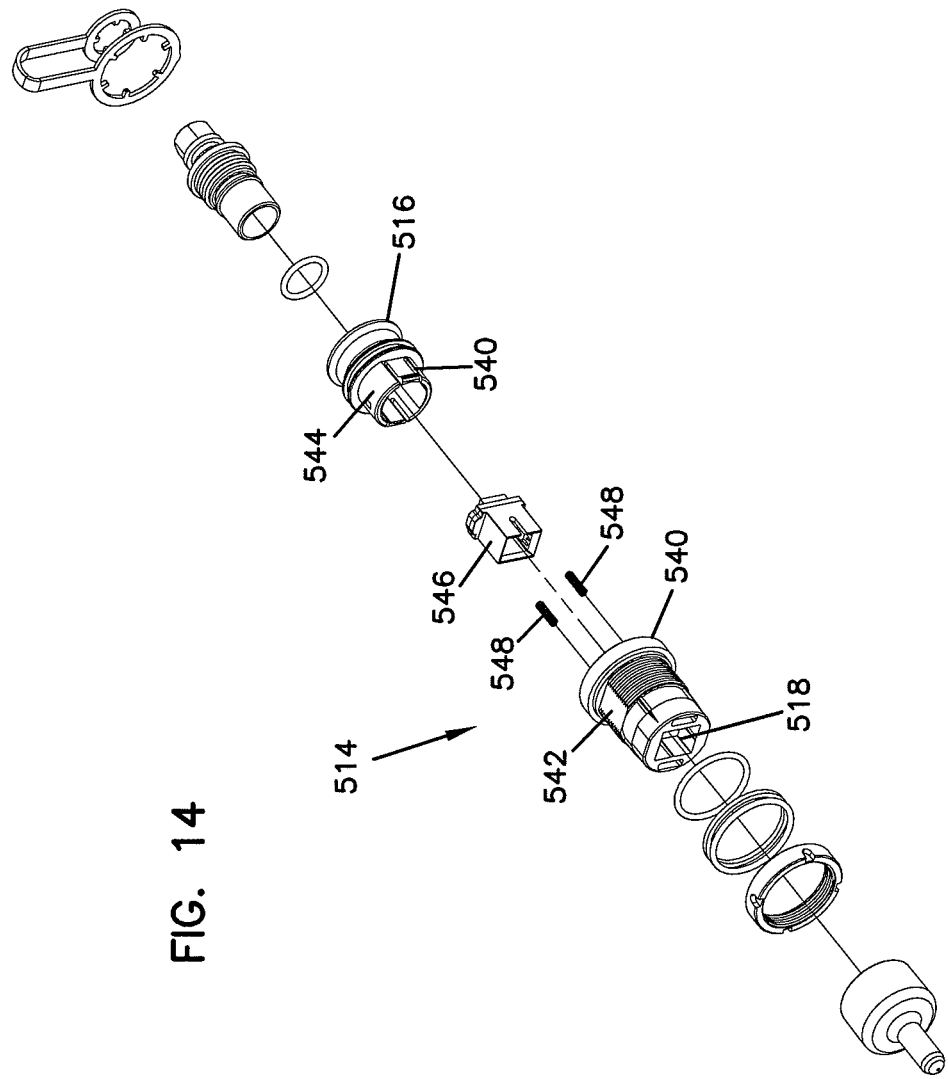
FIG. 14 is an exploded view of a fiber optic adapter suitable for use with the wall box devices of FIGS. 3-13.

FIG. 14 illustrates one of the fiber optic adapters 514 in isolation from the wall boxes. The fiber optic adapter 514 includes a main housing 540 having a first piece 542 that defines the inner port 518 of the fiber optic adapter 514 and a second piece 544 that defines the outer port 516 of the fiber optic adapter 514. The first and second pieces 542, 544 can be interconnected by a snap-fit connection to form the main housing 540. A split sleeve housing 546 mounts within the interior of the main housing 540. Springs 548 bias the split sleeve housing 546 toward the outer port 516 and allow the split sleeve housing 546 to float within the interior of the main housing 540. As shown in FIG. 14, the split sleeve housing 546 houses a standard split sleeve 550 that is coaxially aligned with a center axis 552 of the fiber optic adapter 514. The split sleeve 550 includes a first end 554 that faces toward the inner port 518 of the fiber optic adapter 514 and a second end 556 that faces toward the outer port 516 of the fiber optic adapter 514. The fiber optic adapter 514 mounts within one of the adapter mounting openings defined by the wall boxes. The fiber optic adapter 514 is retained within the adapter mounting opening by a retention nut 560 threaded on exterior threads defined by the first piece 542 of the main housing 540. When the retention nut 560 is threaded into place, the corresponding adapter mounting wall is captured between the retention nut 560 and a shoulder 564 of the main housing 540. A sealing member 566 is compressed between the main housing 540 and the adapter mounting wall to provide an environmental seal about the adapter mounting opening.

Figure 15:
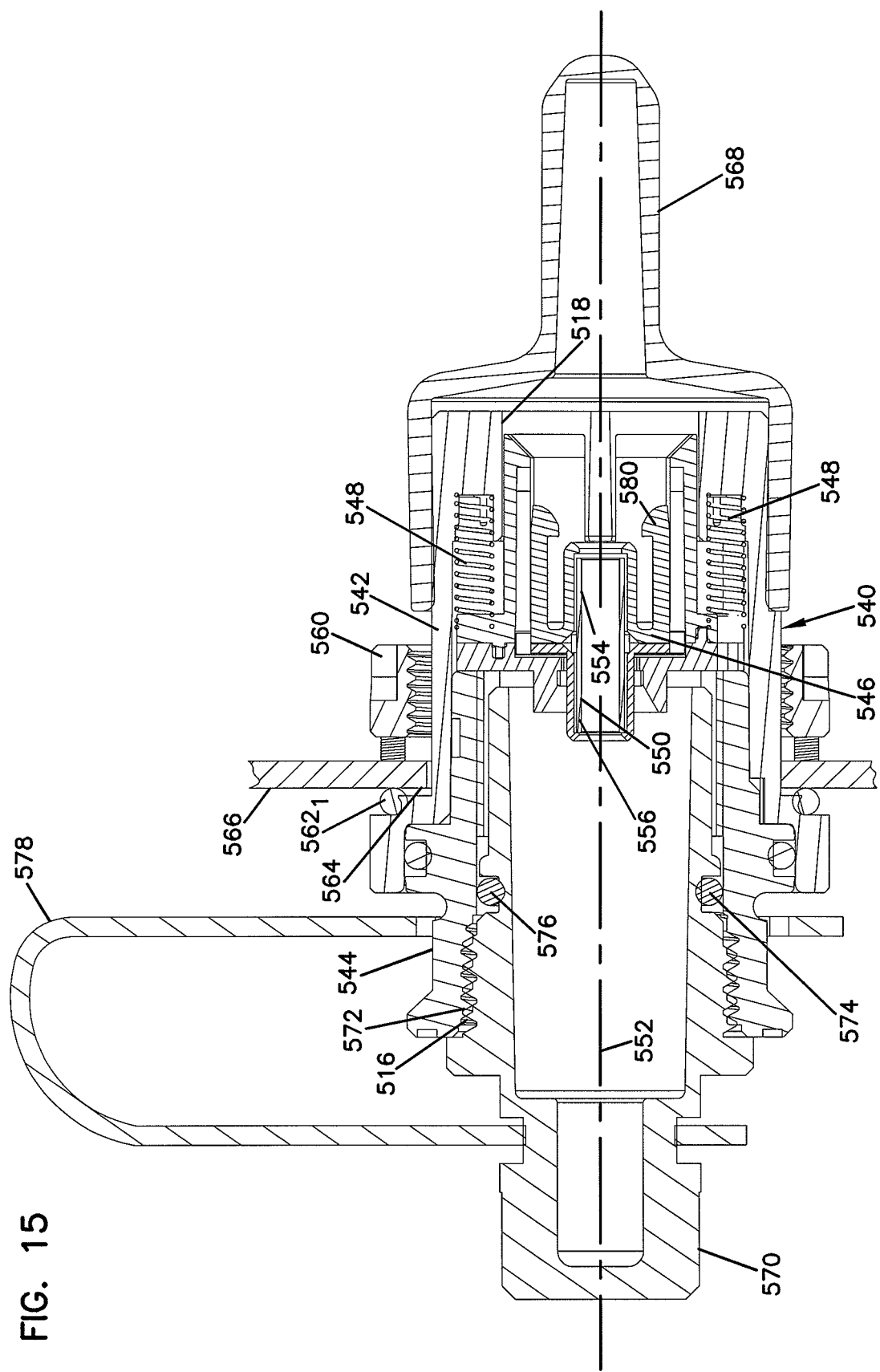
FIG. 15 is a longitudinal cross-sectional view of the fiber optic adapter of FIG. 14.

As shown in FIG. 15, a dust cap 568 is shown mounted covering the inner port 518 of the fiber optic adapter 514 and a plug 570 is shown mounted within the outer port 516 of the fiber optic adapter 514. The plug 570 is threaded within internal threads 572 defined within the outer port 516. The plug 570 also includes a sealing member 574 (e.g., an O-ring) that engages a sealing surface 576 within the outer port 516 to provide an environmental seal between the main housing 540 and the plug 570. A strap 578 secures the plug 570 to the main housing 540 to prevent the plug from being misplaced when removed from the outer port 516.

During assembly of the wall boxes, the fiber optic adapters 514 are mounted within the adapter mounting openings defined through the front covers of the wall boxes. After installation of the fiber optic adapters 514, the dust caps 568 can be removed to allow the fiber optic connectors 530 terminated to the pigtail optical fibers 528 spliced to corresponding fibers of the main cable to be inserted into the inner ports 518. When the inner fiber optic connectors 530 are inserted into the inner ports 518, ferrules of the inner fiber optic connectors 530 are received within the first ends 554 of the split sleeves 550, and clips 580 function to retain the inner fiber optic connectors 530 within the inner ports 518.

Figure 16:
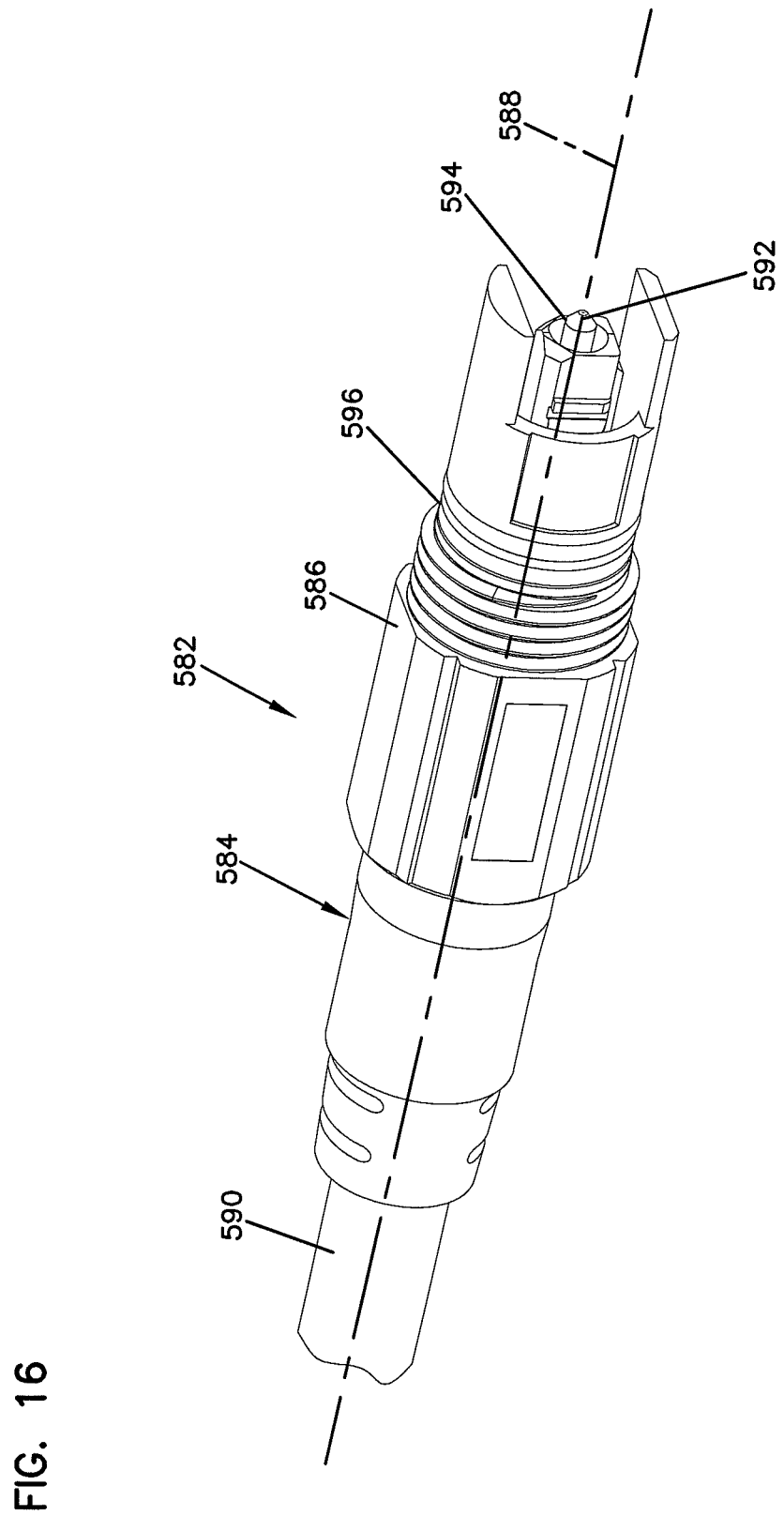
FIG. 16 shows a fiber optic connector adapted to be inserted in an outer port of the fiber optic adapter of FIGS. 14 and 15.
Figure 17:
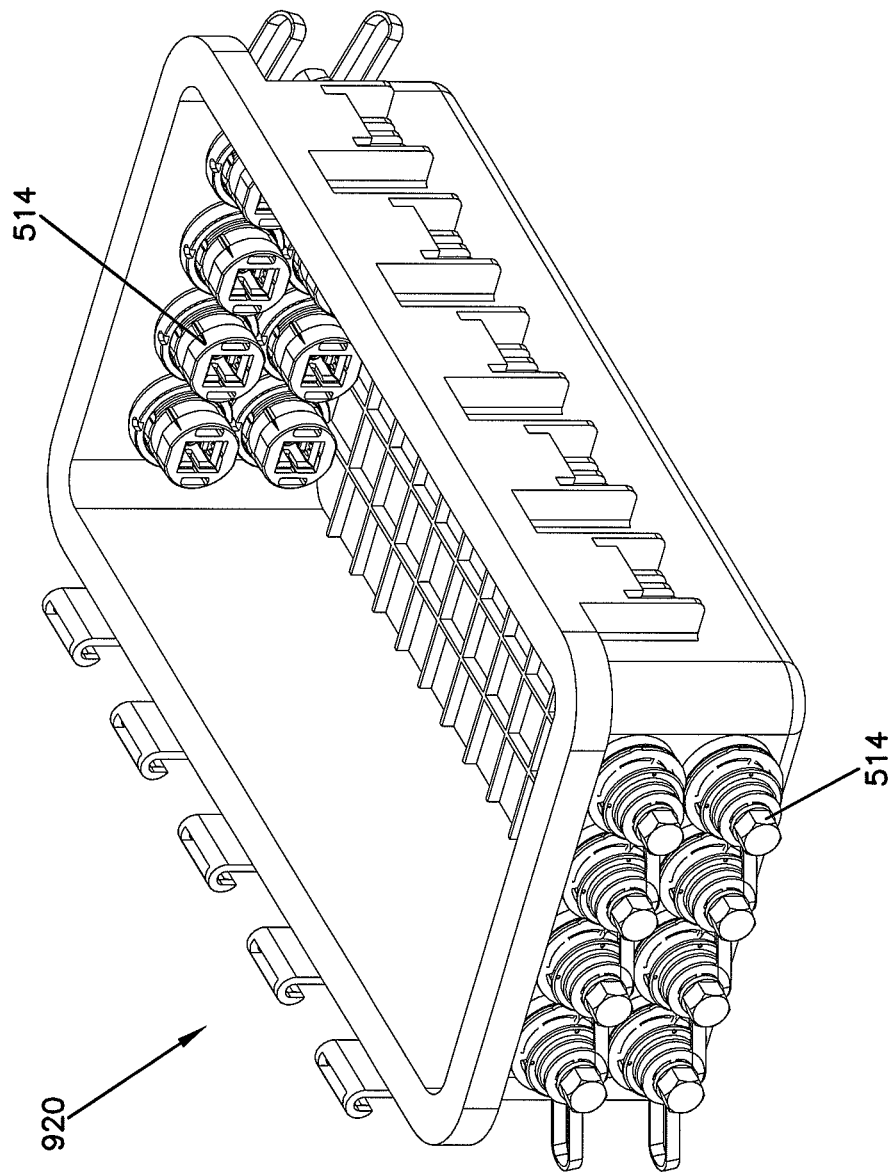
FIG. 17 is a perspective view of a cover of the wall box of FIG. 3.
Figure 18:
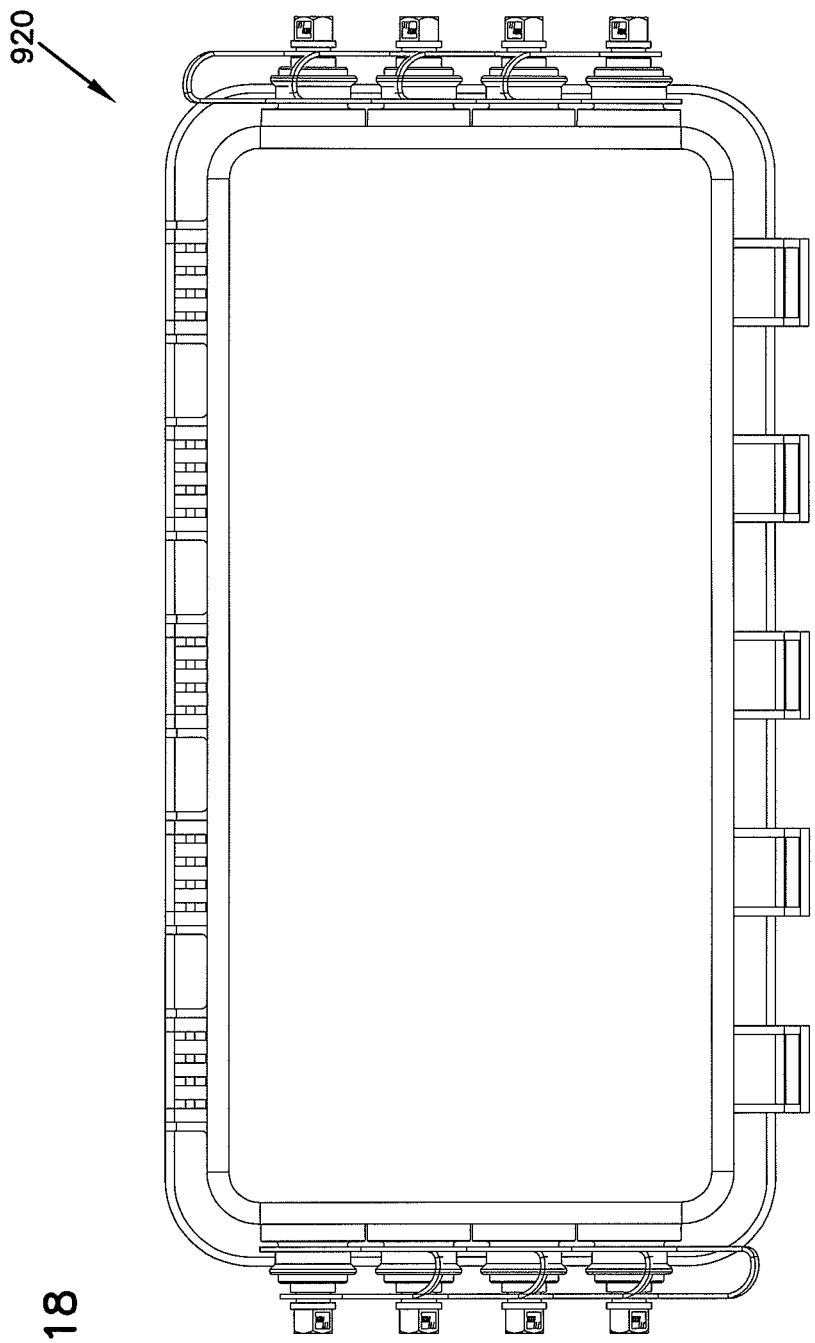
FIG. 18 is a front view of the cover of FIG. 17.
Figure 19:
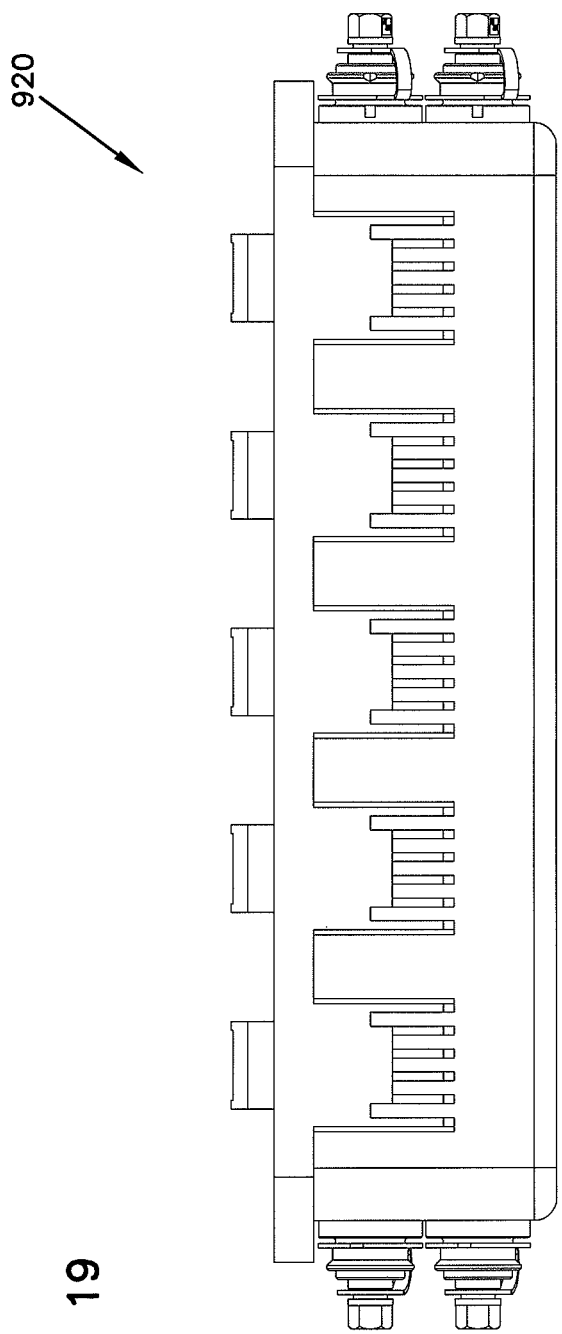
FIG. 19 is a top view of the cover of FIG. 17.
Figure 20:
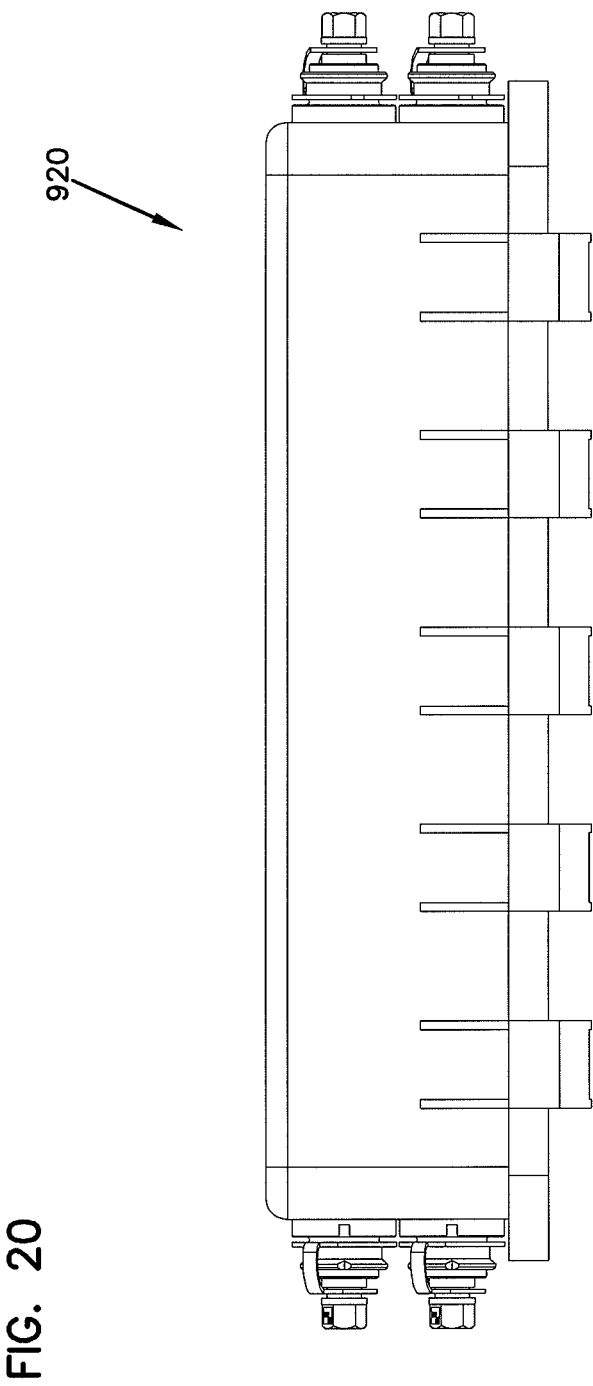
FIG. 20 is a bottom view of the cover of FIG. 17.
Figure 21:
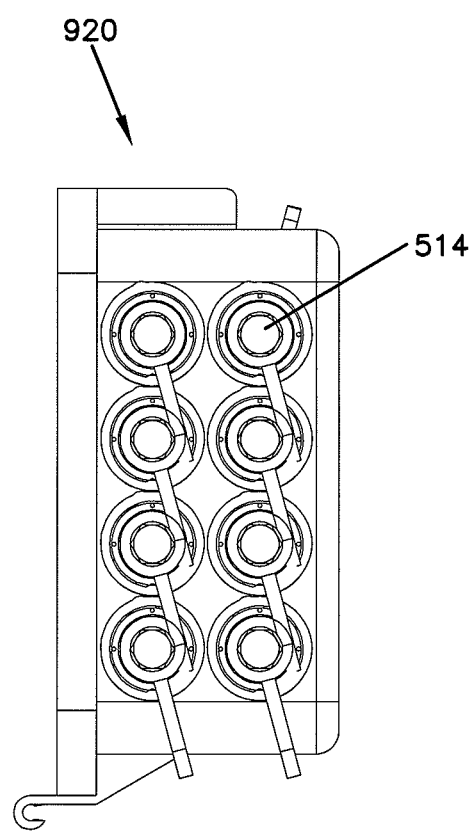
FIG. 21 is a right, end view of the cover of FIG. 17.
Figure 22:
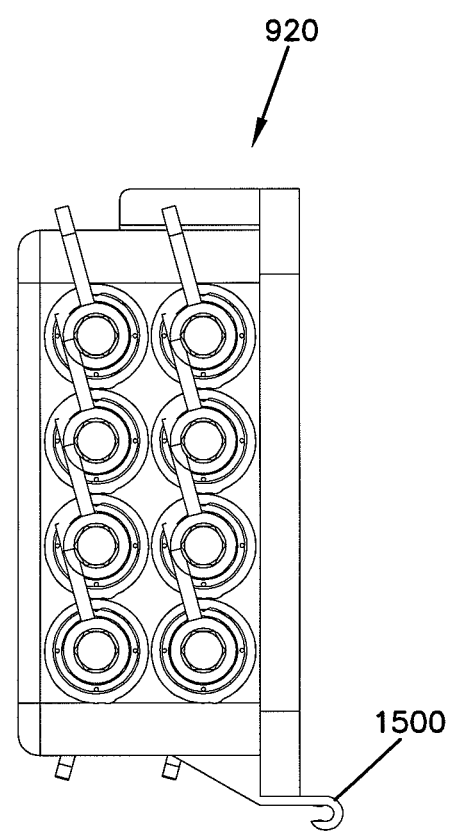
FIG. 22 is a left, end view of the cover of FIG. 17.
Figure 23:
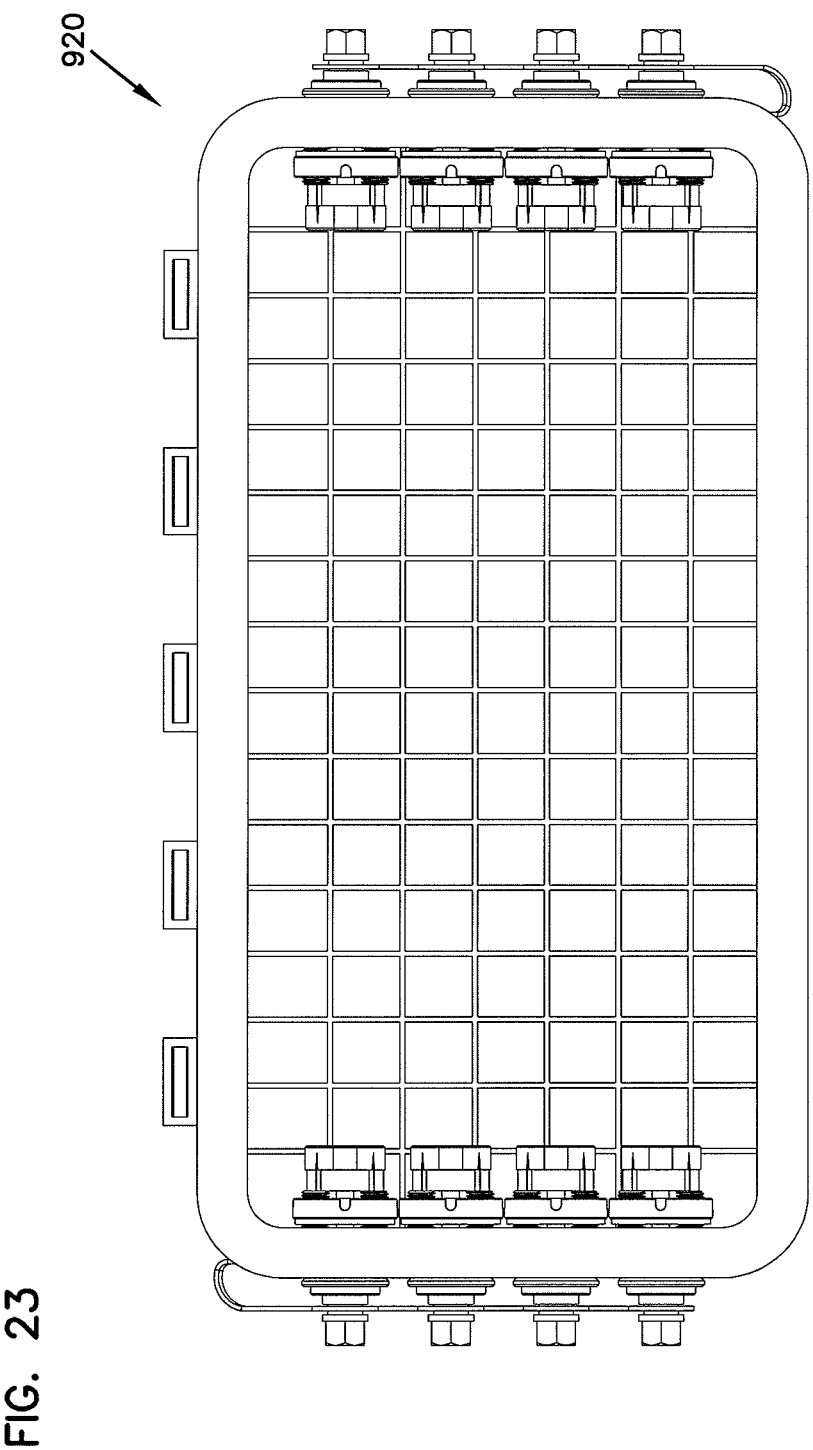
FIG. 23 is a rear view of the cover of FIG. 17.

When it is desired to optically couple a drop cable to one of the wall boxes, the plug 570 of one of the fiber optic adapters 514 is removed from its corresponding outer port 516 to allow an exterior fiber optic connector terminated to the drop cable to be inserted into the outer port 516. An example exterior fiber optic connector 582 mounted at the end of a drop cable 590 is shown at FIG. 16. The exterior fiber optic connector 582 includes a housing 584 on which a retention nut 586 is rotatably mounted. The retention nut 586 can be manually rotated about a central axis 588 of the exterior fiber optic connector 582. The drop cable 590 includes an optical fiber 592 having an end portion mounted within a ferrule 594 supported at one end of the housing 584. When the exterior fiber optic connector 582 is inserted within the outer port 516, the ferrule 594 is received within second end 556 of the split sleeve 550. In this way, the split sleeve 550 holds the ferrule of the inner fiber optic connector 530 in coaxial alignment with the ferrule 594 of the exterior fiber optic connector 582. By aligning the ferrules, the corresponding optical fibers 528, 592 held within the ferrules are placed in coaxial alignment thereby allowing light signals to be transferred from fiber to fiber. The exterior fiber optic connector 582 is retained within the outer port 516 by threading the retention nut 586 into the internal threads 572. Additionally, the exterior fiber optic connector 582 includes a sealing member 596 (e.g., an O-ring) that engages the sealing surface 576 to provide an environmental seal between the exterior fiber optic connector 582 and the fiber optic adapter 514. With the ends of the optical fibers 528, 592 aligned, fiber optic signals can readily be transmitted between the optical fibers 528, 592.

Figure 5:
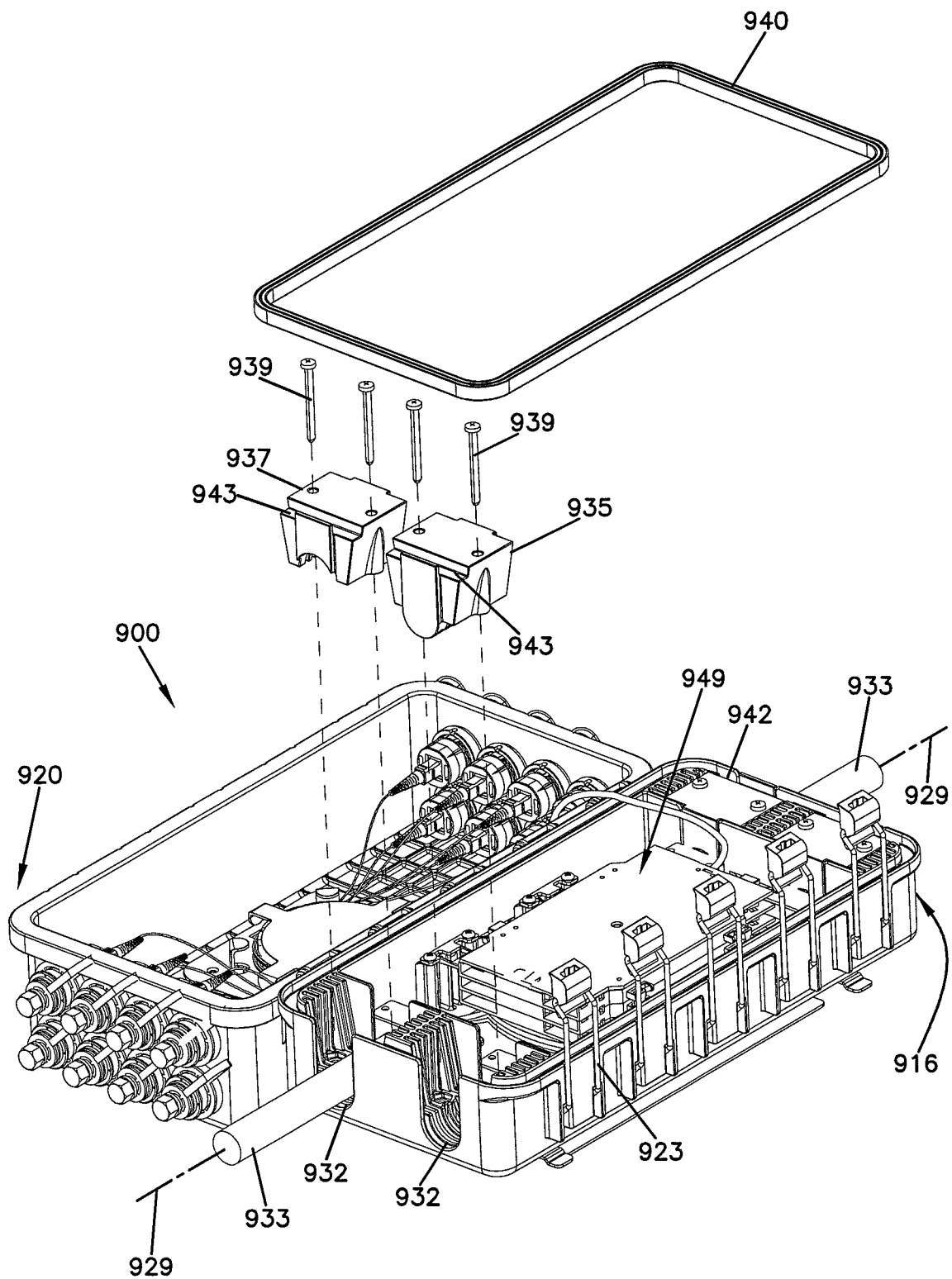
FIG. 5 shows the wall box of FIGS. 3 and 4 in an open configuration with various components exploded outwardly from the interior of the wall box.
Figure 6:
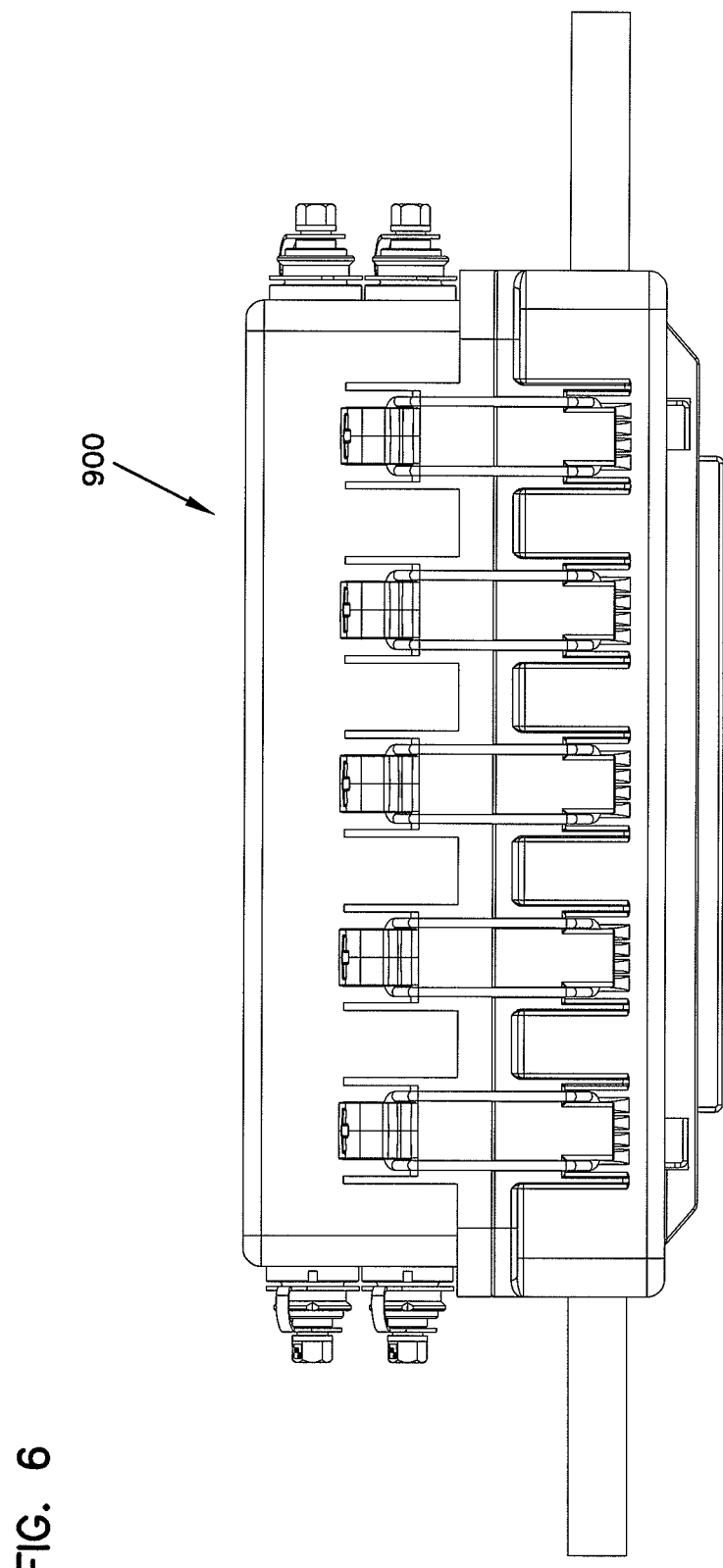
FIG. 6 is top side view of the wall box of FIG. 3.
Figure 7:
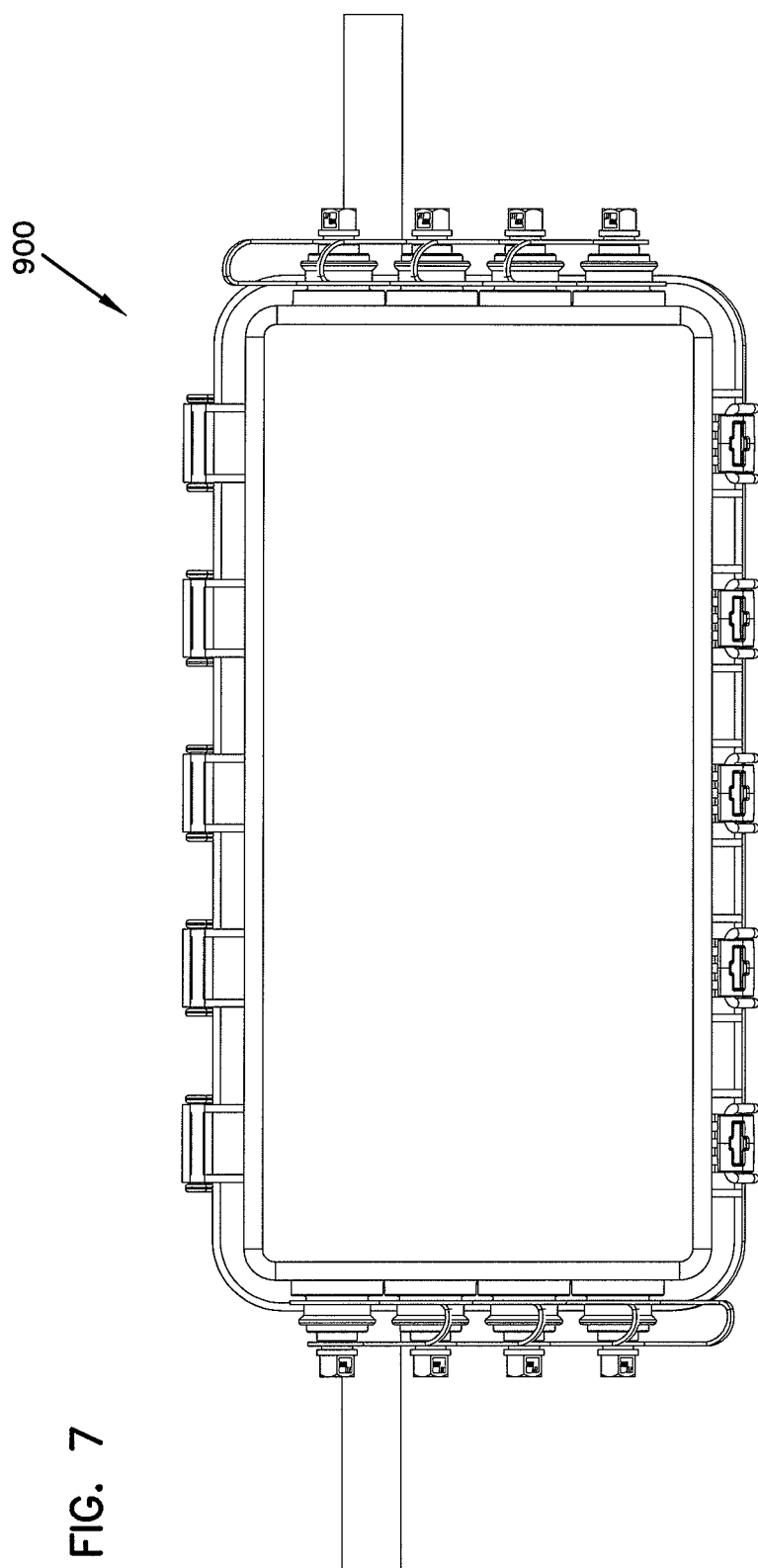
FIG. 7 is a front view of the wall box of FIG. 3.
Figure 8:
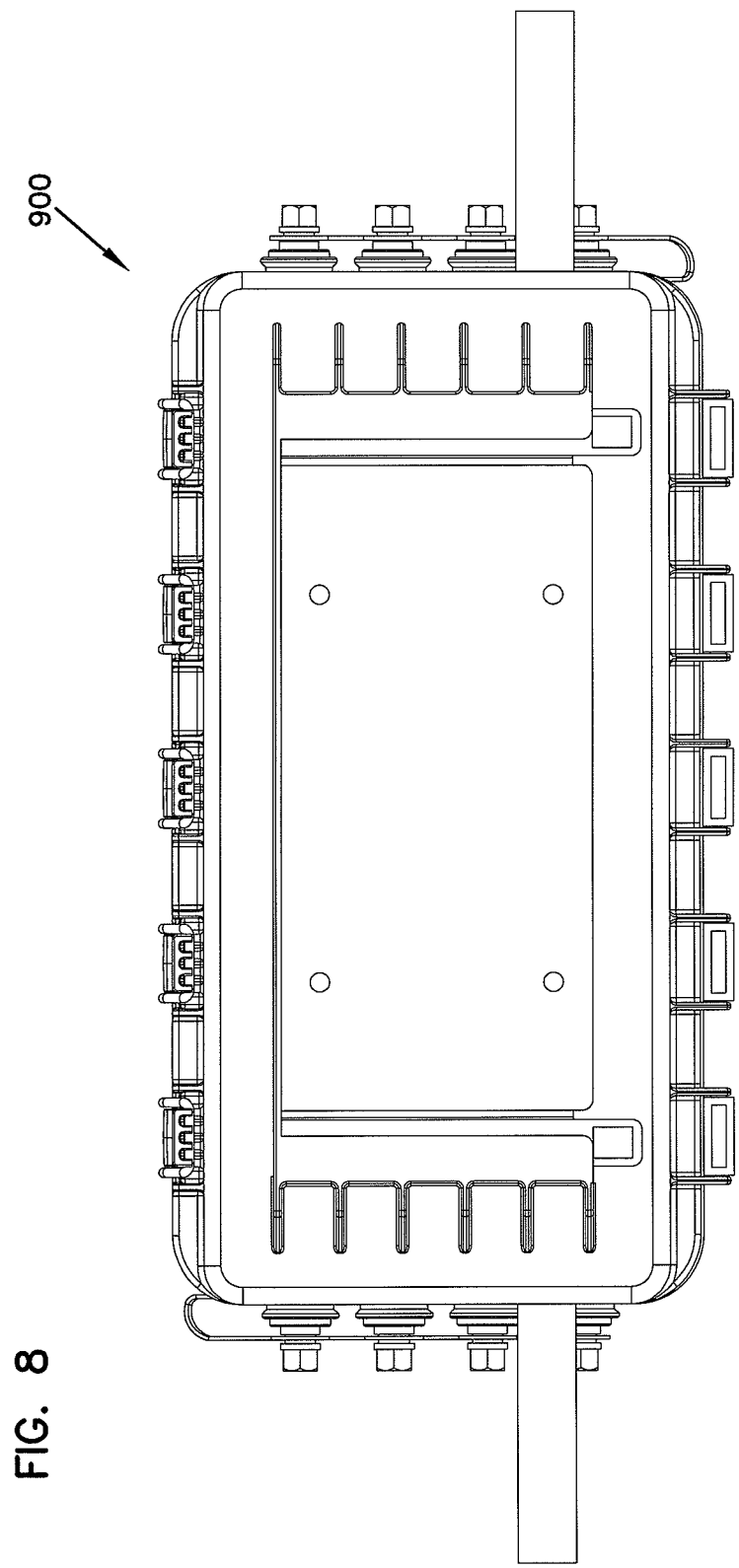
FIG. 8 is a back view of the wall box of FIG. 3.
Figure 9:
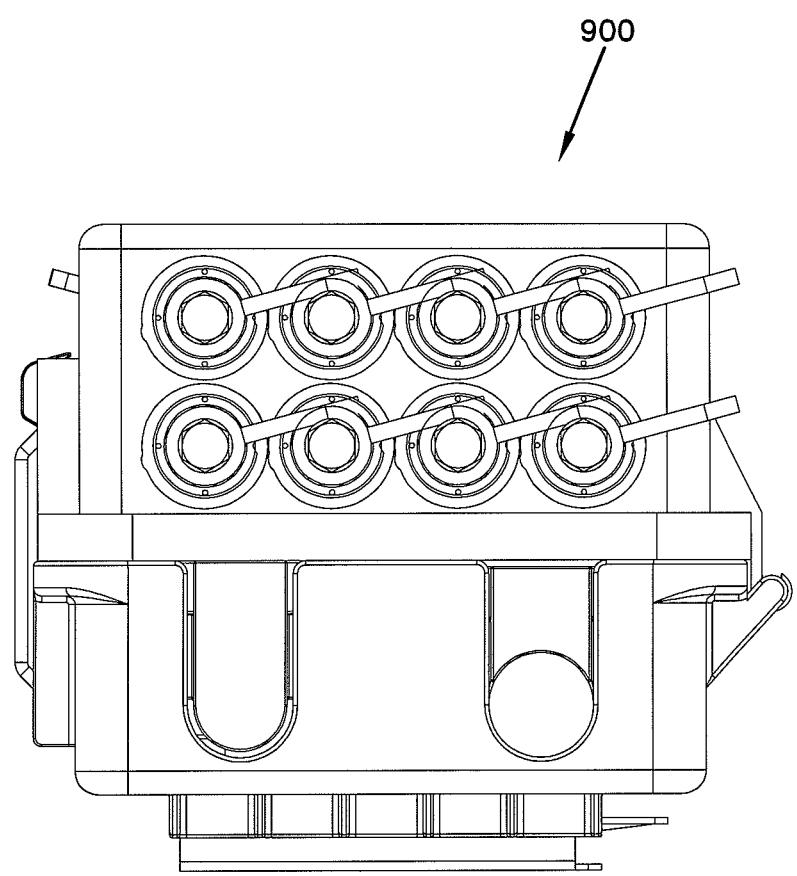
FIG. 9 is a right, end view of the wall box of FIG. 3.

Referring to FIG. 5, the base 916 defines two sets of cable exit/enter openings 932 for allowing a telecommunications cable 933 to be routed through the enclosure 902. The sets of cable exit/enter openings 932 are aligned along axes 929 defining cable pass-through paths that extend through the enclosure 902. The cable exit/enter openings 932 can be enclosed by plug inserts 935 (see FIGS. 38-44) when cables are not being routed through the openings 932. Cable pass-through inserts 937 (see FIGS. 31-37) are used to seal the openings 932 when cables 933 are routed through the openings 932. Fasteners 939 are used to secure the inserts 935, 937 to the base 916. A gasket 940 provides a seal between the front cover 920 and the base 916 when the cover 920 is closed. The gasket 940 fits within a channel 942 that extends around the perimeter of an open side of the base 916. The inserts 935, 937 include recesses, depressions or grooves 943 that align with the channel 942 and that receive the gasket 940 when the gasket is mounted within the channel 942.

Figure 45:
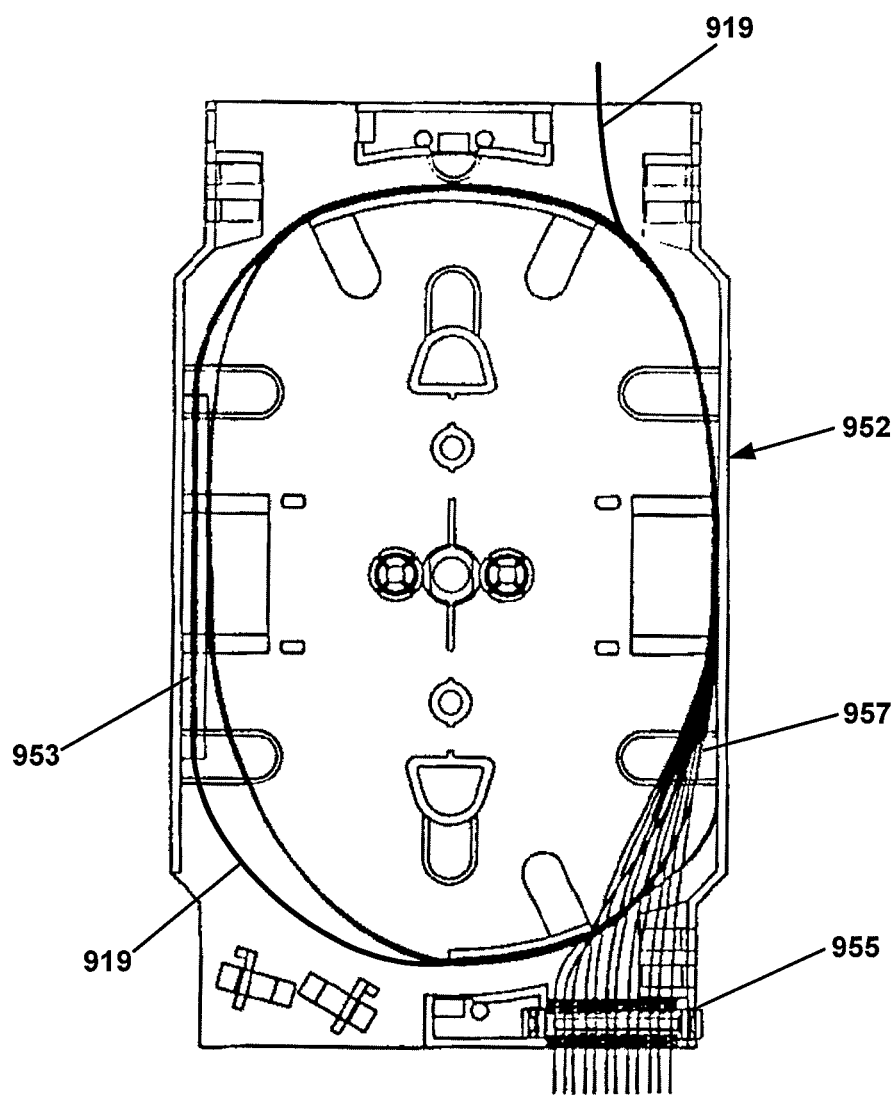
FIG. 45 shows a splitter tray used with the wall box of FIG. 3.
Figure 46:
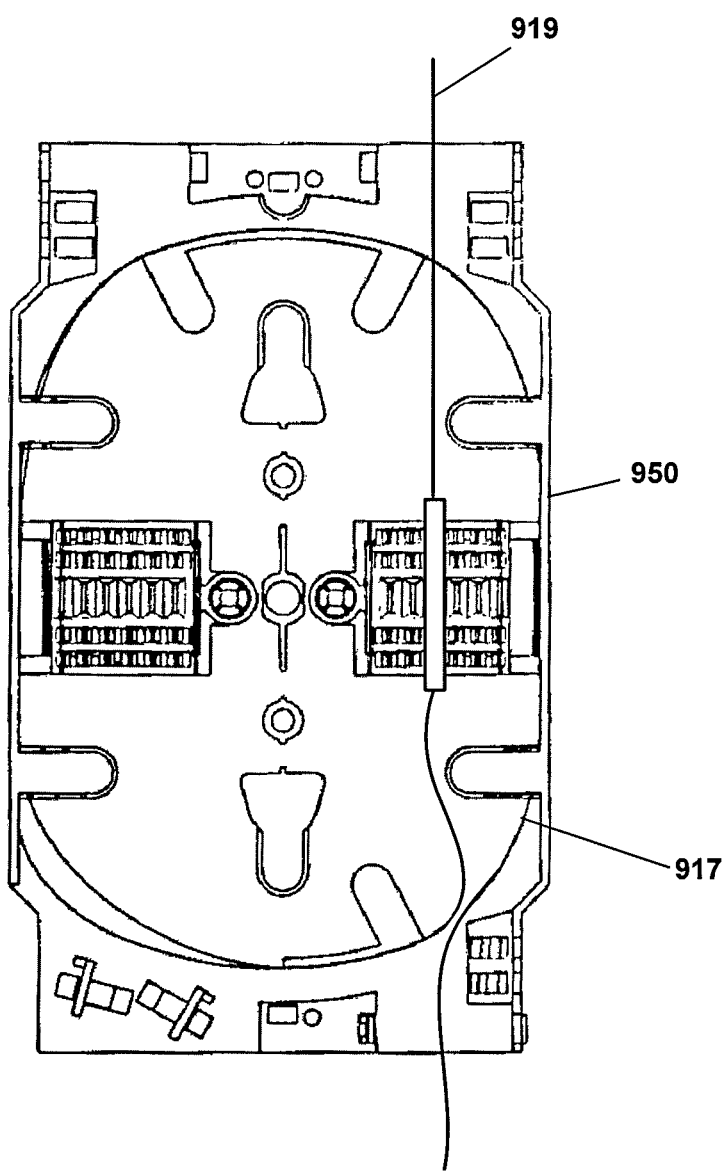
FIG. 46 shows a splice tray used with the wall box of FIG. 3.
Figure 47:
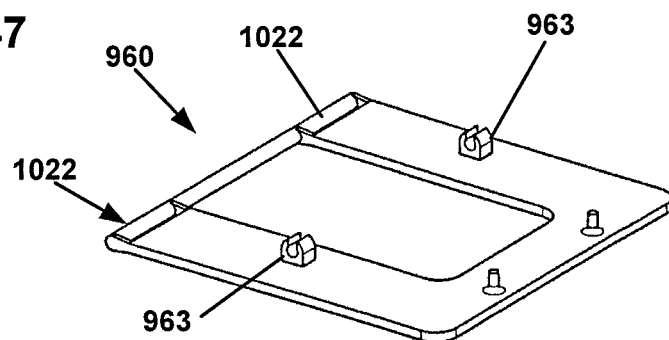
Figure 48:
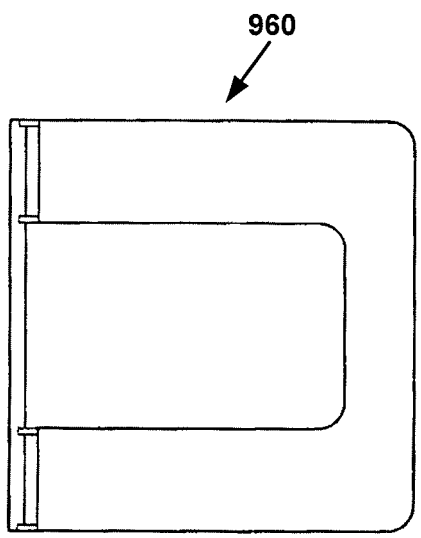
Figure 49:
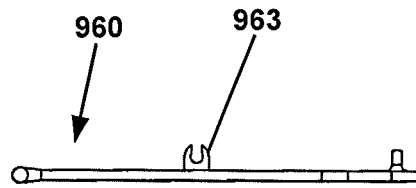

Still referring to FIG. 5, a tray stack 949 is mounted within the interior of the enclosure 902. The tray stack 949 includes a splitter tray 950 (see FIG. 45) and a plurality of splice trays 952 (see FIG. 46). One or more splitters 953 can be mounted on the splitter tray 950. For example, in one embodiment, a 1×16 splitter or two 1×8 splitters can be mounted on the splitter tray 950. In use of the wall box 900, a fiber 917 from the cable 933 routed through the enclosure 902 can be terminated at a mid-span access location located within the enclosure 902. The terminated optical fiber 917 can be spliced to an input 919 of the splitter 953 at one of the splice trays 952. Output fibers 957 of the splitter 953 can be routed to a fan-out 955 location where the output fibers 957 are upjacketed. The upjacketed output fibers 957 from the splitter 953 are preferably connectorized so as to form connectorized pigtails that are plugged into the inner ports of the fiber optic adapters 514. For certain applications, fibers of the pass-through cable 933 can be accessed and spliced directly to connectorized pigtails without using an intermediate splitter. In other embodiments, fibers accessed at the mid-span access location of the pass-through cable 933 can be spliced to distribution cables routed out of the wall box 900 through otherwise unused cable exit/enter openings 932.

Figure 13:
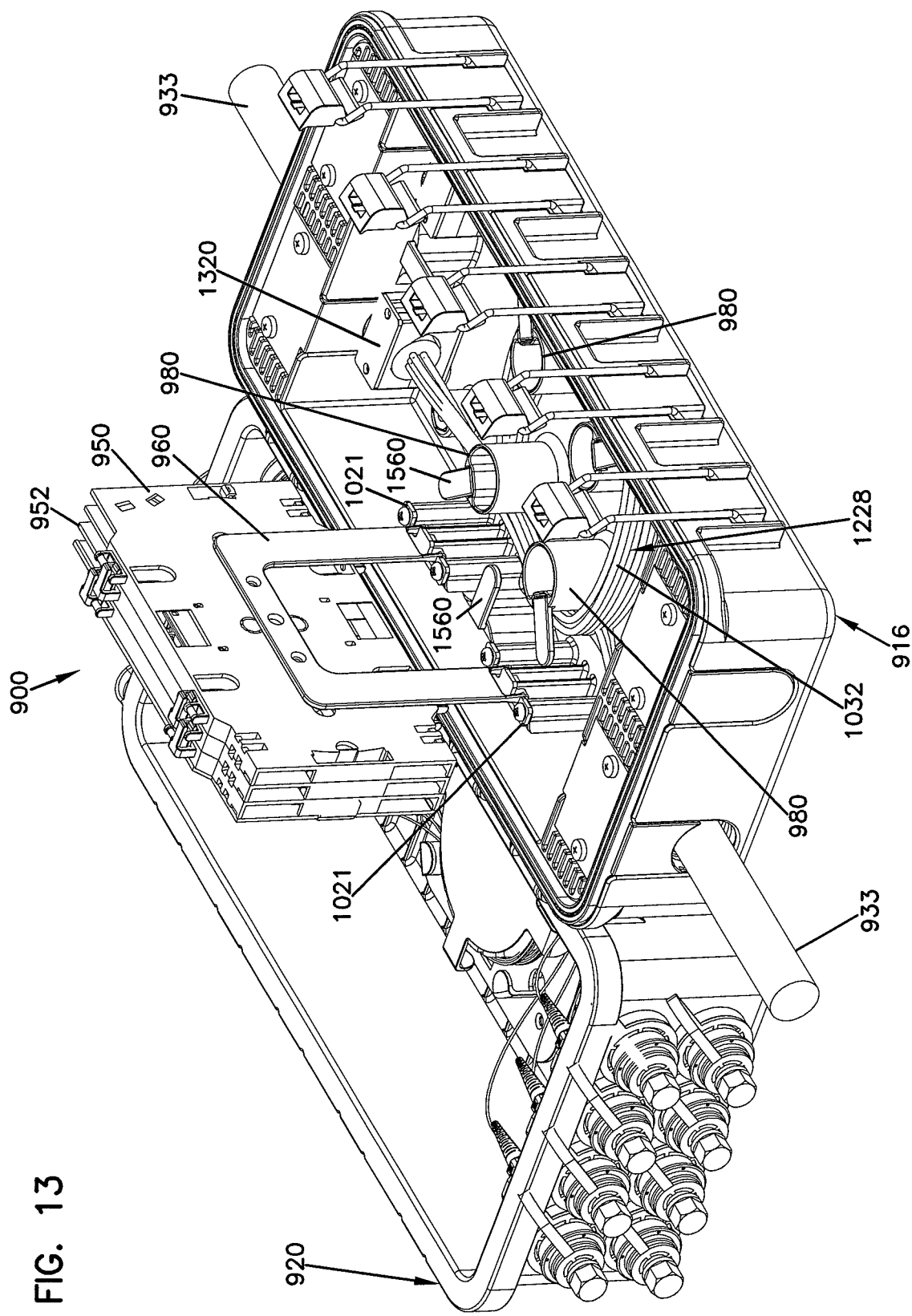
FIG. 13 shows the wall box of FIG. 11 with the entire splice tray assembly swung outwardly to a position where the pass-through cable can be readily accessed within the wall box.

To facilitate access to the pass-through cable 933 as well as the trays 950, 952, it is preferred for the splitter tray 950 and the splice trays 952 to be pivotally mounted within the enclosure 902. For example, the trays 950, 952 can be mounted to or carried by a pivotal tray mount 960 (see FIGS. 47-53) that is pivotally connected to the base 916 by a hinge arrangement. The hinge arrangement can include pin cradles 1020 (see FIGS. 25 and 26) sized to pivotally receive pivot pins 1022 that are integral with the pivotal tray mount 960. Brackets 1021 (see FIG. 13) are fastened over the cradles 1020 to retain the pivot pins 1022 within the cradles 1020. The pin cradles 1020 are provided at the upper portion of a standoff 1026 that offsets the cradles 1020 from the bottom of the base 916. In this way, pivotal tray mount 960 does not interfere with a cable spooling region 1228 provided at the bottom of the base 916. As shown at FIG. 13, the cable spooling region 1228 includes a plurality of spools 980 integrally formed with the base 916. An unjacketed mid-span portion 1032 of the pass-through cable 933 can be spooled around the outsides of the spools 980 for storage purposes. The unjacketed mid-span portion 1032 typically includes a plurality of exposed buffer tubes of the cable 933. Fibers within the buffer tubes can be accessed, terminated and spliced to the input 919 of a splitter 953 (see FIG. 45) at one of the splice trays 952. Terminated fibers from the pass-through cable 933 can be spliced directly to connectorized pigtails at the splice trays 952, or can be spliced to branch cables (e.g., drop cables) routed out of the wall box 900.

By pivoting the tray mount 960, all of the trays 950, 952 can be pivoted at once to an open position where the pass-through can be readily accessed (see FIG. 13). It is also preferred for each of the trays 950, 952 to be individually pivotally moveable relative to each other. For example, the bottommost tray can be connected to the mount 960, while each subsequent stacked tray is pivotally connected to the tray beneath it. Hinge pin receivers 963 can be provided on the mount 960 and are adapted to receive corresponding pins provided on the bottommost tray. This type of arrangement facilitates accessing individual trays for splicing or cable management.

Figure 11:
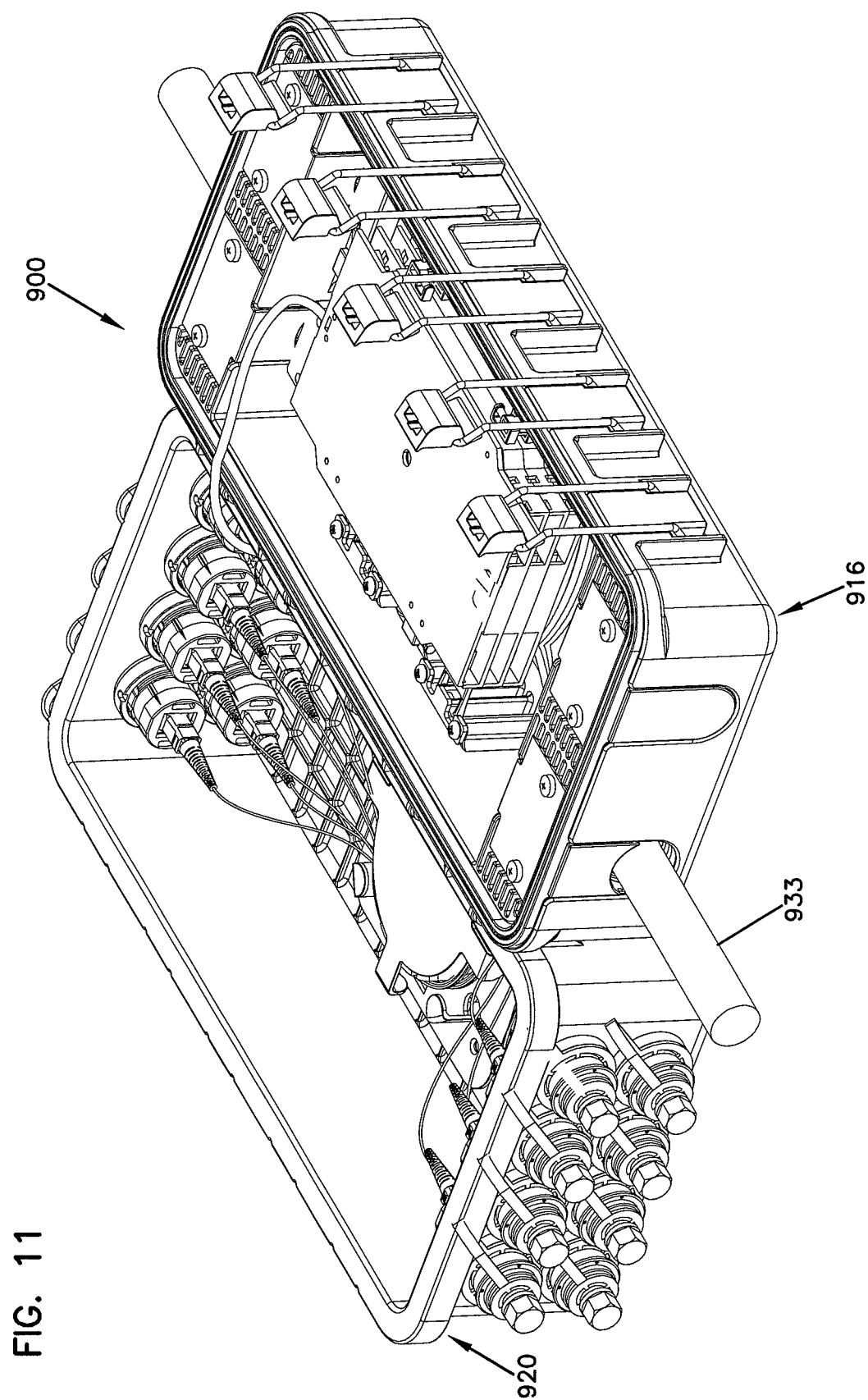
FIG. 11 is a perspective view of the wall box of FIG. 3 showing the wall box in an open configuration.
Figure 12:
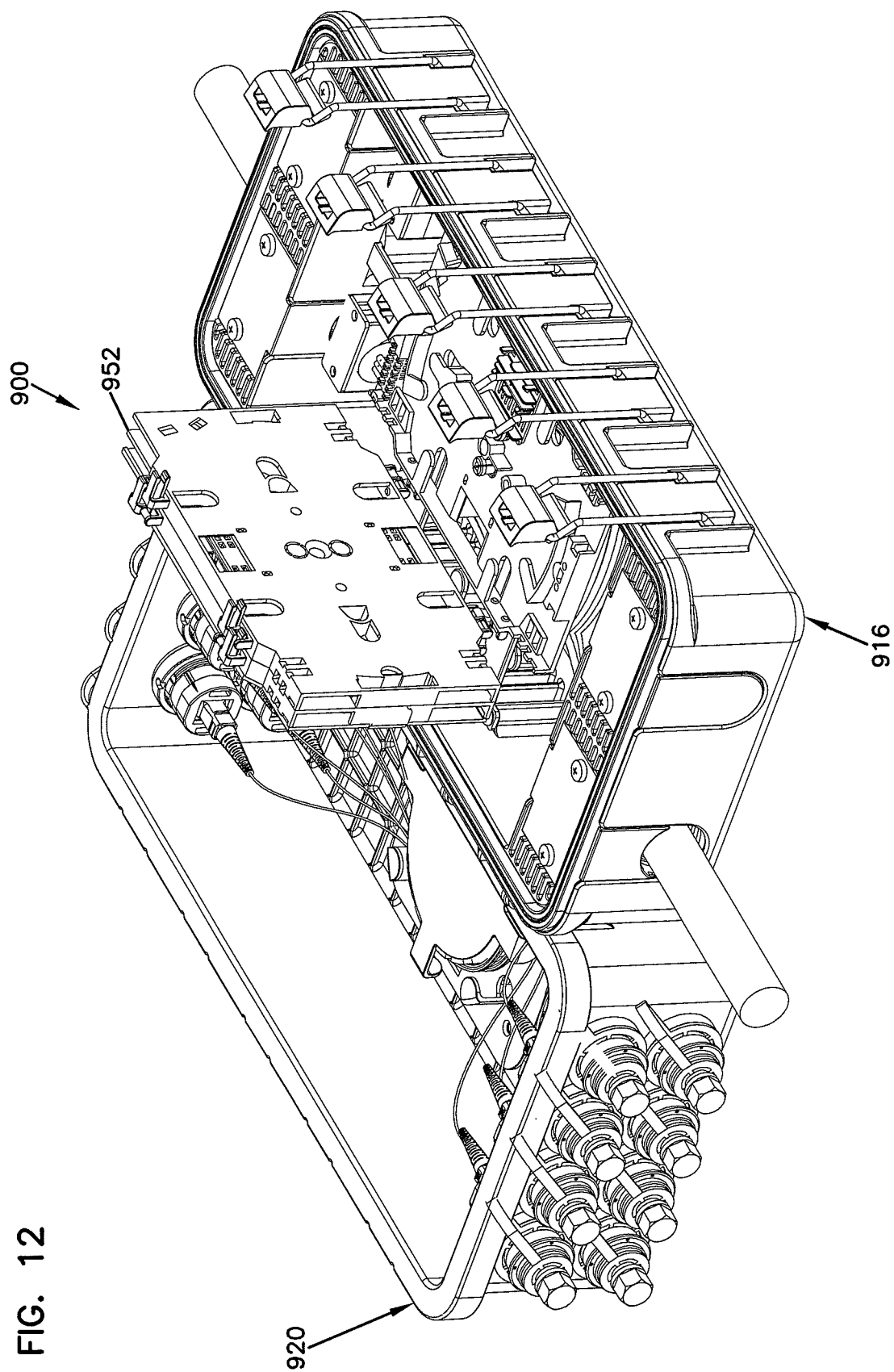
FIG. 12 shows a wall box of FIG. 11 with several splice trays pivoted outwardly.

Referring to FIGS. 11-13, the pivotal arrangement of tray 950, 952 is depicted. For example, FIG. 11 shows all of the trays pivoted to a closed position. FIG. 12 shows two of the trays pivoted to open positions while a third tray remains in a closed position. FIG. 13 shows the mount 960 pivoted to an open position in which all of the trays have been moved to a position where the pass-through cable can be readily accessed.

Referring now to FIGS. 101-105, an alternate embodiment of a tray mount 1561 suitable for use with the enclosure 902 is shown. The tray mount 1561 includes a first end portion 1562 and an oppositely disposed second end portion 1564. The first end portion 1562 includes a pin member 1566 that is adapted to be received in the pin cradles 1020 of the base 916.

The second end portion 1564 includes a plurality of resilient latches 1568. In the subject embodiment, the resilient latches 1568 extend downwardly from a top surface 1570 of the tray mount 1561. Each of the plurality of resilient latches 1568 includes a base portion 1572, which is engaged with the tray mount 1561, and a latching portion 1574. The latching portion 1574 includes a lip 1576 that extends outwardly from the latching portion 1574.

The tray mount 1561 further includes a first splice tray mounting area 1578 disposed on the top surface 1570 of the tray mount 1561. A plurality of splice tray mounts 1580 is disposed in the first splice tray mounting area 1578 and extends upwardly from the top surface 1570. In the subject embodiment, and by way of example only, there are two splice tray mounts 1580 disposed in the first splice tray mounting area 1578. Each of the splice tray mounts 1580 includes a base end 1582, which is engaged with the tray mount 1561, and a latching end 1584. The latching end 1584 includes a lip portion 1586 that extends outwardly from the latching end 1584. The lip portion 1586 is adapted for engagement with a splice tray.

In one embodiment, the tray mount 1561 includes a second splice tray mounting area 1587 disposed on a bottom surface 1590 of the tray mount 1561. In the depicted embodiment of FIG. 126, a splitter tray 1592 having a splitter mounted thereon is disposed in the second splice tray mounting area 1587 of the bottom surface 1590 while a splice tray stack 1800 is disposed in the first splice tray mounting area 1578 of the top surface 1570.

Figure 106:
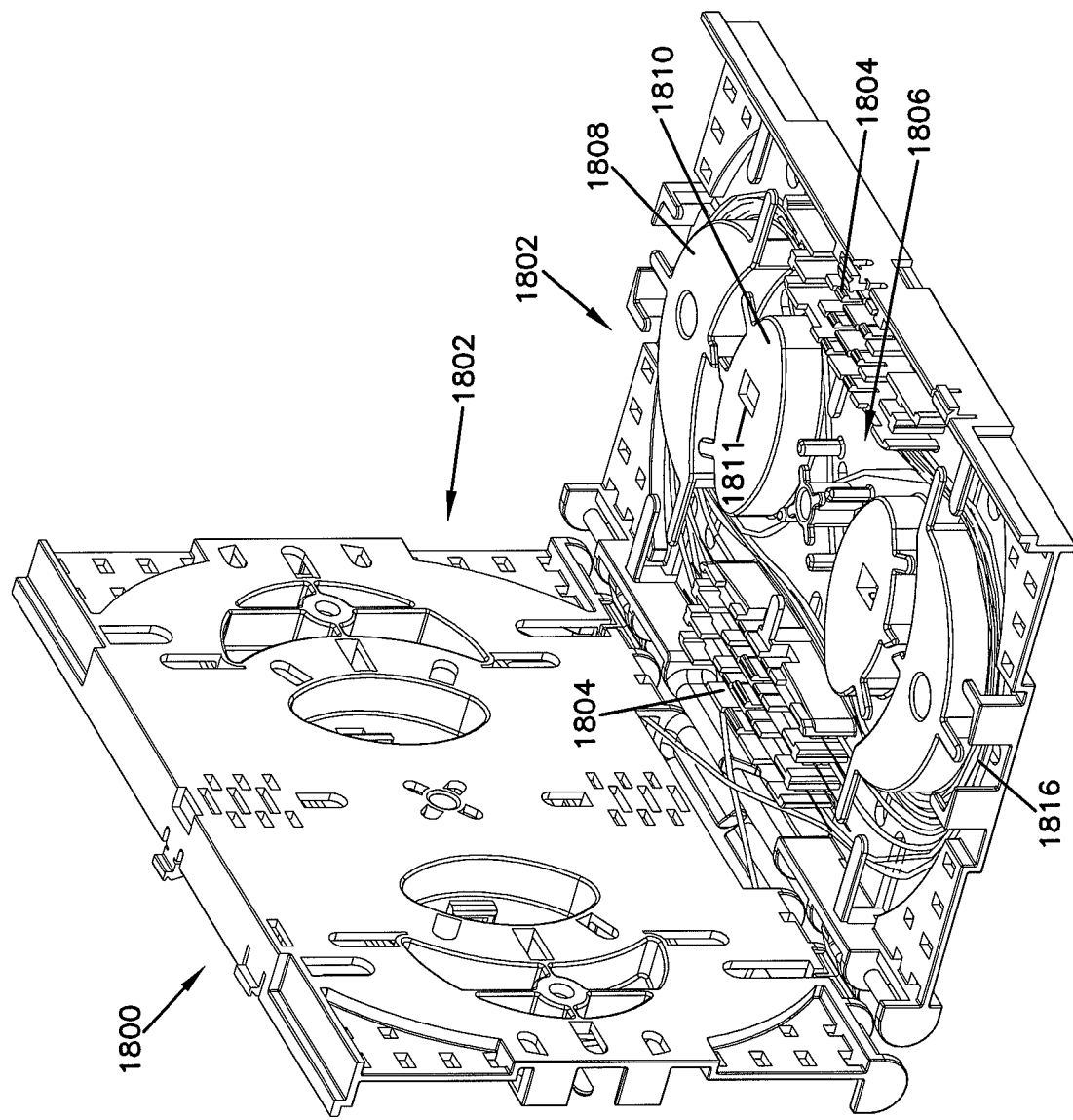
FIGS. 106-107 show various views of a splice tray stack suitable for use with the tray mount of FIGS. 101-105.
Figure 107:
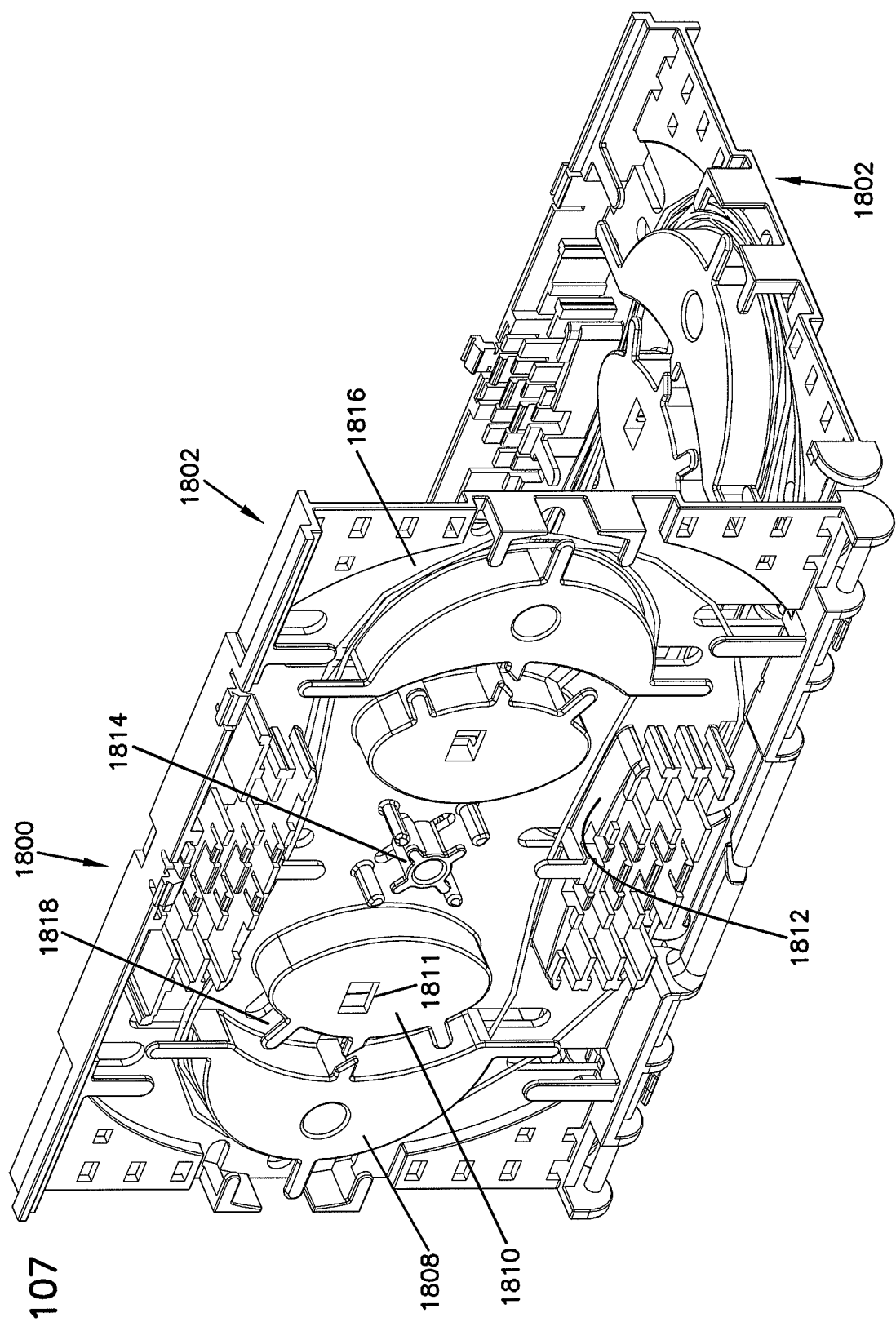
Figure 108:
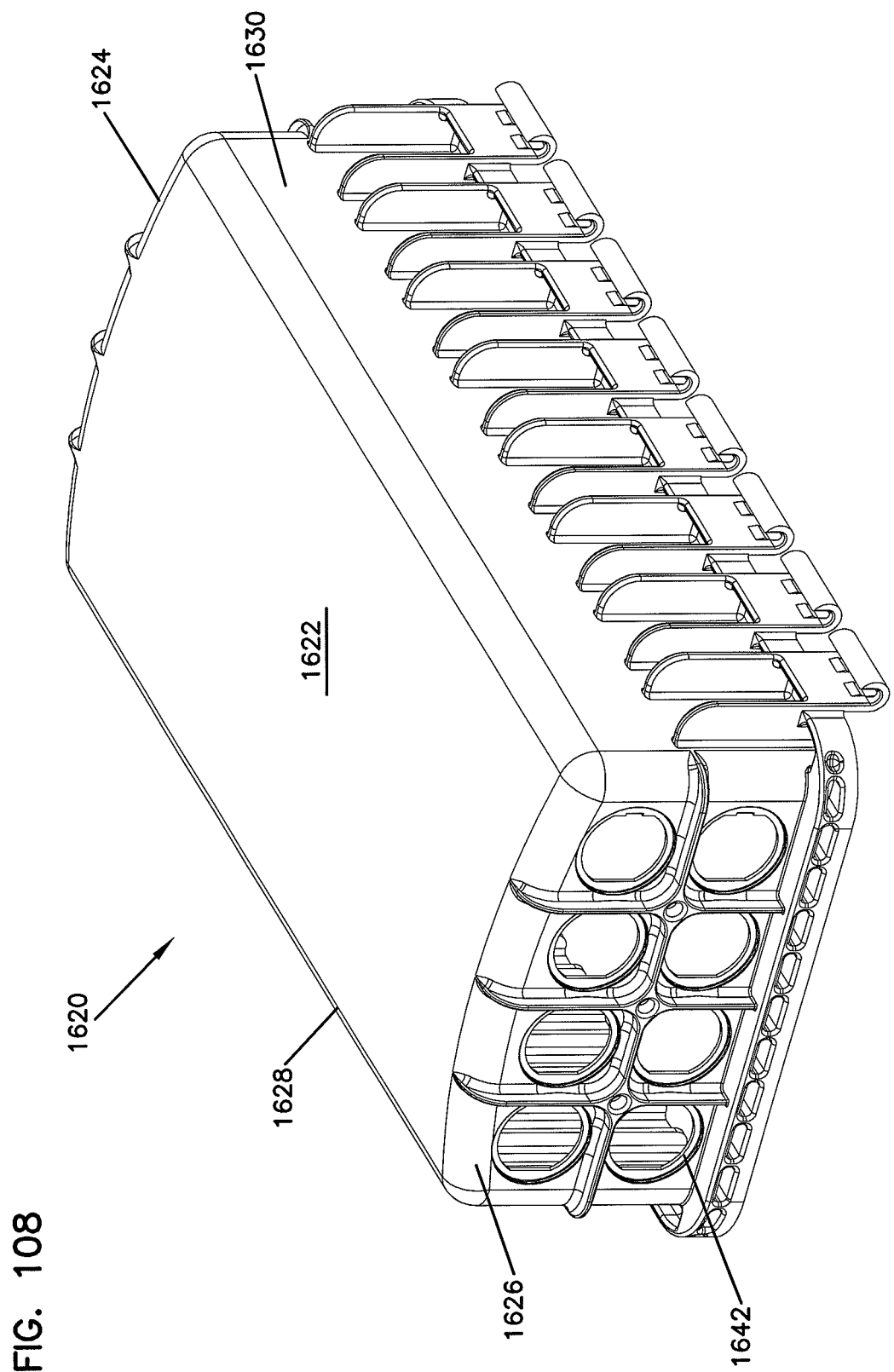
FIGS. 108-114 show various views of an alternate embodiment of a cover suitable for use with the wall box of FIG. 3.
Figure 109:
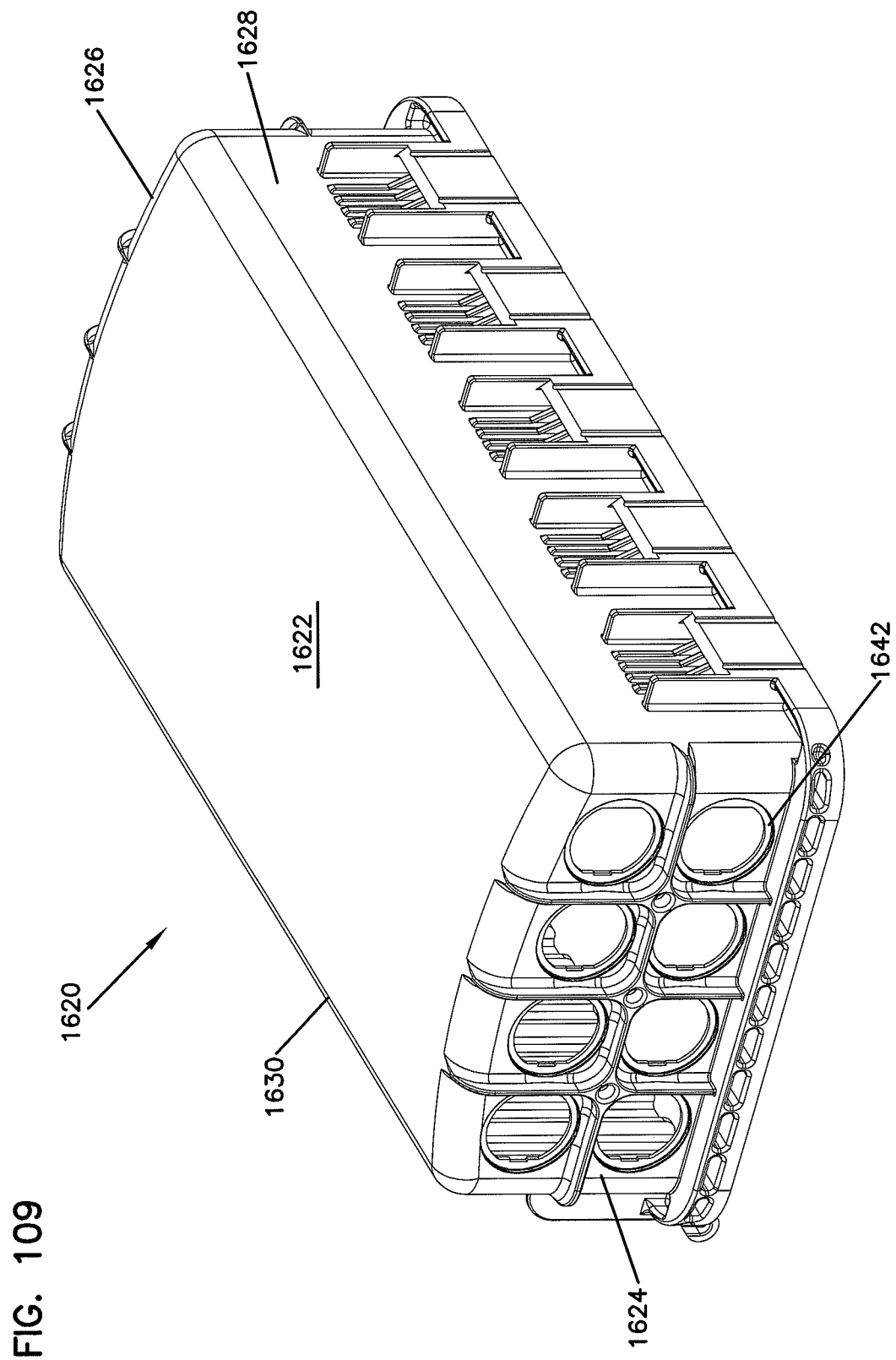
Figure 110:
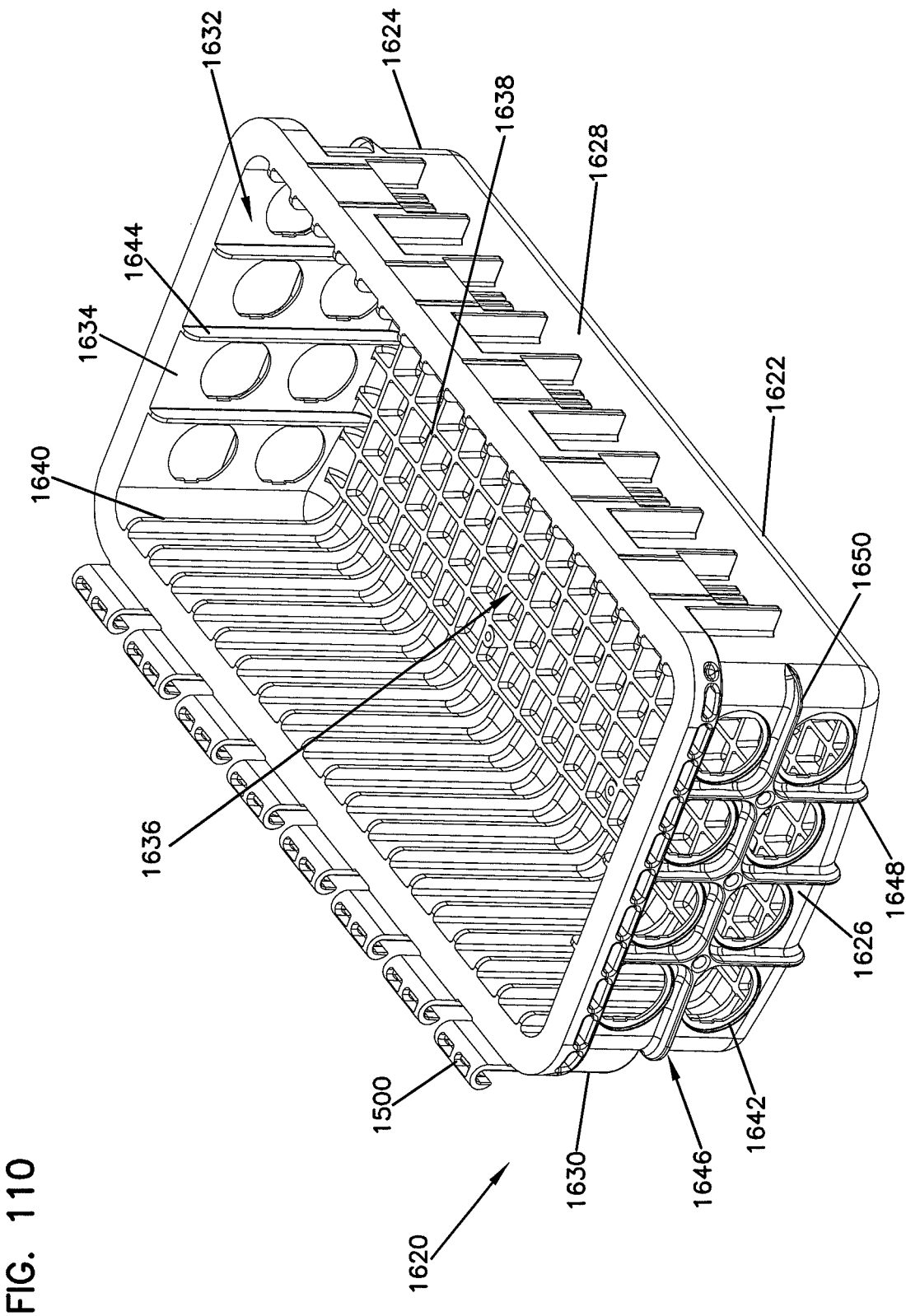
Figure 111:
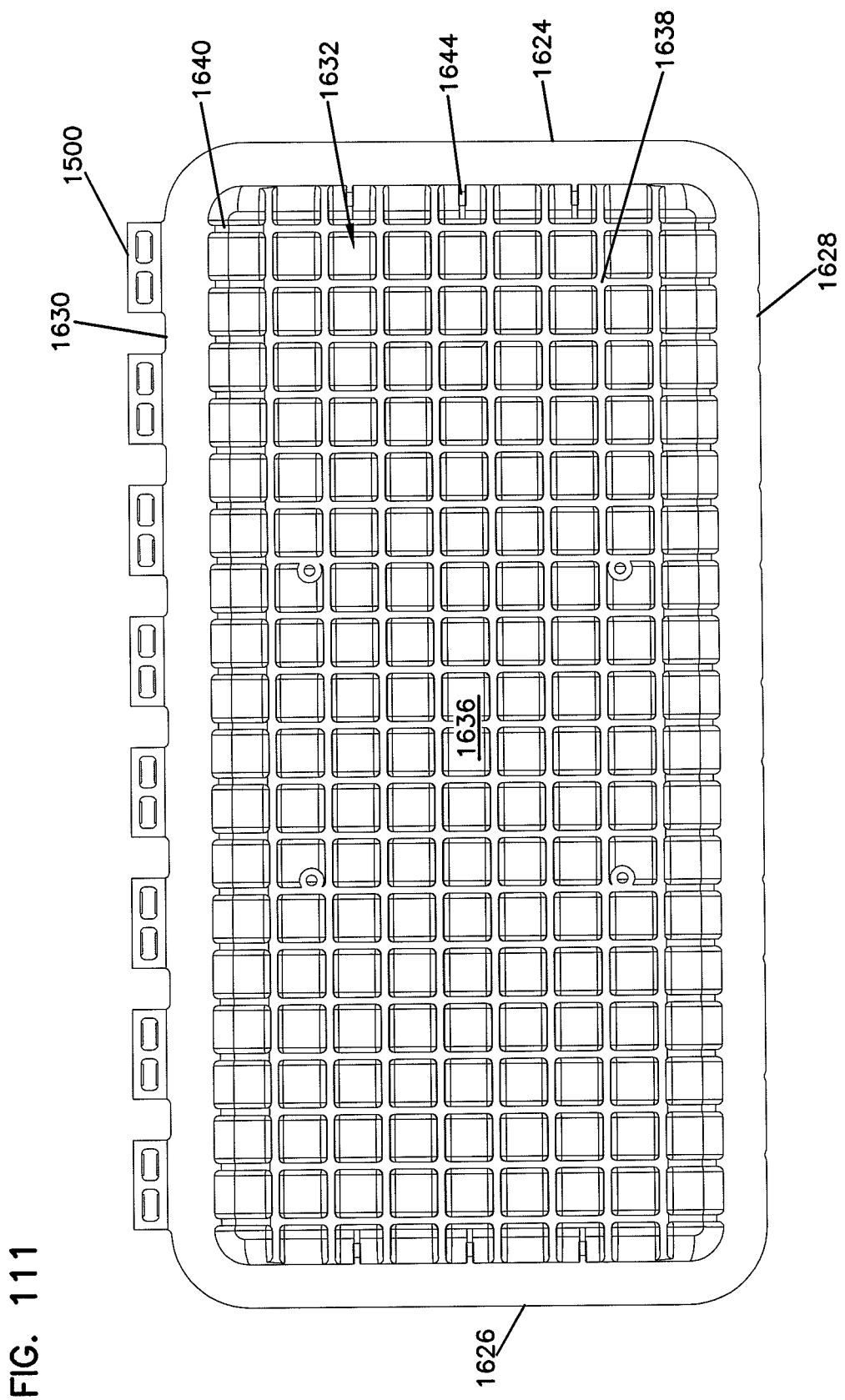
Figure 112:
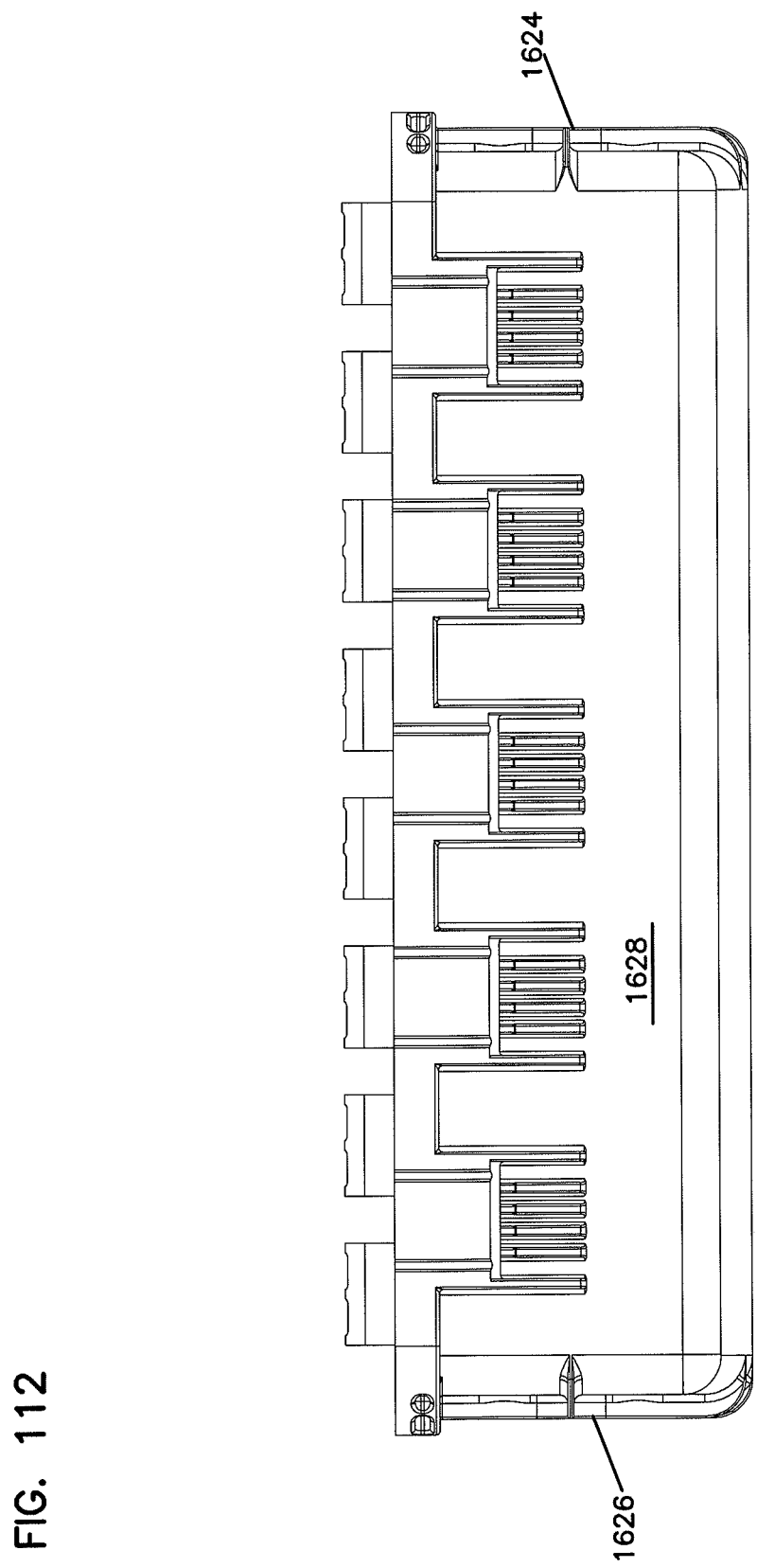
Figure 113:
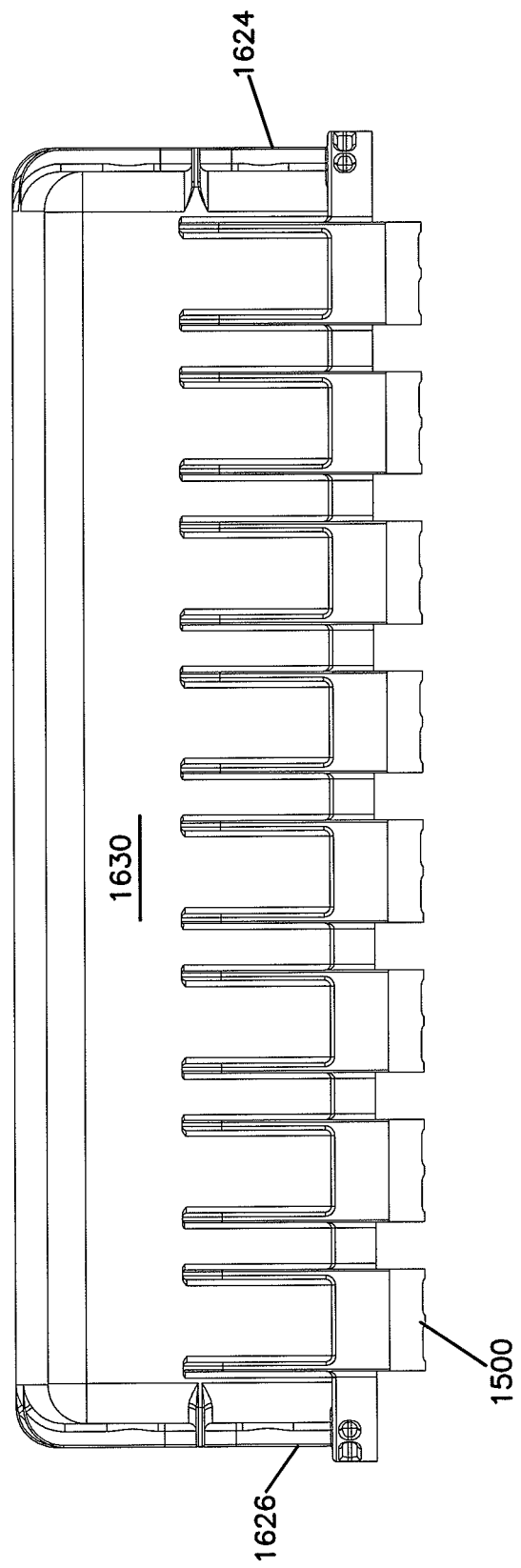
Figure 114:
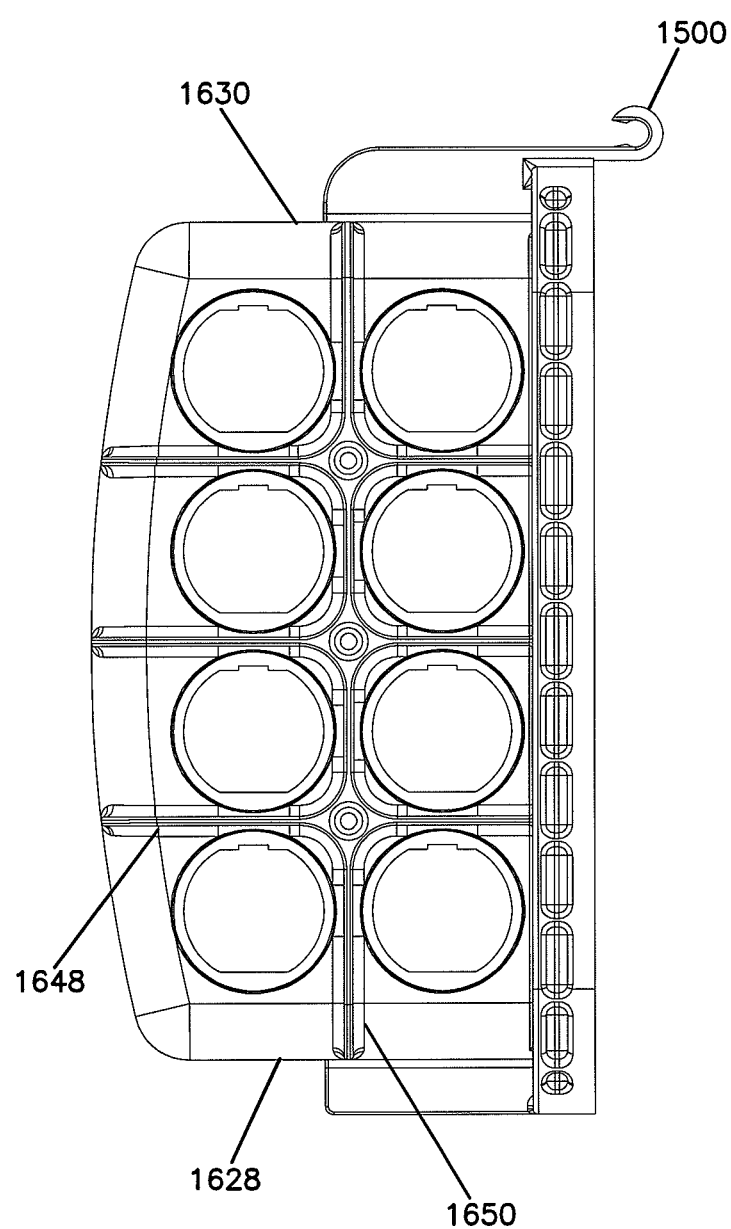
Figure 115:
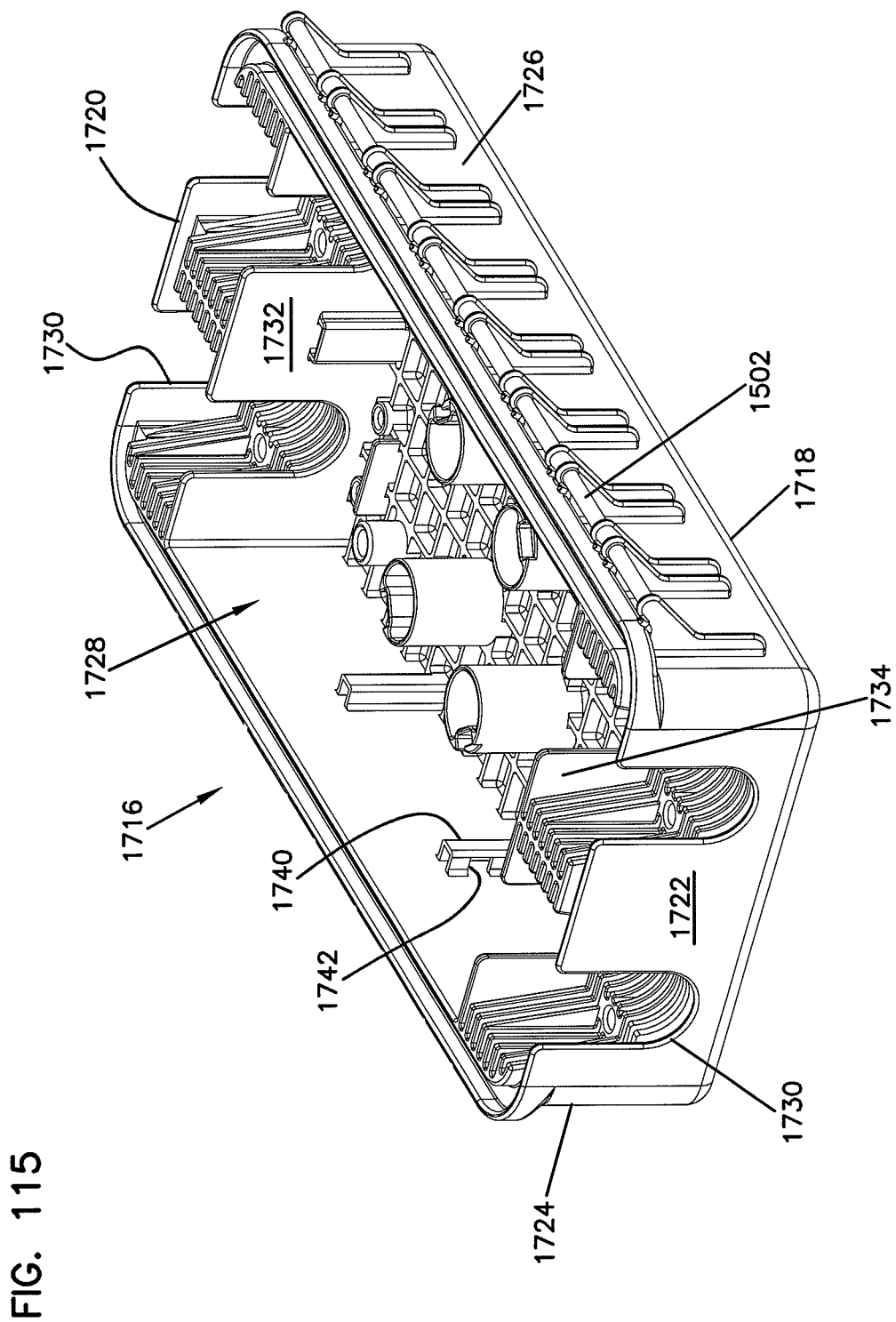
FIGS. 115-121 show various views of an alternate embodiment of a base suitable for use with the wall box of FIG. 3.
Figure 116:
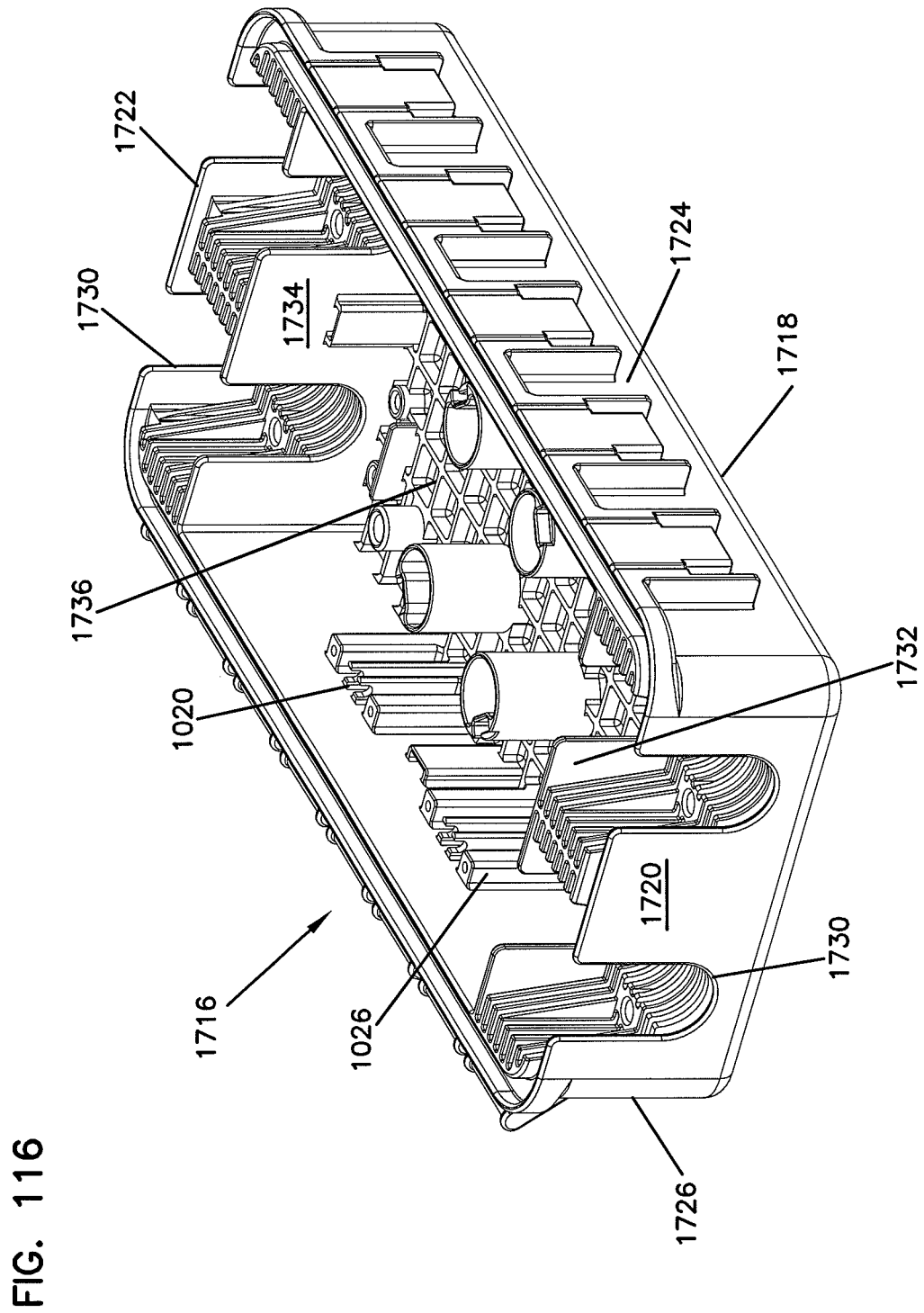
Figure 117:
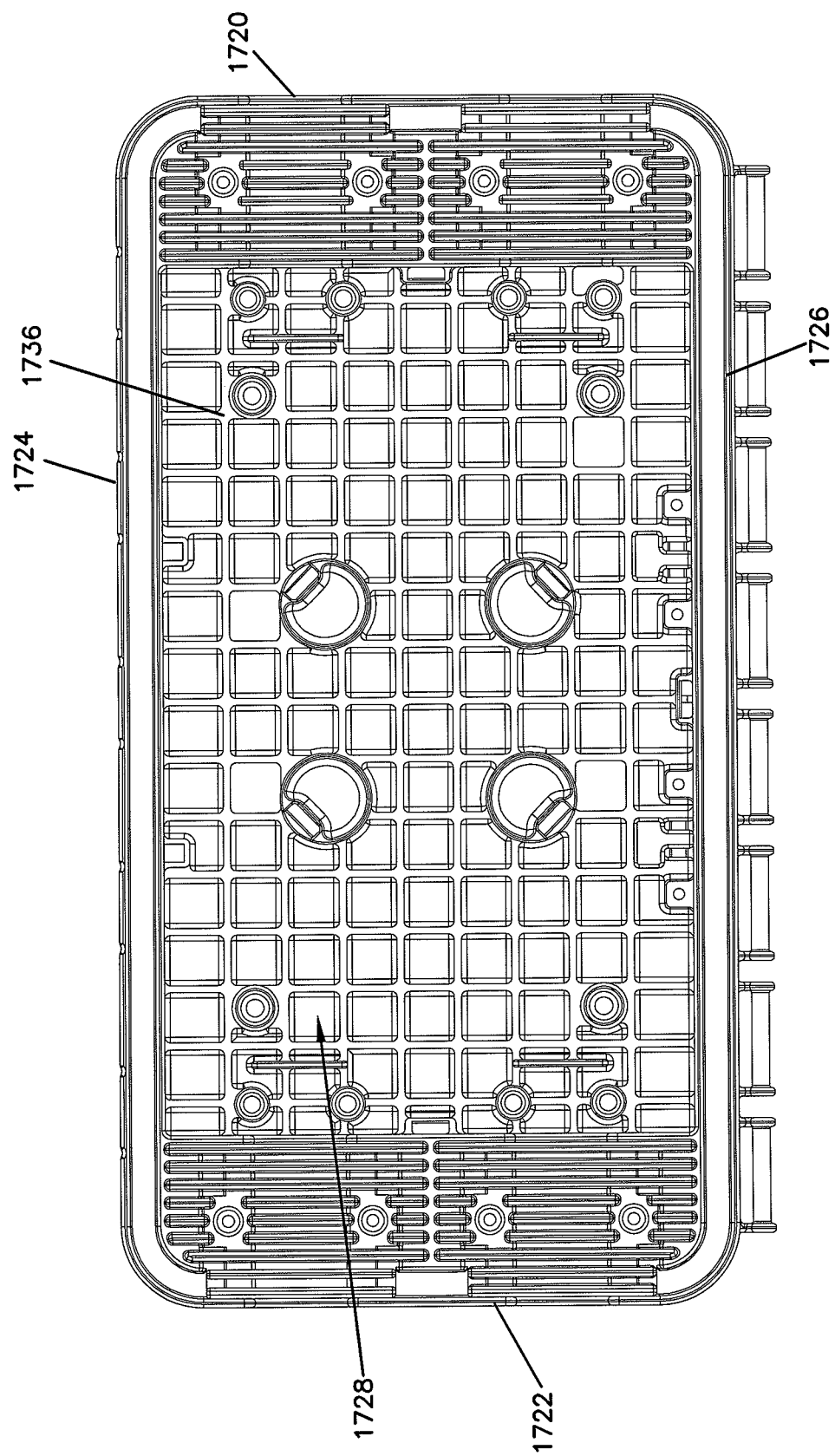
Figure 118:
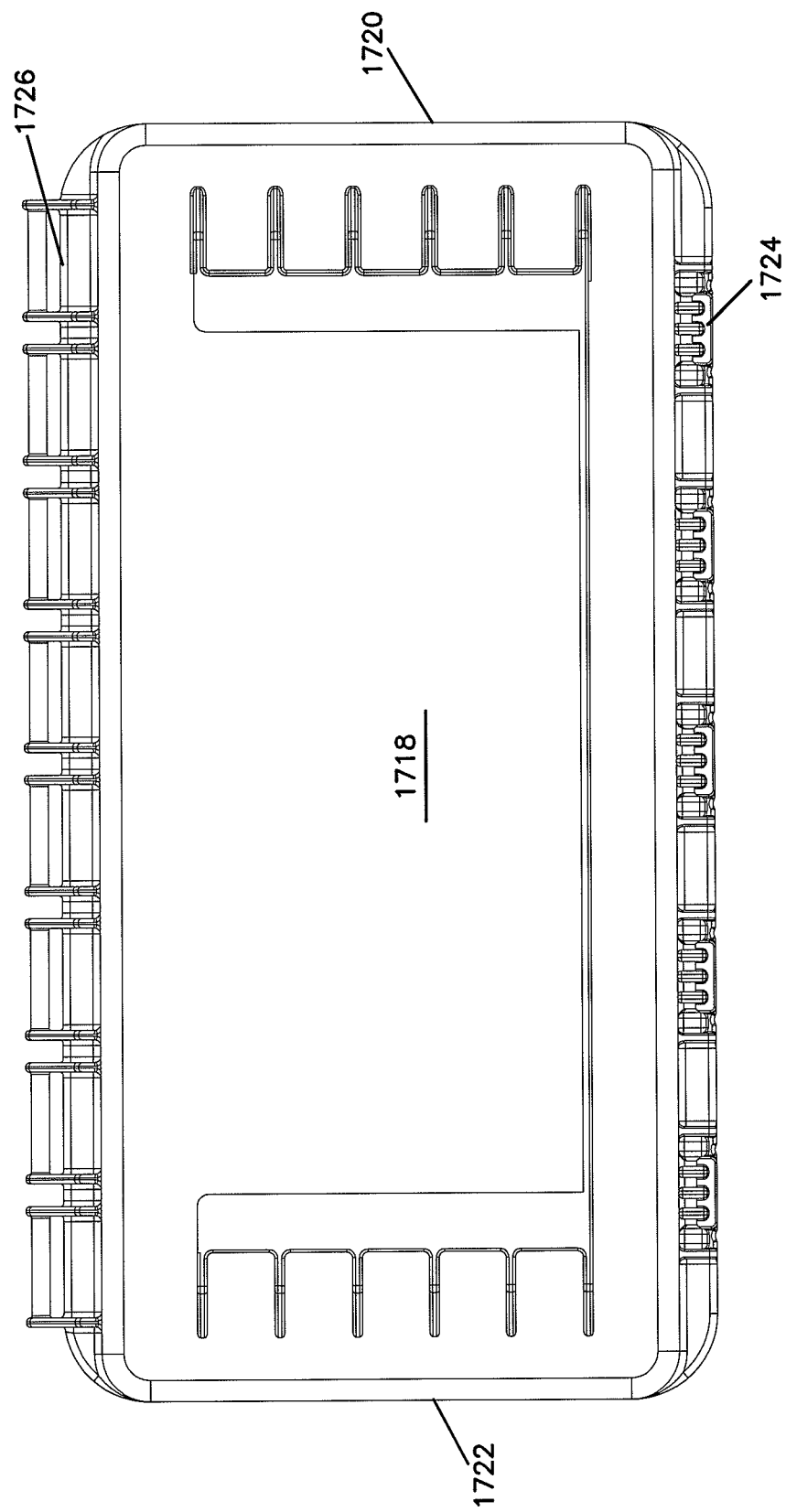
Figure 119:
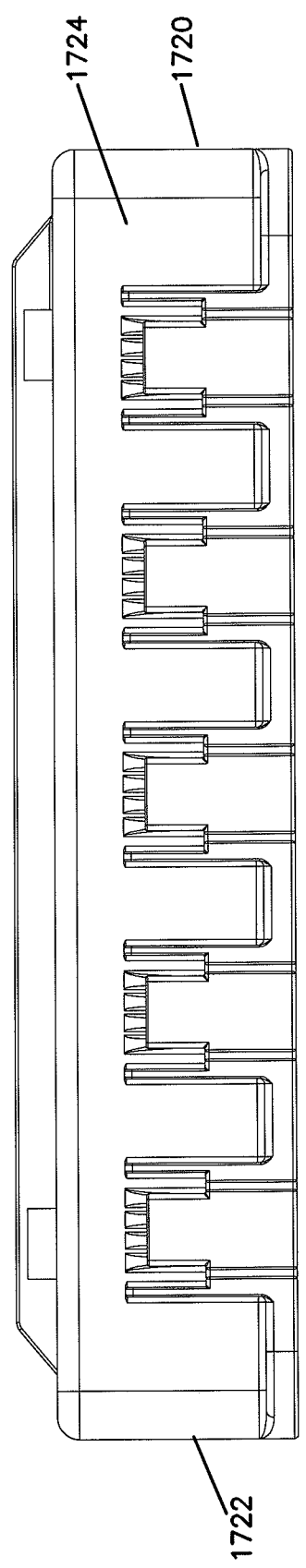
Figure 120:
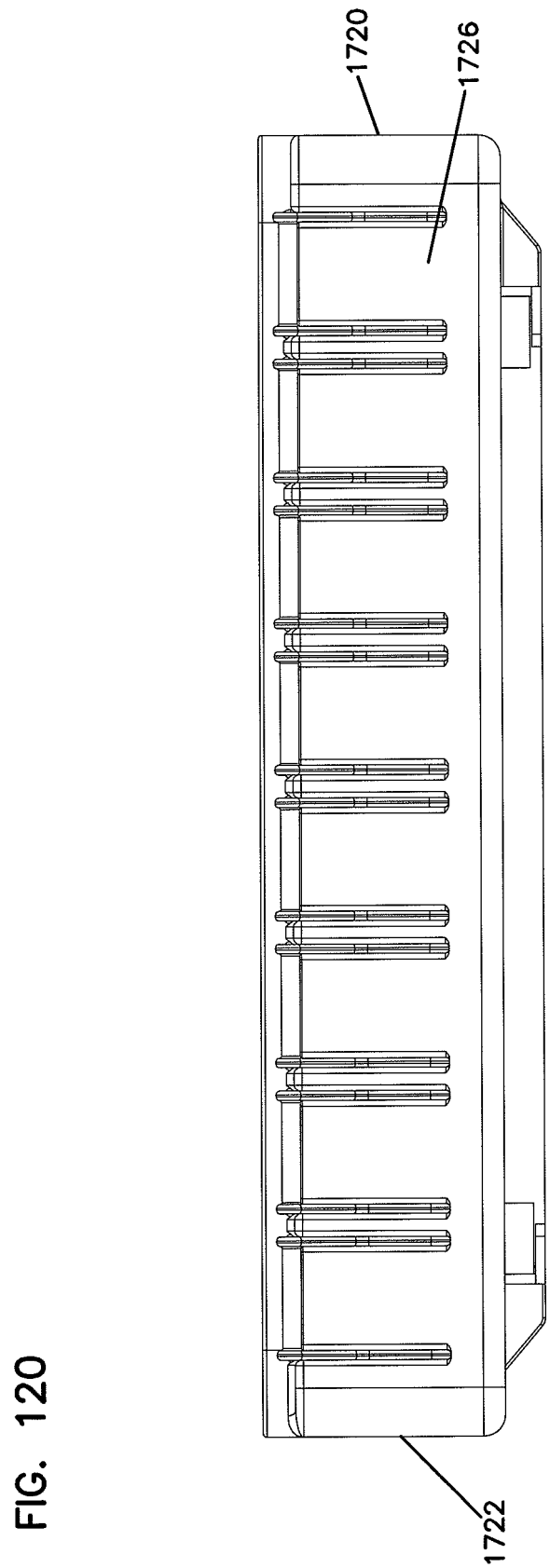
Figure 121:
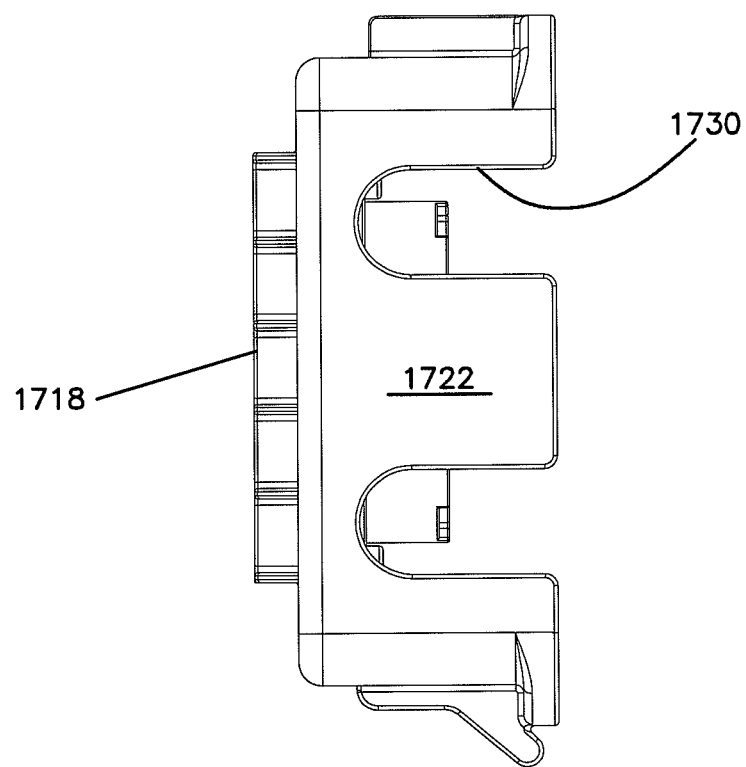

Referring now to FIGS. 106 and 107, the splice tray stack 1800 suitable for use with the tray mount 1561 is shown. In the subject embodiment, the splice tray stack 1800 includes two splice trays 1802 that mount to the tray mount 1561. The splice trays 1802 include two splice mounting locations 1804. A fiber storage region 1806 for storing fibers is generally disposed between the two splice mounting locations 1804. The fiber storage region 1806 includes two spaced apart half spools 1808 about which excess fiber can be spooled. The fiber storage region also includes two full spools 1810 positioned in an area defined between the two half spools 1808. Each of the two full spools 1810 includes a catch 1811. Each catch 1811 is adapted to receive one of the lip portions 1586 of the latching ends 1584 of the splice tray mounts 1580 of the tray mount 1561. The fiber storage region 1806 further includes curved fiber guides 1812 located at inside edges of each of the splice mounting locations 1804. The fiber storage region 1806 further includes a central bend radius limiter 1814 positioned between the two full spools 1810.

The half spools 1808 define an outer fiber storage loop path 1816 that extends around exterior surfaces of the half spools 1808 and also extends along the fiber guides 1812 positioned adjacent the splice mounting locations 1804. The full spools 1810 define an inner loop path 1818 that extends around exterior surfaces of the full spools 1810.

The splice tray stack 1800 and the splice trays 1802 have been further described in U.S. Pat. Nos. 7,970,249; 8,009,954; and 8,554,044, the disclosures of which are hereby incorporated by reference in their entirety.

Referring back to FIG. 5, the inserts 935, 937 are configured to nest within the cable exit/enter openings 932. The insert 935 has a lower portion 990 having a convex groove and rail arrangement 1250 that mates/intermeshes with a corresponding concave groove and rail arrangement 1252 defined by the base 916 at the cable exit/enter openings 932. The insert 937 has a concave groove and rail arrangement 991 that cooperates with the concave groove and rail arrangement 1252 of the cable exit/enter openings 932 so as to clamp jacketed portions of the pass-through cable in place relative to the enclosure 902 when the insert is fastened to the base 916. Tape or other material can be wrapped about the portion of the cable 933 (e.g., around the jacket) that passes through the cable exit/enter opening 932 to provide a better environmental seal.

The inserts 935, 937 also define fastener openings 987 for receiving the fasteners 939. The fastener openings 987 are defined through projecting portions 994 of the inserts 935, 937. The projecting portions 994 project outwardly from main bodies of the inserts 935, 937 and fit within corresponding receptacles or channels 1254 provided at the cable exit/enter openings 932 to facilitate aligning the inserts within the openings 932. The main bodies of the inserts 935, 937 have tapered configurations that match corresponding tapers of the cable exit/enter openings 932. In contrast the projecting portions 994 and their corresponding channels 1254 are not tapered.

Figure 24:
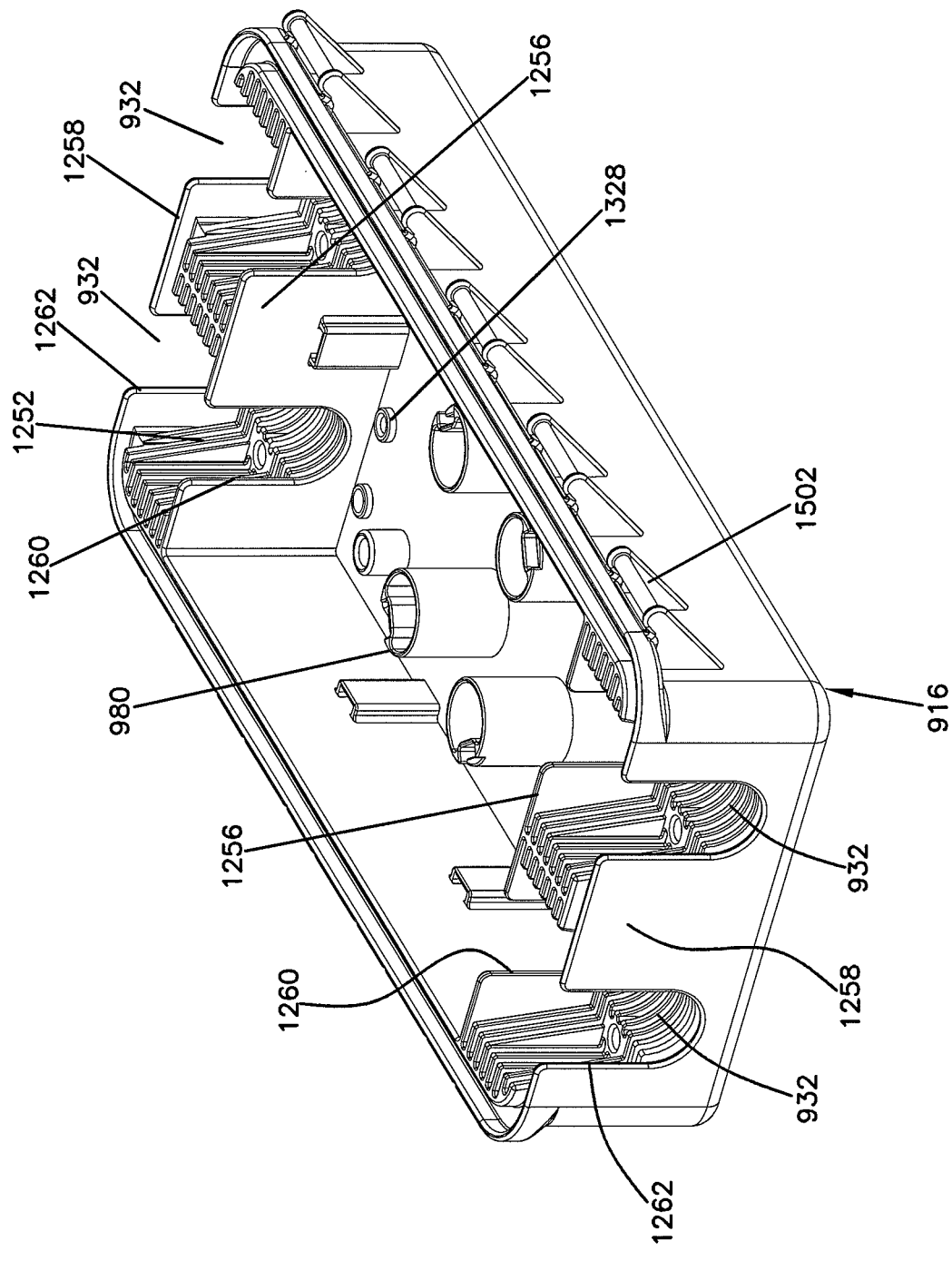
FIG. 24 is a perspective view of a base of the wall box of FIG. 3.
Figure 25:
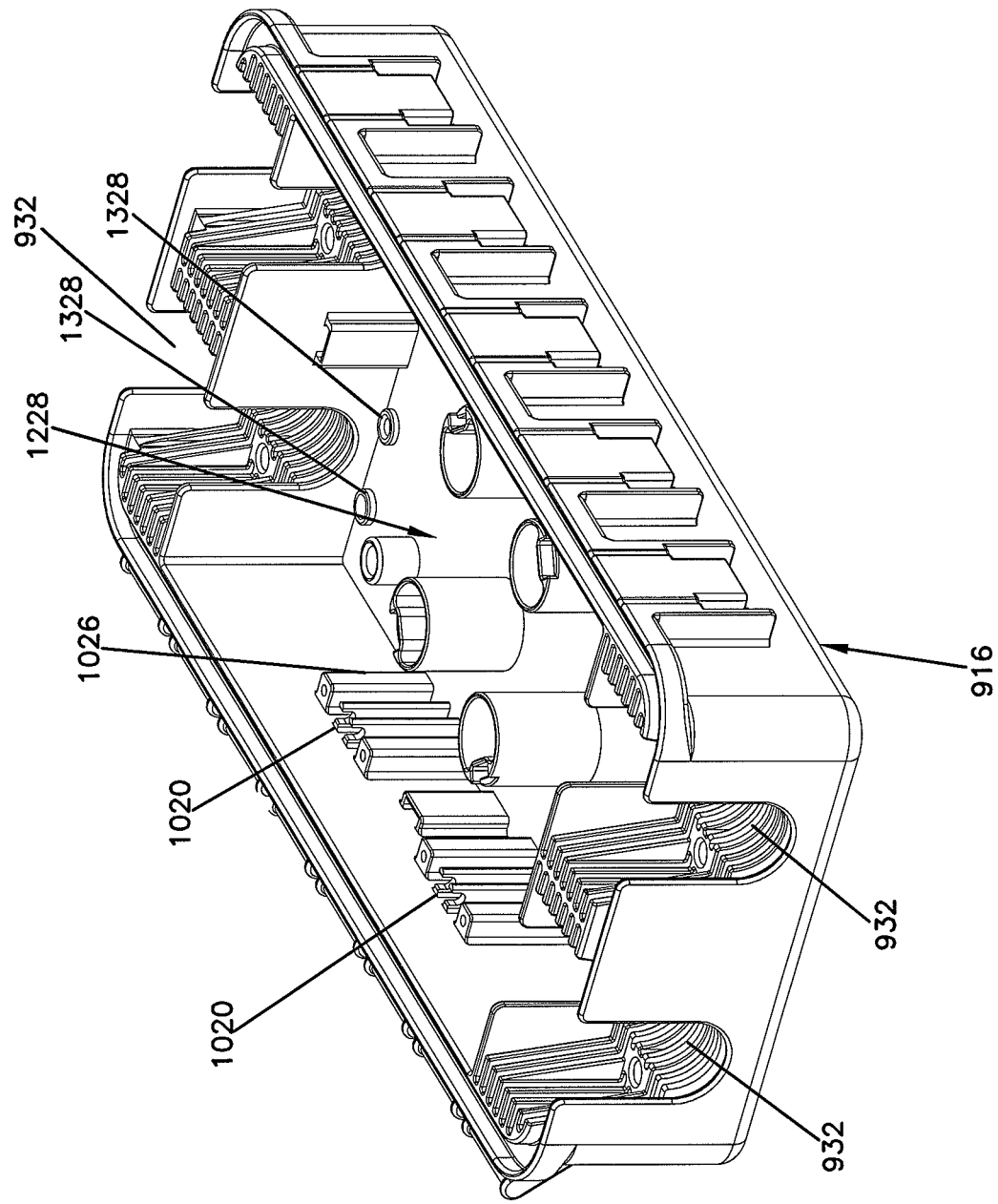
FIG. 25 is a back view of the base of FIG. 24.
Figure 26:
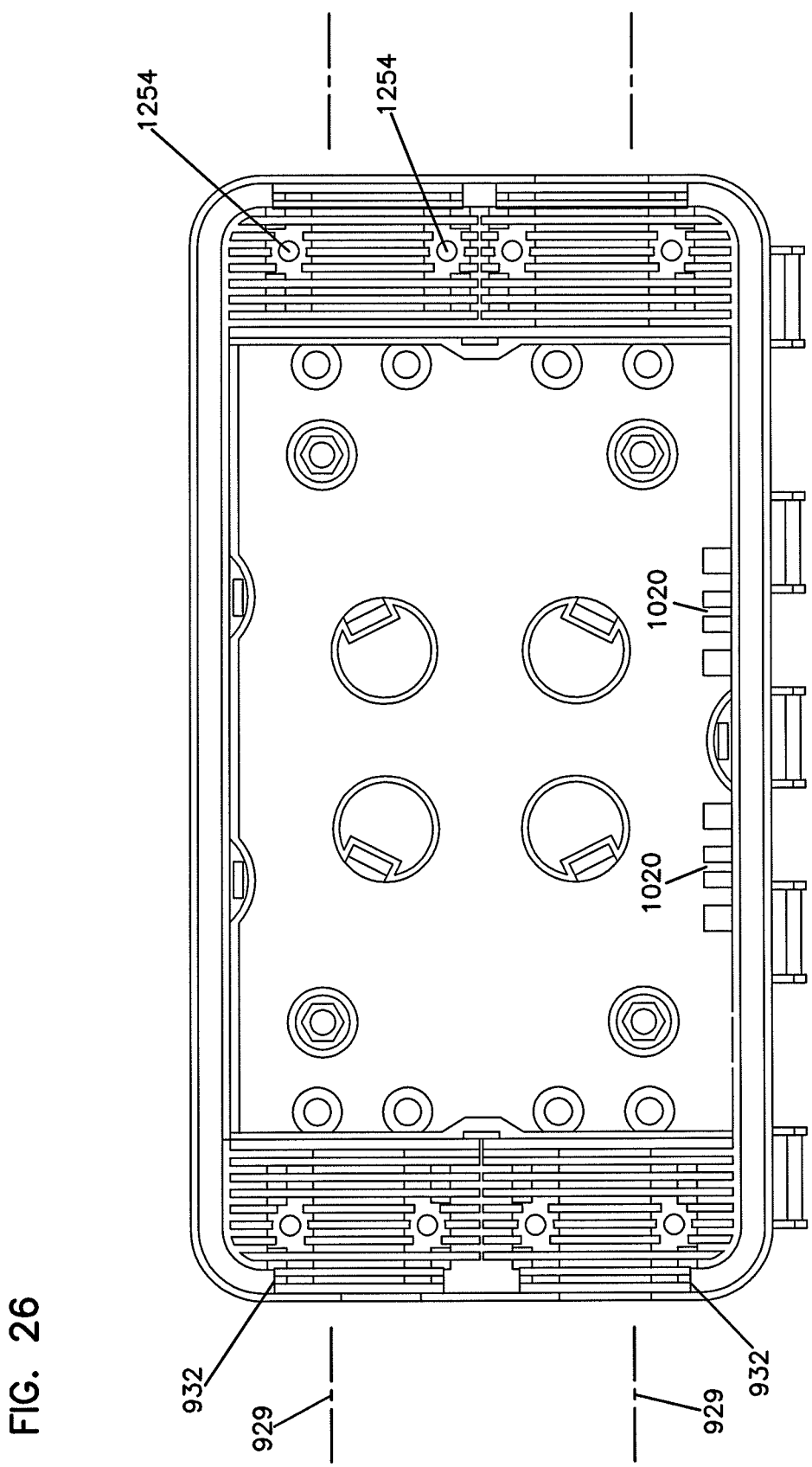
FIG. 26 is a top view of the base of FIG. 24.
Figure 27:
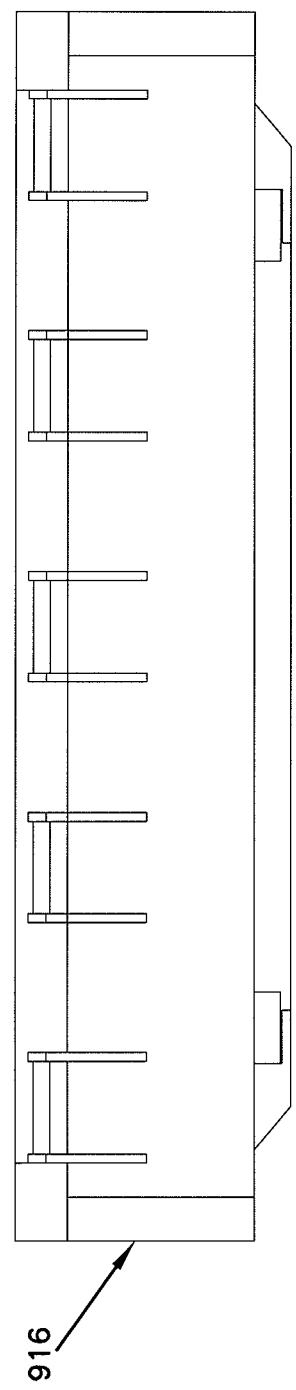
FIG. 27 is a bottom view of the base of FIG. 24.
Figure 28:
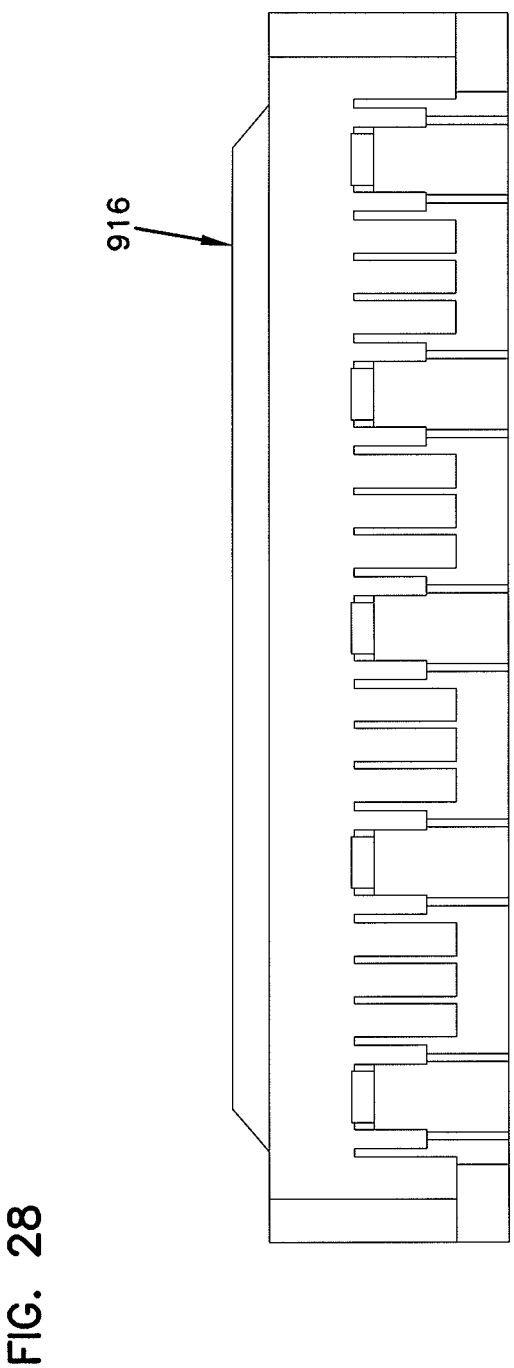
FIG. 28 is a right, end view of the base of FIG. 24.
Figure 29:
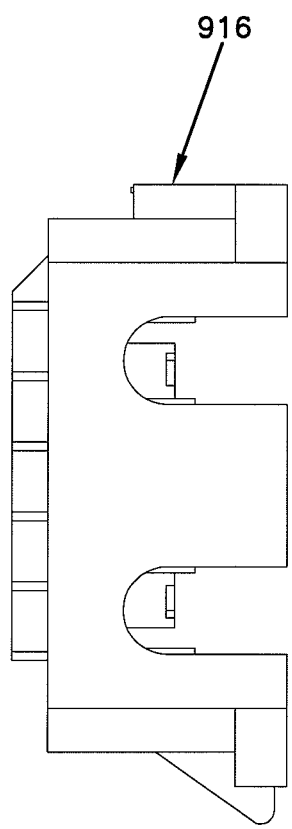
FIG. 29 is a left, end view of the base of FIG. 24.
Figure 30:
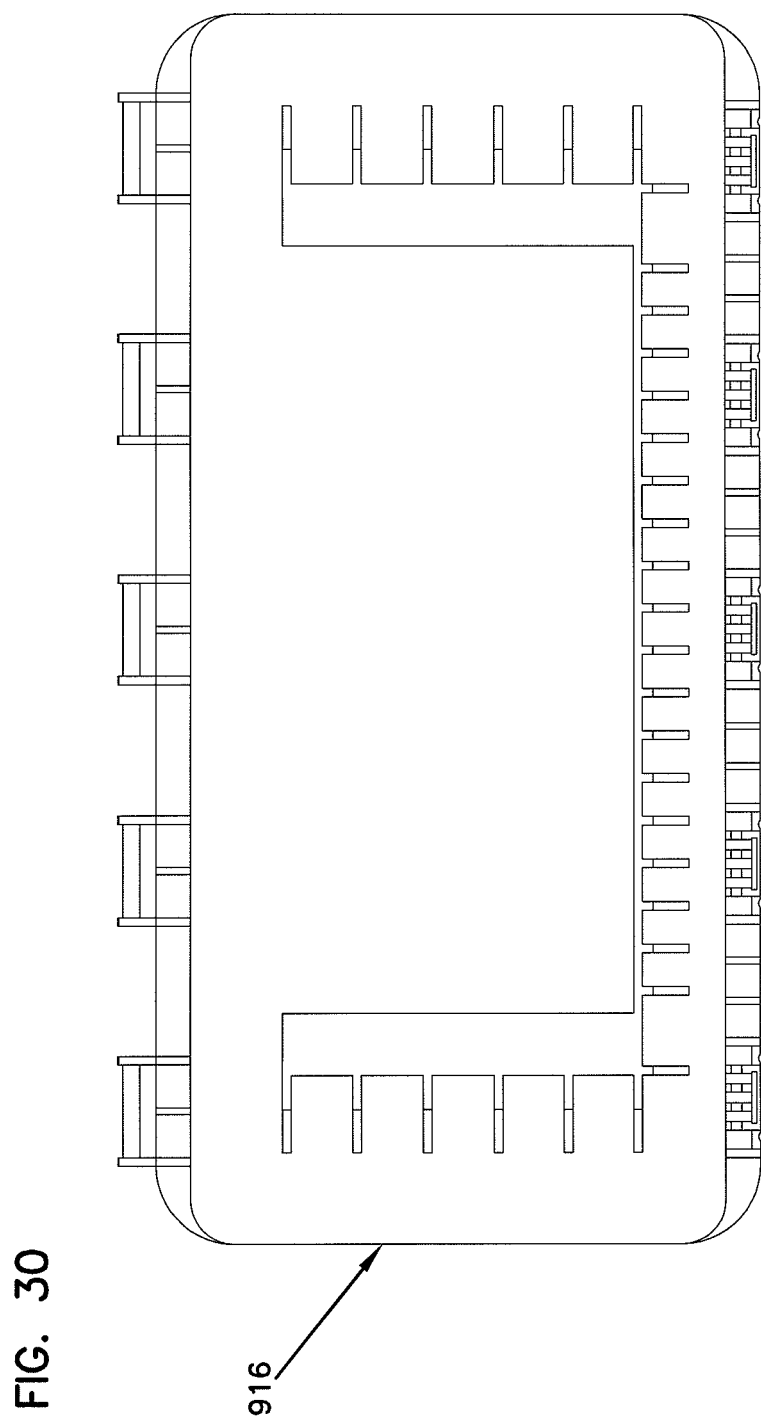
FIG. 30 is a front view of the base of FIG. 24.
Figure 31:
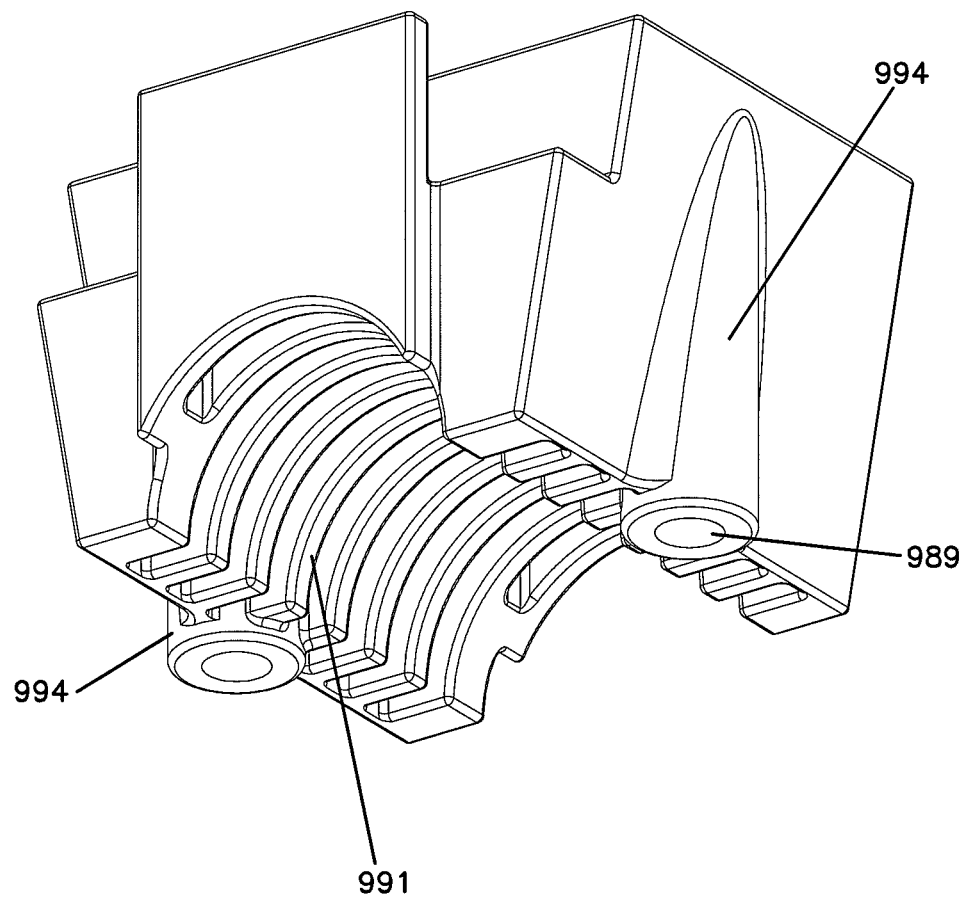
FIGS. 31-37 show various views of a cable pass-through insert used with the wall box of FIG. 3.
Figure 32:
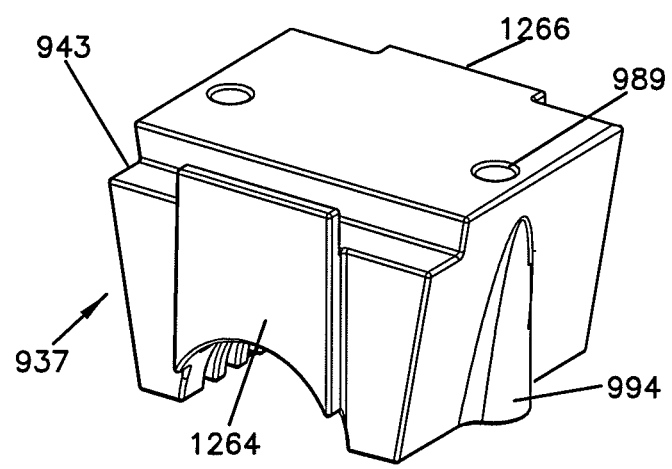
Figure 33:
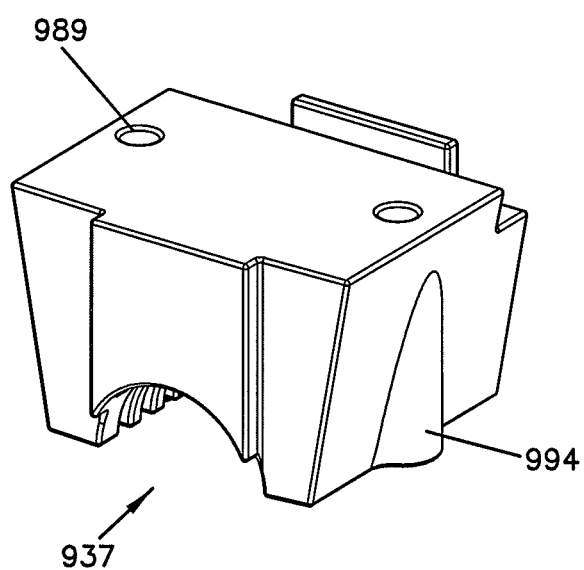
Figure 34:
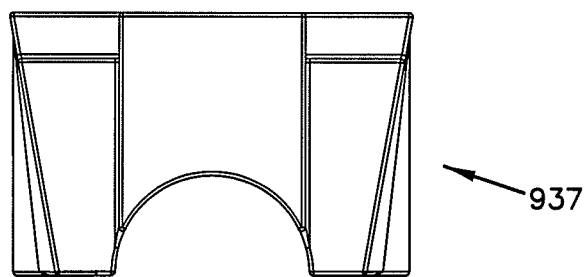
Figure 35:
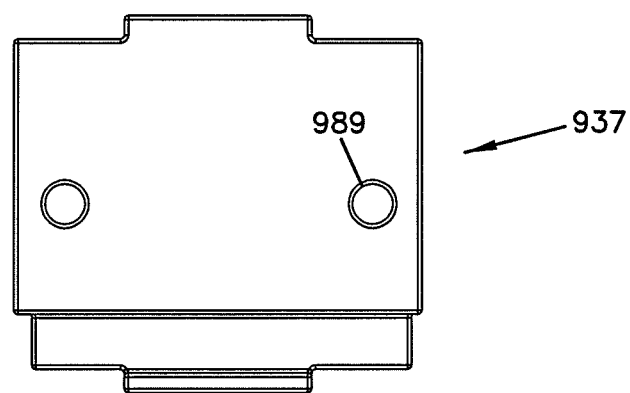
Figure 36:
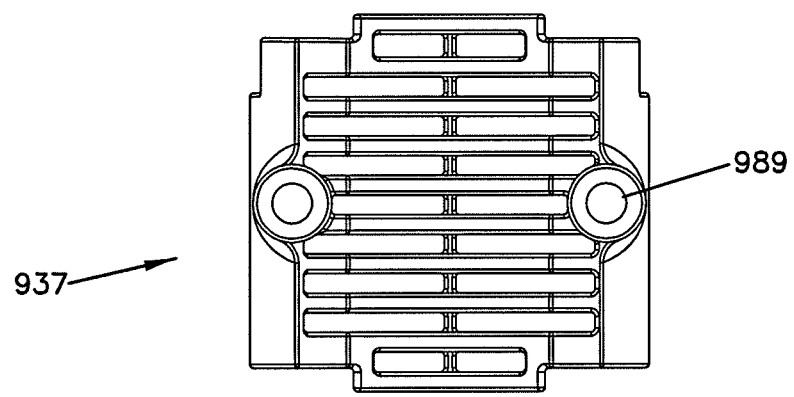
Figure 37:
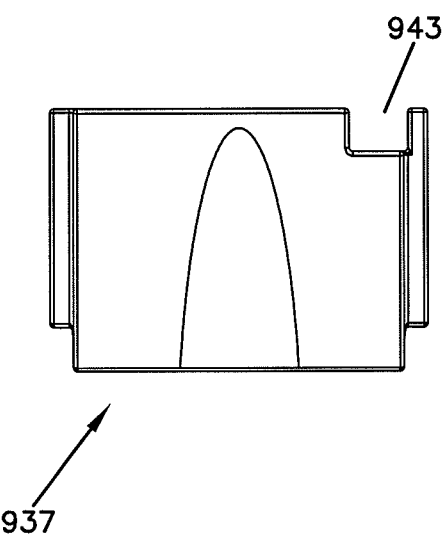
Figure 38:
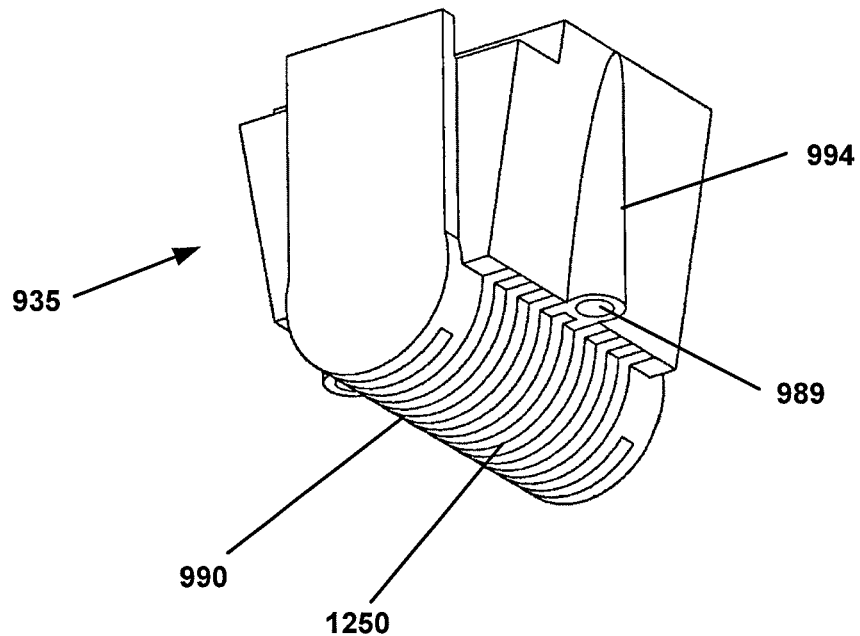
FIGS. 38-44 show various views of a cable pass-through plug used with the wall box of FIG. 3.
Figure 39:
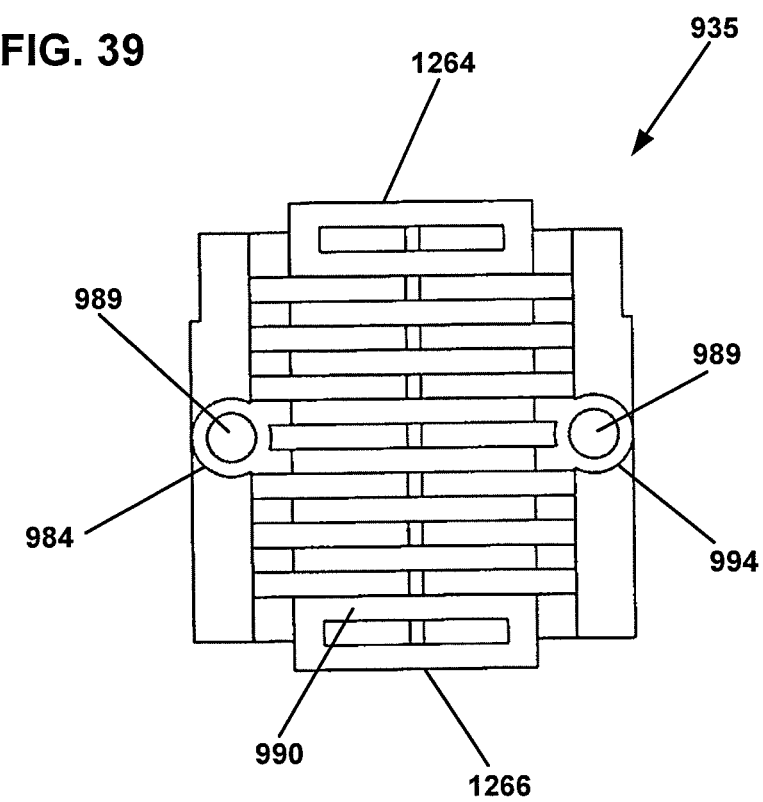
Figure 40:
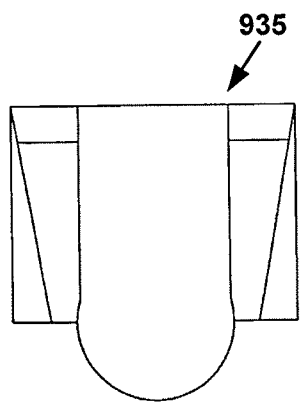
Figure 41:
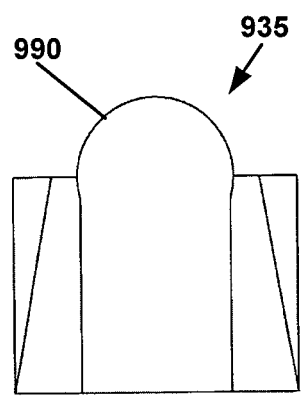
Figure 42:
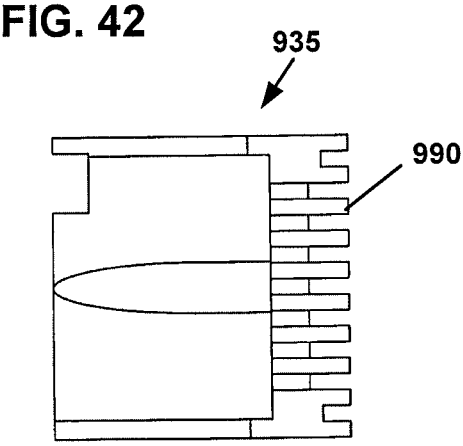
Figure 43:
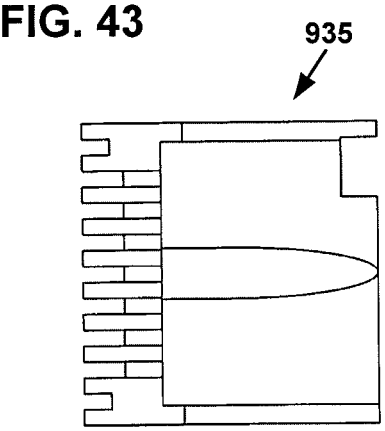
Figure 44:
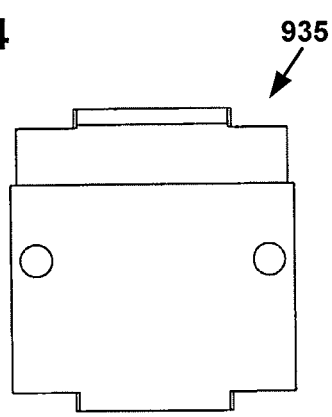

As shown at FIGS. 24 and 25, the base 916 includes sets of inner and outer end walls 1256, 1258 between which the inserts 935, 937 mount.

Walls 1256, 1258 define notches 1260, 1262 aligned with the cable exit/enter openings 932. The inserts 935, 937 include inner and outer end projections 1264, 1266 that fit within the notches 1260, 1262 of the inner and outer walls 1256, 1258. The projections 1264, 1266 are shaped to generally complement the shapes of the notches 1260, 1262.

Figure 10:
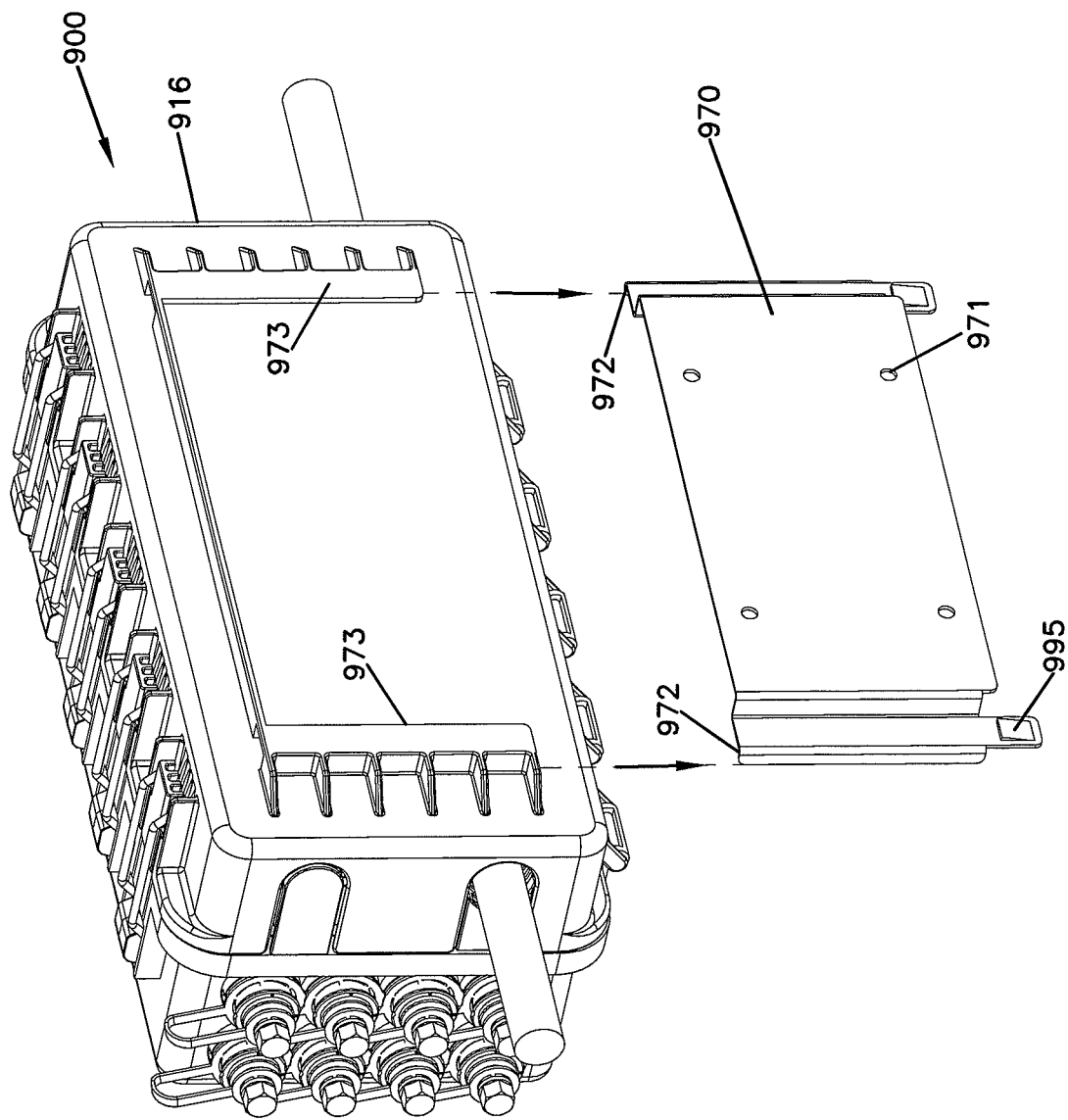
FIG. 10 is a back view of the wall box of FIG. 3 shown in combination with a wall mounting bracket.

As shown in FIG. 10, the base 916 is configured to interconnect with a mounting bracket 970 that facilitates mounting the enclosure 902 to a structure such as a wall or pole. The mounting bracket has fastener openings 971 for allowing the bracket 970 to be pre-mounted to a structure such as a wall or pole. The mounting bracket 970 also includes a pair of end portions 972 that fit within slots 997 defined by rails 973 provided on the base 916 of the enclosure 902 to secure the enclosure 902 to the bracket 970. In use of the assembly, the bracket 970 is pre-mounted to the pole or wall. Next, the enclosure 902 is positioned above the bracket 970 with the slots 997 in alignment with the end portions 972. The enclosure is then moved downwardly such that the end portions 972 slide within the slots 997 providing a connection between the bracket 970 and the enclosure 902. Tabs 995 provided on the bracket 970 engage the bottom ends of the rails 973 when the enclosure 902 is fully engaged with the bracket 970. In certain embodiments, the tabs 995 can snap within openings defined by the enclosure 902 or otherwise provide a snap-fit connection with the enclosure to provide a more secure connection between the bracket 970 and the enclosure 902.

FIGS. 17-23 show the cover 920 in isolation from the base 916. The cover is generally rectangular and has an open interior to allow pigtails to be readily routed to the adapters 514. Integral hinge hooks 1500 are provided at one side of the cover 920 while latch mounts are provided at the opposite side of the cover. In certain embodiments, cable management structures such as spools can be provided within the interior of the cover.

FIGS. 108-114 show an alternate embodiment of a cover 1620 suitable for use with the enclosure 902. The cover 1620 includes a front side 1622, a first wall 1624, an oppositely disposed second wall 1626, a first side 1628 and an oppositely disposed second side 1630. The first and second walls 1624, 1626 and the first and second sides 1628, 1630 are arranged in a generally rectangular configuration. In the subject embodiment, the front side 1622 is generally arcuate in shape.

The front side 1622, the first and second walls 1624, 1626, and the first and second sides 1628, 1630 cooperatively define an interior 1632 having an opening 1634. In the subject embodiment, an inner surface 1636 of the front side 1622 includes a plurality of ridges 1638 disposed in a waffle pattern. The plurality of ridges 1638 provide added strength to the front side 1622.

In the subject embodiment, each of the first and second sides 1628, 1630 includes an interior surface on which is disposed a plurality of ribs 1640. The plurality of ribs 1640 extend from the opening 1634 to the inner surface 1636 of the front side 1622. The plurality of ribs 1640 are adapted to provide strength to the first and second walls 1624, 1626 and the first and second sides 1628, 1630.

Each of the first and second walls 1624, 1626 defines a plurality of adapter openings 1642 that extend into the interior 1632 of the cover 1620. A first plurality of ribs 1644 is disposed on an interior surface of the first and second walls 1624, 1626. In the subject embodiment, the first plurality of ribs 1644 is longitudinally disposed between adjacent adapter openings 1642.

A second plurality of ribs 1646 is disposed on an exterior surface of the first and second walls 1624, 1626. In the subject embodiment, the second plurality of ribs 1646 includes a plurality of longitudinal ribs 1648 and a latitudinal rib 1650. The longitudinal ribs 1648 and the latitudinal rib 1650 are disposed between adjacent adapter openings 1642. The first and second plurality of ribs 1644, 1646 are adapted to provide strength to the interior and exterior surfaces of the first and second walls 1624, 1626.

Integral hinge hooks 1500 are provided at the second side 1630 of the cover 1620 while latch mounts are provided at the first side 1628 of the cover 1620. In certain embodiments, cable management structures such as spools can be provided within the interior 1632 of the cover 1620.

FIGS. 24-30 show the base 916 in isolation from the front cover 920. The base include integral hinge pins 1502 about which the hinge hooks 1500 of the cover 920 hook. The base 916 is generally rectangular and defines an open interior in which fibers can be readily routed and managed. As indicated above, cable management spools 980 are integrally formed with the base. In use, excess fiber or cable can be looped around the spools for cable management and/or storage. Hinge pins are provided at one side of the base while latch catches are provided at the opposite side of the base.

FIGS. 115-121 show an alternate embodiment of a base 1716 suitable for use with the enclosure 902. The base 1716 includes a base wall 1718, a first wall 1720, an oppositely disposed second wall 1722, a first side 1724, and an oppositely disposed second side 1726. The base wall 1718, the first and second walls 1720, 1722 and the first and second sides 1724, 1726 cooperatively define an interior cavity 1728. The first and second walls 1720, 1722 define a plurality of cable openings 1730, through which cable enters and/or exits the enclosure 902.

The base 1716 further includes a first inner wall 1732 and an oppositely disposed second inner wall 1734. In the subject embodiment, the first and second inner walls are offset from the first and second walls 1720, 1722. In the subject embodiment, the inserts 935, 937 are disposed between the first and second walls 1720, 1722 and the first and second inner walls 1732, 1734, respectively.

The base wall 1718 includes a plurality of ridges 1736. In the subject embodiment, the plurality of ridges 1736 is arranged in a waffle pattern on an inner surface of the base wall 1718. The plurality of ridges 1736 are adapted to provide strength to the base wall 1718.

An interior surface of the second side 1726 of the base 1716 can include the pin cradles 1020 (best shown in FIG. 116), which are adapted to pivotally receive the pivot pins 1022 that are integral with the pivotal tray mount 960. The pin cradles 1020 are provided at the upper portion of the standoff 1026 that offsets the pin cradles 1020 from the bottom of the base 1716.

Disposed on an exterior surface of the second side 1726 of the base 1716 is the plurality of integral hinge pins 1502. The integral hinge pins 1502 are adapted to receive the hinge hooks 1500 of the cover 1620. In one embodiment, the plurality of integral hinge pins 1502 extends substantially the entire length of the second side 1726. In another embodiment, there are five integral hinge pins 1502 disposed along the second side 1726. In another embodiment, there are eight integral hinge pins 1502 disposed along the second side 1726.

The first side 1724 of the base 1716 can include a latch receptacle 1740. In one embodiment, the latch receptacle 1740 is adapted to receive the resilient latch 1568 of the tray mount 1561. The latch receptacle 1740 includes a latch opening 1742 disposed along its length. The latch opening 1742 is adapted to receive the lip 1576 of the latch portion 1574 of the resilient latch 1568 of the tray mount 1561.

Figure 54:
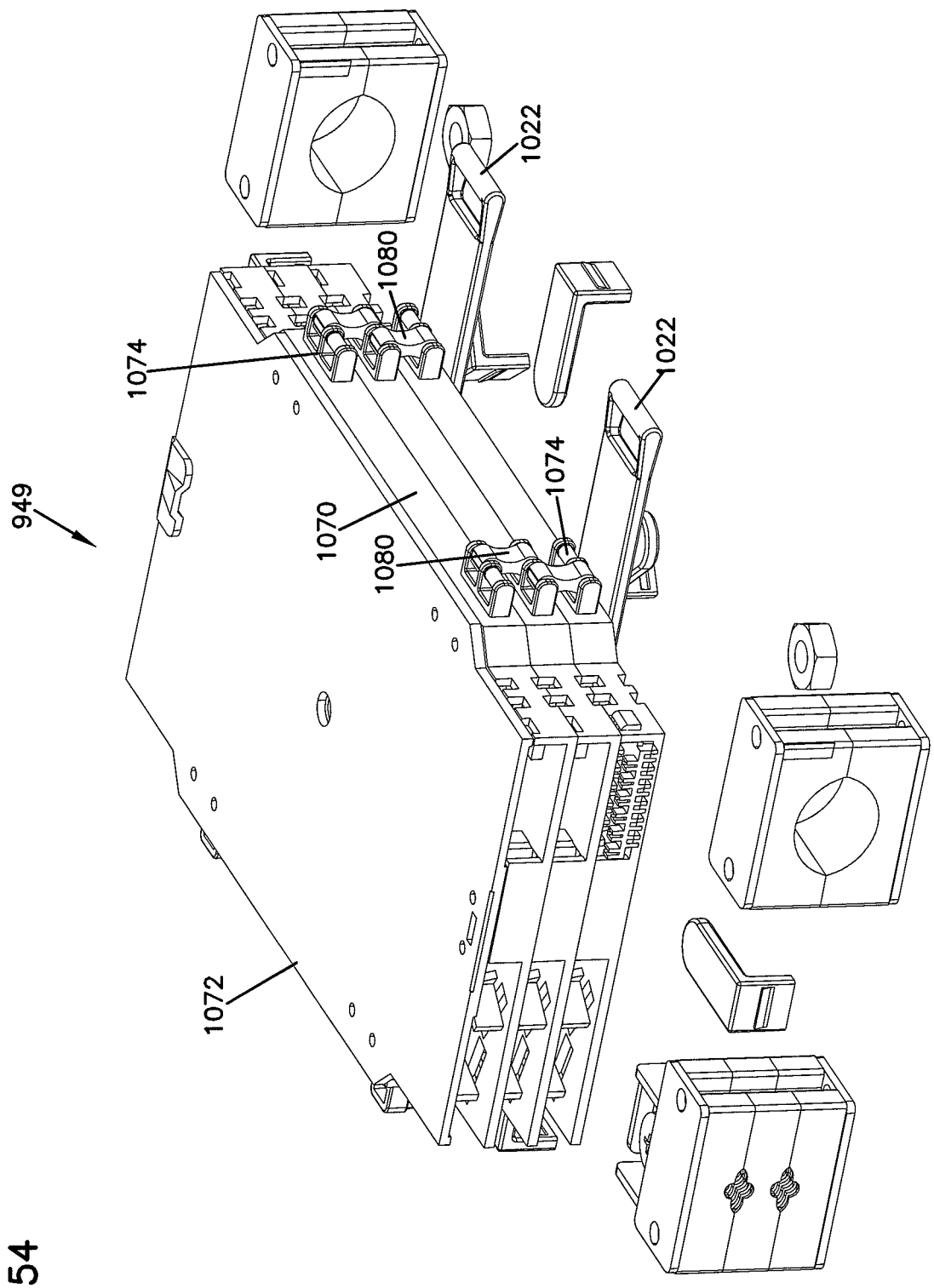
FIGS. 54-56 show various views of a tray stack.
Figure 55:
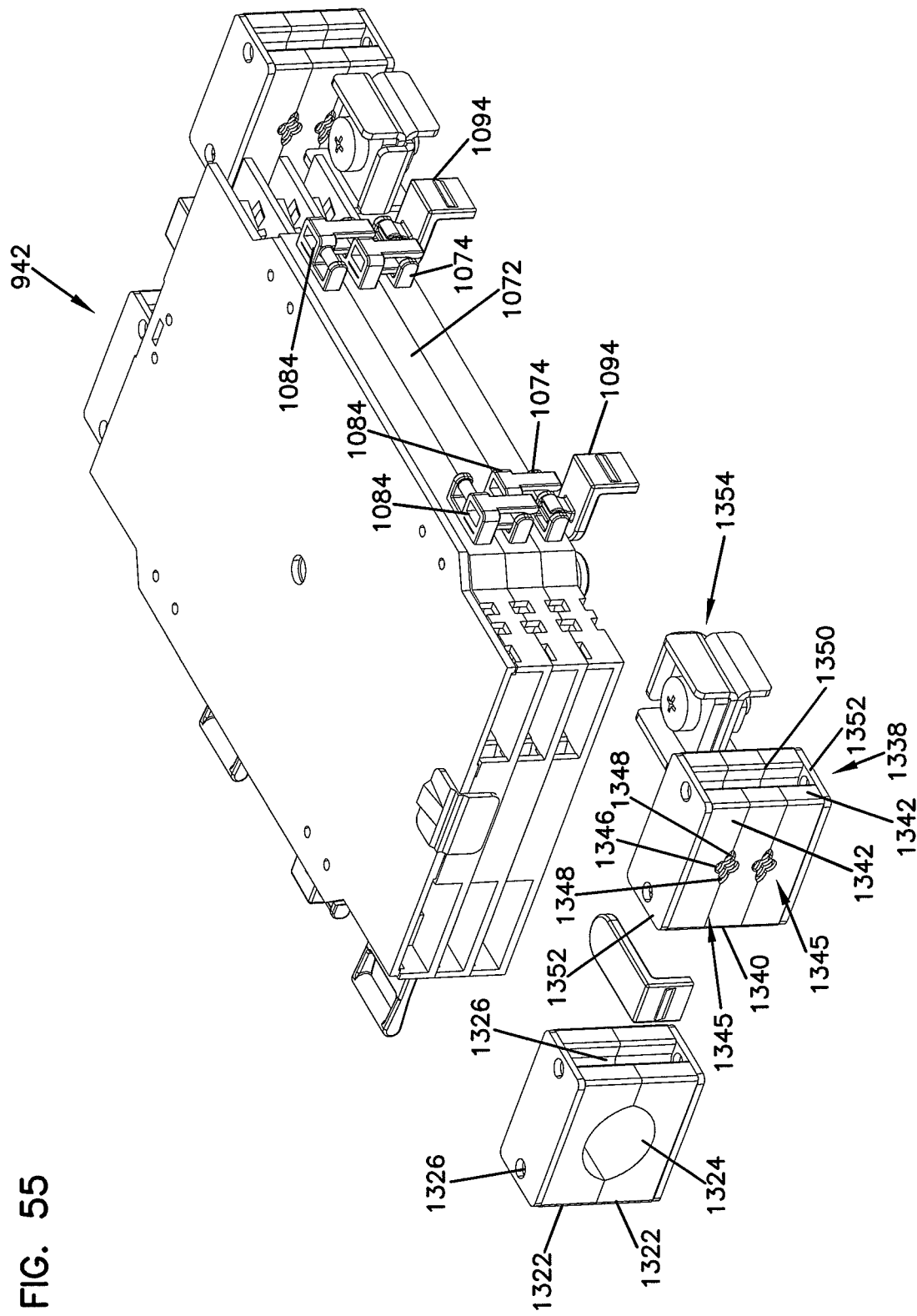
Figure 56:
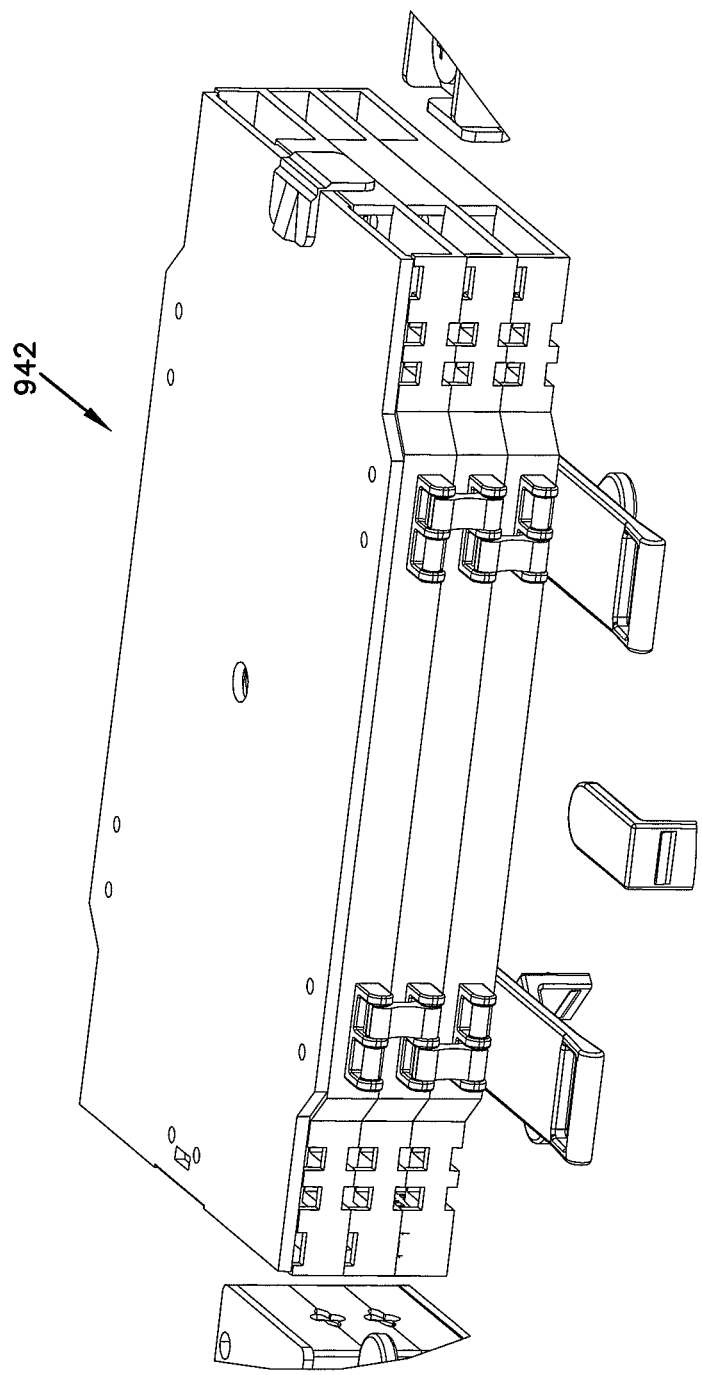
Figure 57:
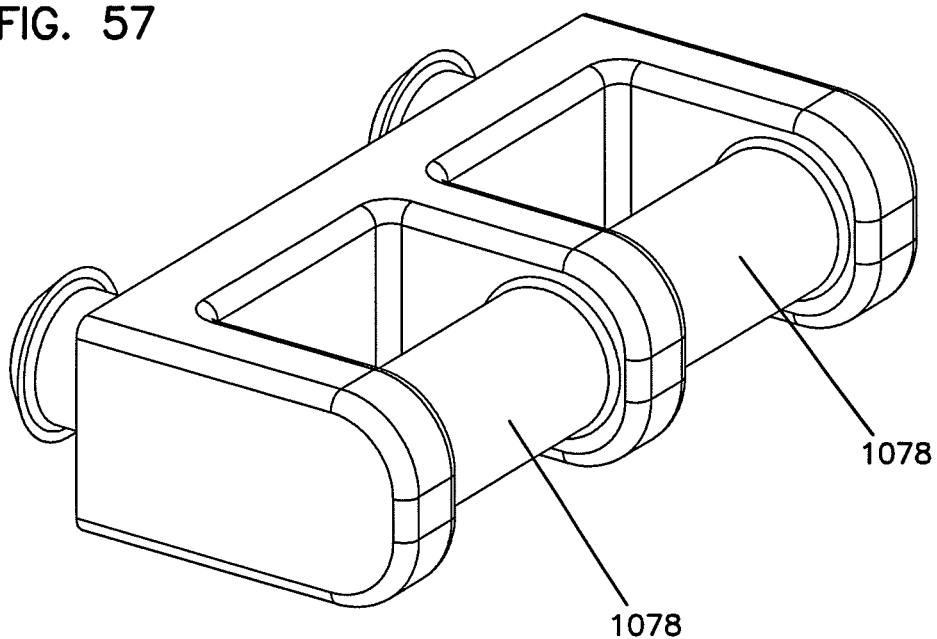
Figure 58:
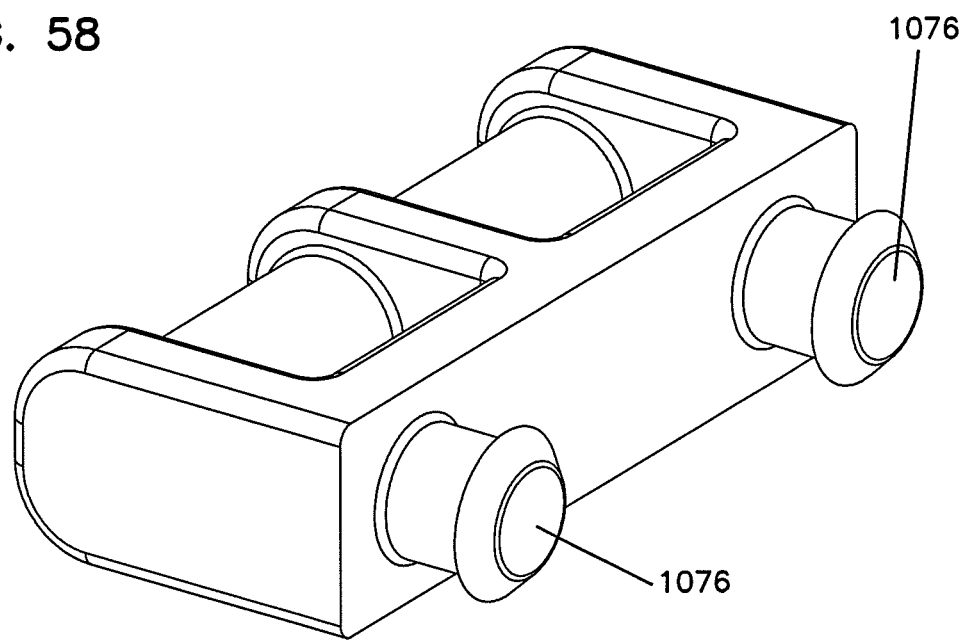
Figure 62:
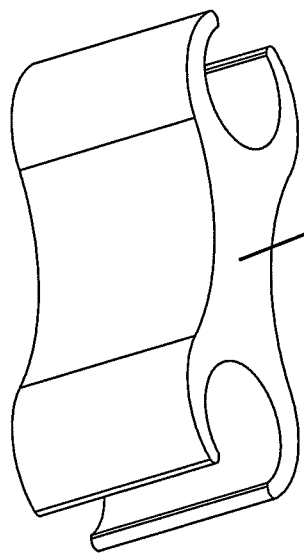
FIGS. 62-66 show various views of a hinge linkage used with the tray stack of FIGS. 54-56.
Figure 63:
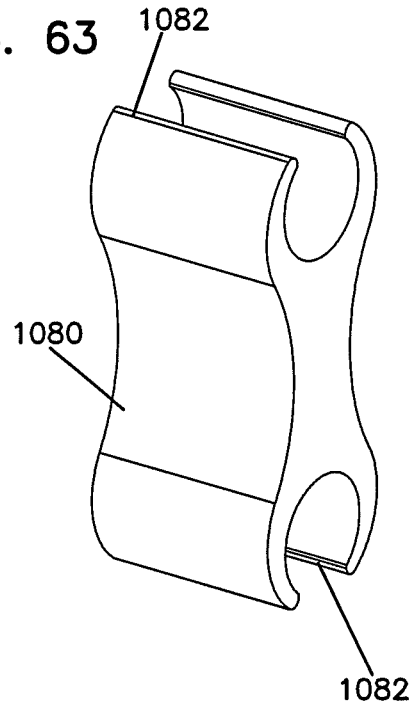
Figure 64:
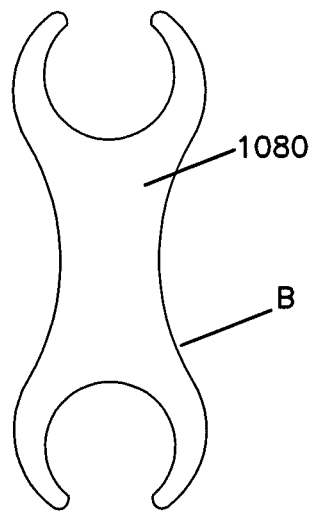
Figure 66:
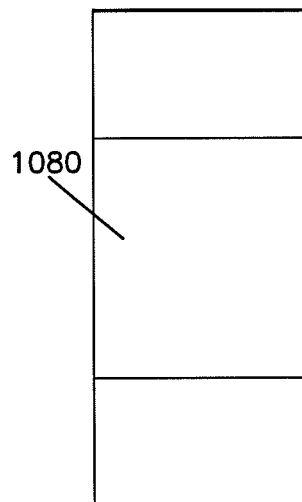
Figure 65:
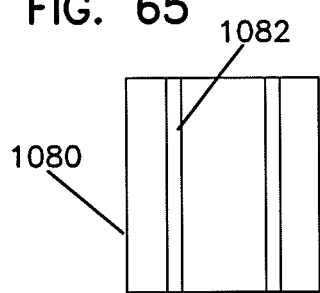
Figure 67:
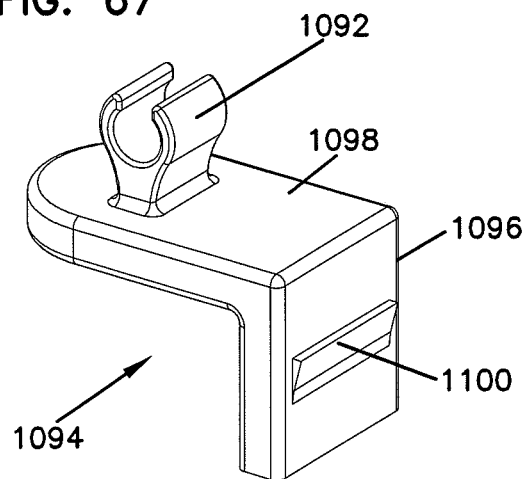
FIGS. 67-71 show various views of a cable management finger that mounts beneath the tray stack of FIGS. 54-56.
Figure 68:
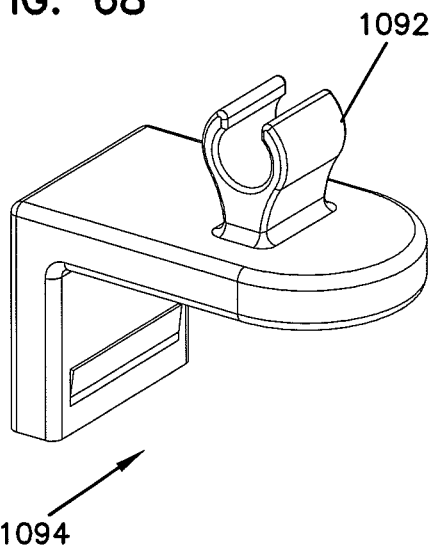
Figure 69:
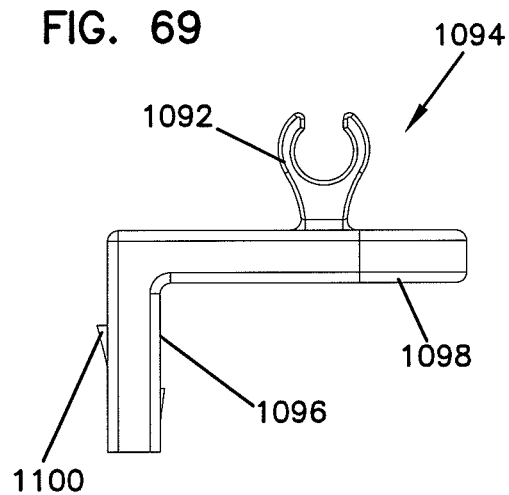
Figure 70:
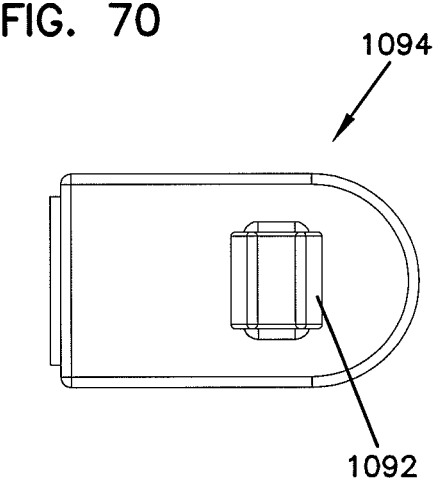
Figure 71:
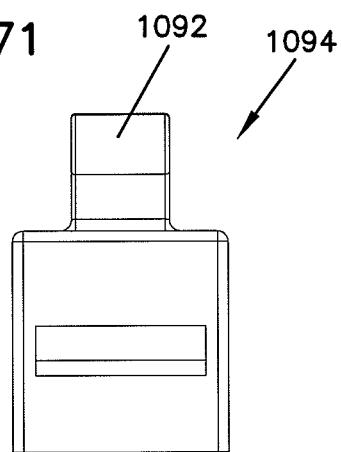
Figure 72:
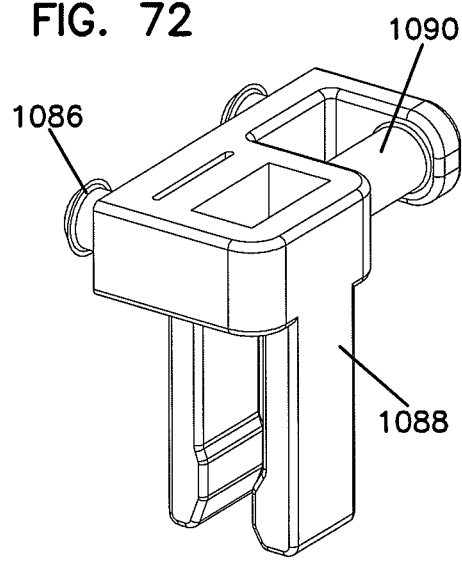
FIGS. 72-76 show various views of a latching clip used with the tray stack of FIGS. 54-56.
Figure 73:
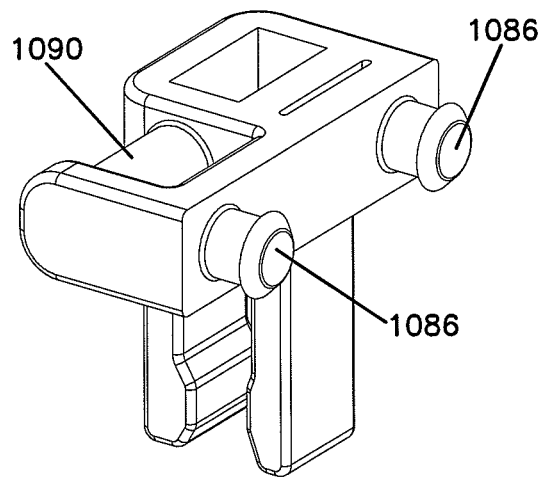
Figure 74:
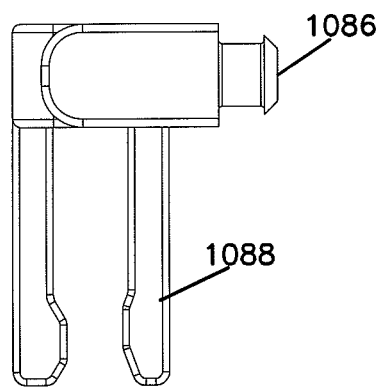
Figure 75:
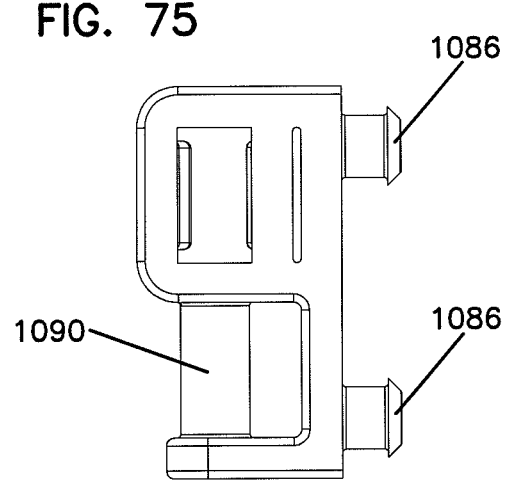
Figure 76:
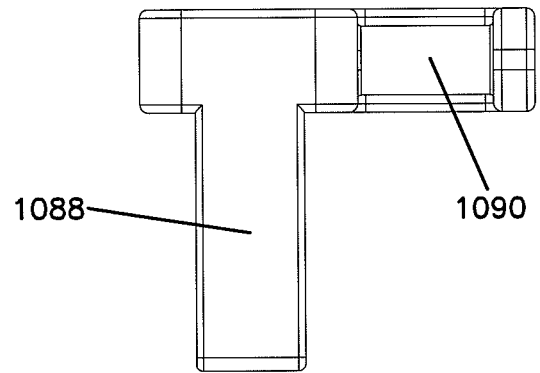
Figure 78:
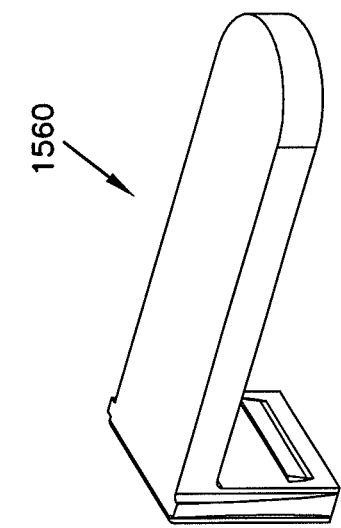
FIGS. 77-81 show various views of a cable management finger used within the wall box of FIGS. 3-13.
Figure 80:
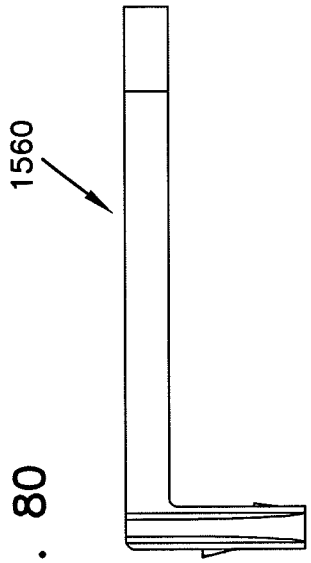

FIGS. 54-56 show the tray stack 949 in isolation from the enclosure 902. Generally, the tray stack 949 includes a hinging side 1070 positioned opposite from a latching side 1072. As shown at FIG. 54, each of the trays of the tray stack 949 includes two dual pin components 1074 mounted at the hinging side 1070. As shown at FIGS. 57-61, the dual pin components 1074 have mounting posts 1076 that snap-fit within corresponding openings in the tray to mount the dual pin components 1074 to the trays. Each of the dual pin components 1074 also includes two hinge pins 1078. The trays of the tray stack 949 are pivotally connected to one another by pivot linkages 1080 (see FIG. 54 and FIGS. 62-66) each having oppositely positioned snap-fit receptacles 1082. As shown at FIG. 54, the snap-fit receptacles 1082 of the pivot linkages 1080 are snapped over the hinge pins 1078 of adjacent trays to provide pivotal connections between the adjacent trays. For the bottommost tray, two of the hinge pins 1078 are snapped within the hinge pin receivers 963 of the pivotal tray mount 960. Fasteners can also be used to non-pivotally secure the lowermost tray to the tray mount 960.

Referring to FIG. 55, the latching side 1072 of the tray stack 949 includes two dual pin components 1074 secured to the bottommost tray and two latching elements 1084 secured to each of the other trays. As shown at FIGS. 72-76, each of the latching components 1084 includes mounting posts 1086 that are snap-fit within corresponding openings defined by the trays to secure the latching components 1084 to the trays. Each of the latching components 1084 also includes a latching clip 1088 and a latching pin 1090. When a given tray is pivoted to a closed position, the latching clips 1088 snap-fit over corresponding latching pins 1090 provided on the underlying tray to latch the tray in a closed position over the underlying tray. By pulling the tray away from the underlying tray, the latching clip 1088 disengages from the latching pin 1090 to allow the tray to be moved to an open position. Two of the pins 1078 of the bottommost tray snap within snap-fit receptacles 1092 provided on cable management fingers 1094 (see FIGS. 67-71) that are attached to the base 916. By pulling the bottommost tray upwardly away from the cable management fingers 1094, the pins 1078 can be disengaged from the snap-fit receptacles 1092 to allow the bottommost tray to be pivoted to an open position where the interior region of the base 916 can be more fully accessed.

Referring to FIGS. 67-71, the cable management finger 1094 is generally L-shaped and includes a vertical leg 1096 and a horizontal leg 1098. The vertical leg 1096 includes a snap-fit member 1100. The vertical legs 1096 are secured within corresponding receptacles 1102 provided in the base 916 (e.g., by a snap-fit connection). As so mounted, the horizontal legs 1098 function to assist in retaining fibers wrapped around the cable spooling region 1228 at the bottom of the base 916 so that the fibers do not interfere with the tray stack or move between the base 916 and the cover 920.

The wall box 900 also includes further structure for mechanically securing the pass-through cable 933 or different types of cable such as drop cables to the enclosure 902. For example, as shown at FIG. 13, a pass-through cable yoke 1320 can be used to secure a pass-through cable 933 to the housing 902. As shown at FIGS. 13 and 55, the pass-through cable yoke 1320 includes first and second clamping portions 1322 that cooperate to define a cable receiving opening 1324. A pair of fastener receivers 1326 extends vertically through the clamping portions 1322. By inserting fasteners through the fastener receivers 1326 and into bosses 1328 (see FIGS. 24 and 25) provided at the bottom of the base 916, the fasteners can be used to draw the clamping portions 1322 together such that a cable positioned within the cable receiving opening 1324 is clamped between the clamping portions 1322 and mechanically secured to the base 916.

Figure 81:
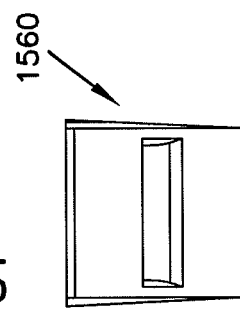
Figure 77:
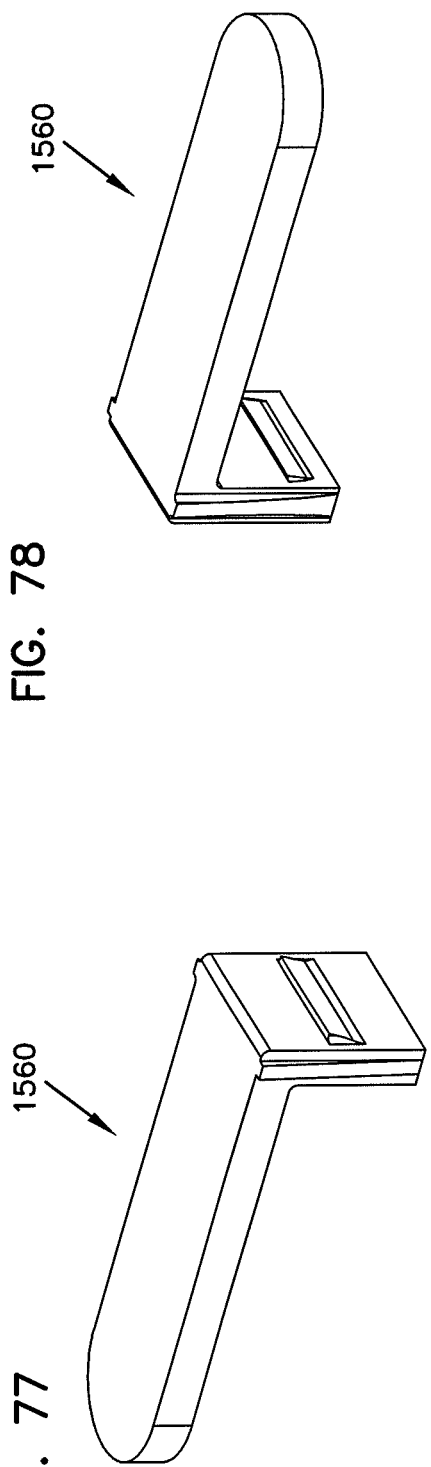
Figure 79:
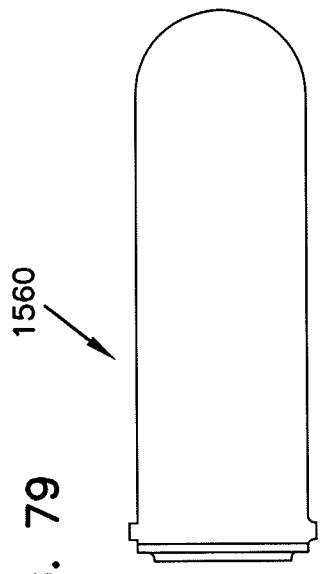
Figure 82:
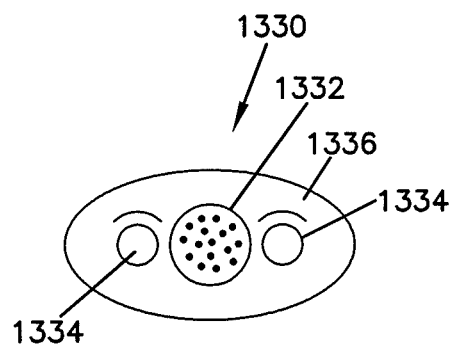
FIG. 82 is a cross-sectional view of a drop cable.
Figure 83:
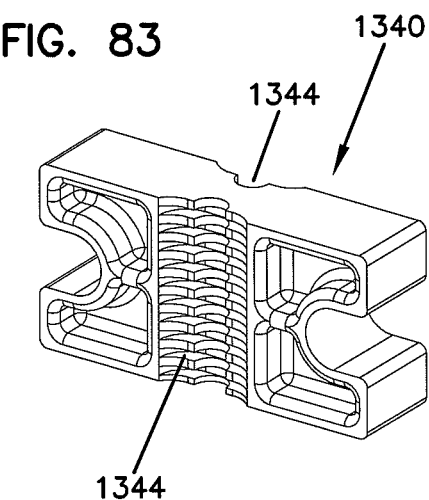
FIGS. 83-96 show various views of components of a yoke adapted for clamping the drop cable of FIG. 82.
Figure 84:
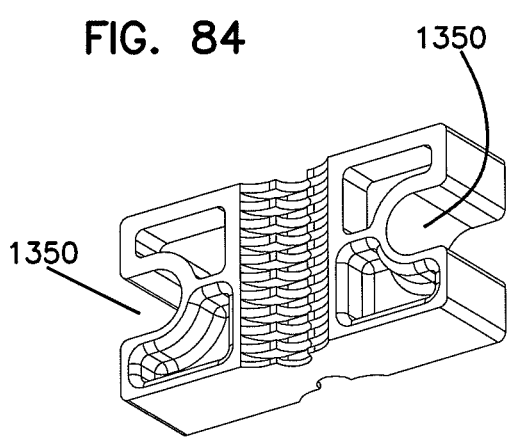
Figure 85:
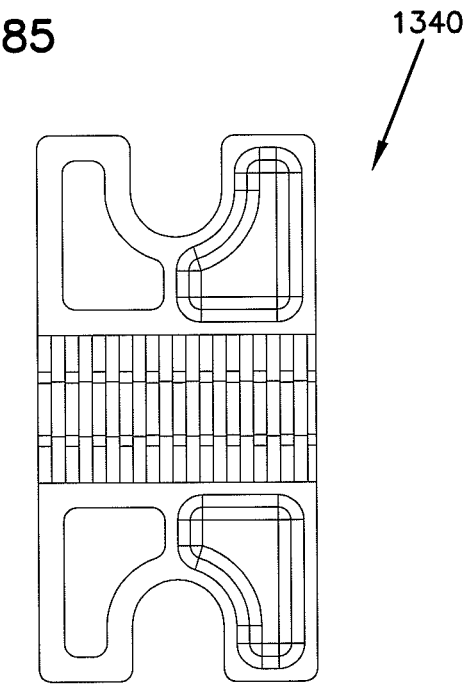
Figure 86:
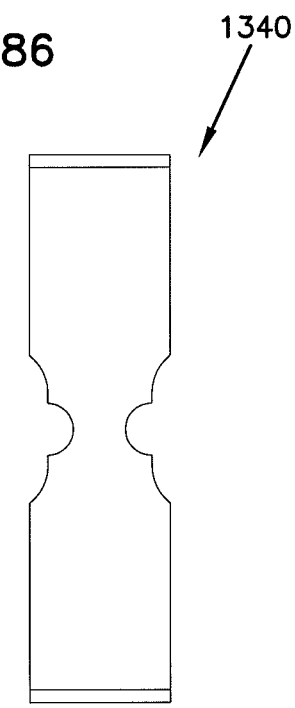
Figure 87:
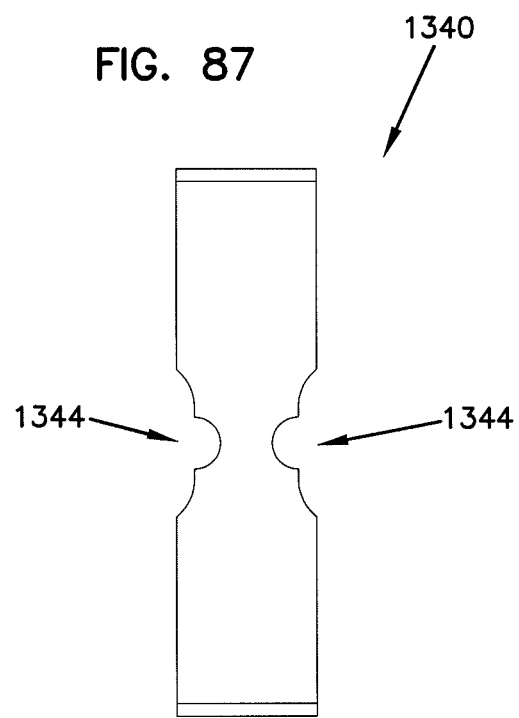
Figure 88:
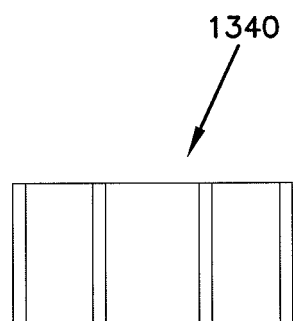
Figure 89:
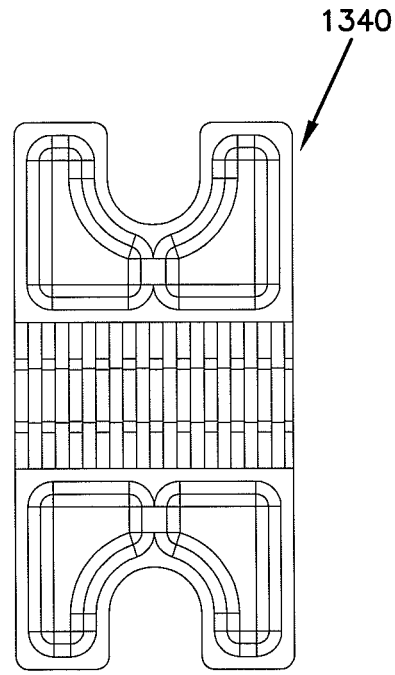
Figure 90:
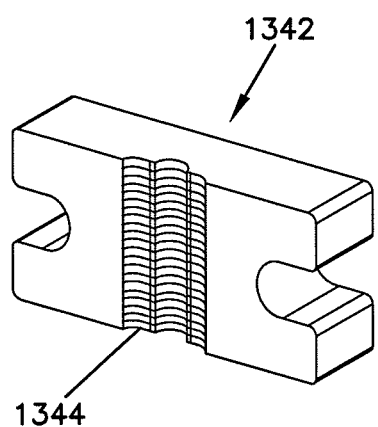
Figure 91:
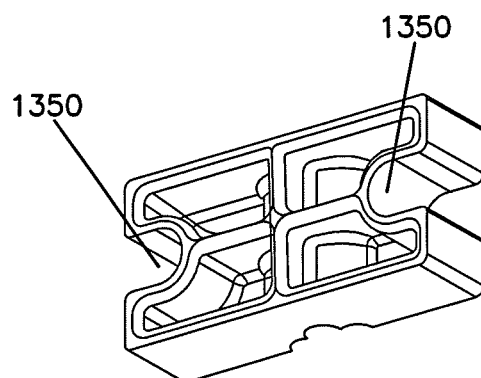
Figure 92:
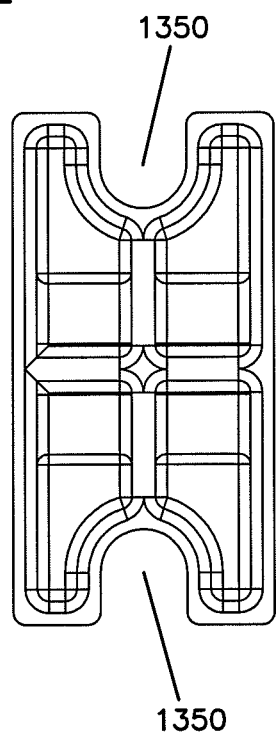
Figure 93:
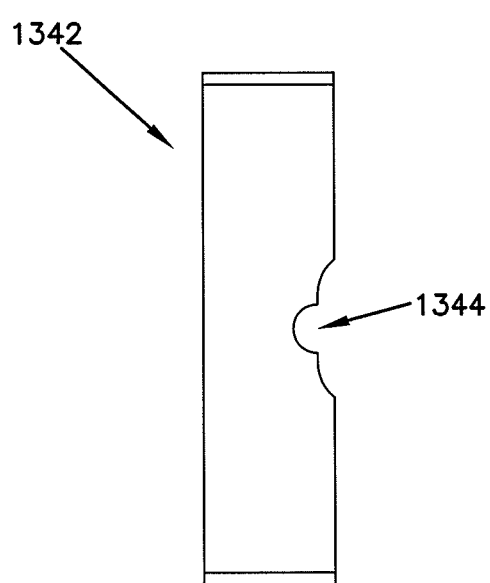
Figure 94:
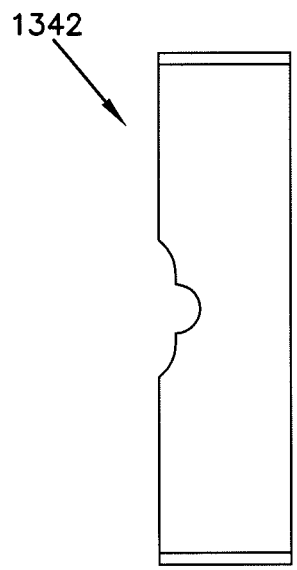
Figure 95:
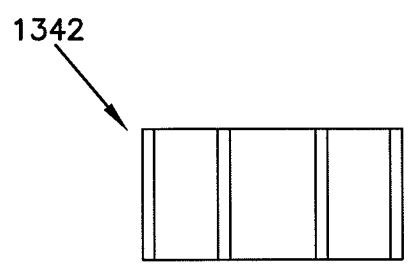
Figure 96:
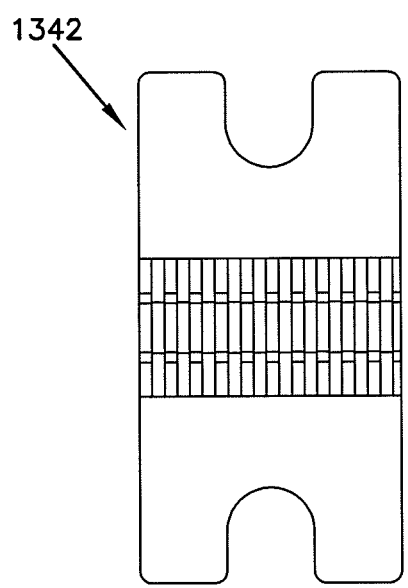

Other types of yokes can be used to accommodate different type of cable. For example, FIG. 81 shows a cross-sectional view of an example drop cable 1330 that may be routed through one of the cable exit/enter openings 932. The drop cable 1330 includes a central buffer tube 1332 containing one or more optical fibers. The drop cable 1330 also includes strength members 1334 positioned on an opposite side of the buffer tube 1332 and a jacket 1336 covering the strength members 1334 and the central buffer tube 1332. FIG. 55 shows a yoke 1338 configured to mechanically secure two of the drop cables 1330 to the enclosure. The yoke 1338 has a multi-piece configuration including a middle piece 1340 and two end pieces 1342. The middle piece 1340 (shown at FIGS. 83-89) includes upper and lower surfaces defining clamping receptacles 1344 adapted to receive the drop cable 1330. Clamping receptacles 1344 are also defined in the surfaces of the end pieces 1342 (see FIGS. 90-96) that face toward the middle piece 1340. The clamping receptacles 1344 cooperate to define passages 1345 having an enlarged middle region 1346 and narrowed outer regions 1348. When drop cables 1330 are secured within the yoke 1338, the narrowed outer regions 1348 clamp through the drop cable jacket and against the strength members 1334 to mechanically secure the drop cable 1330 to the yoke 1338. The enlarged central regions 1346 prevent central buffer tube 1332 of the drop cable 1330 from being crushed during clamping. The middle piece 1340 and end pieces 1342 of the yoke 1338 are drawn together through the use of a fastener that extends through fastener receivers 1350 defined through the yoke 1338. In use, the yoke 1338 is assembled with drop cables 1330 passing through the passages of the yoke. Fasteners are then inserted through the fastener openings and threaded into bosses 1328 (see FIGS. 24 and 25) provided at the bottom of the base 916. As the fasteners are tightened, the pieces 1340, 1342 of the yoke 1338 are drawn together to securely clamp the drop cables 1330. In certain embodiments, reinforcing plates 1352 may be provided at the top and bottom sides of the yokes 1338, 1320 as shown at FIG. 55. Moreover, if even further mechanical retention is required, additional fasteners such as an additional strength member clamp 1354 (see FIG. 55) can be used to secure strength members of the cables to the enclosure 902.

Additionally, to promote cable management within the enclosure 902, additional cable management fingers 1560 (see FIGS. 77-81) can be secured at various locations within the base 916. The cable management fingers 1560 have the same configuration as the cable management fingers 1094 except no snap-fit receptacle is provided on the horizontal leg. As shown at FIG. 13, a plurality of the cable management fingers 1560 are shown snapped within the receptacles provided within the cable management spools 980 that are integrally formed with the base 916.

Figure 122:
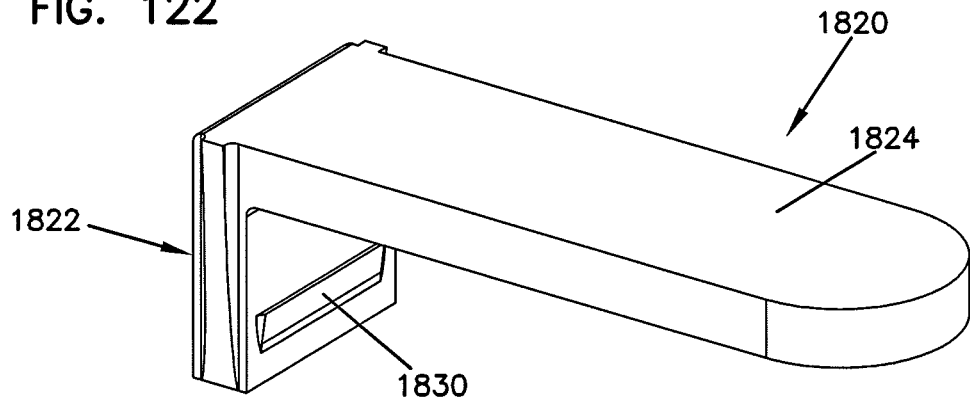
FIGS. 122-124 show various views of an alternate embodiment of a cable management finger suitable for use with the wall box of FIG. 3.
Figure 123:
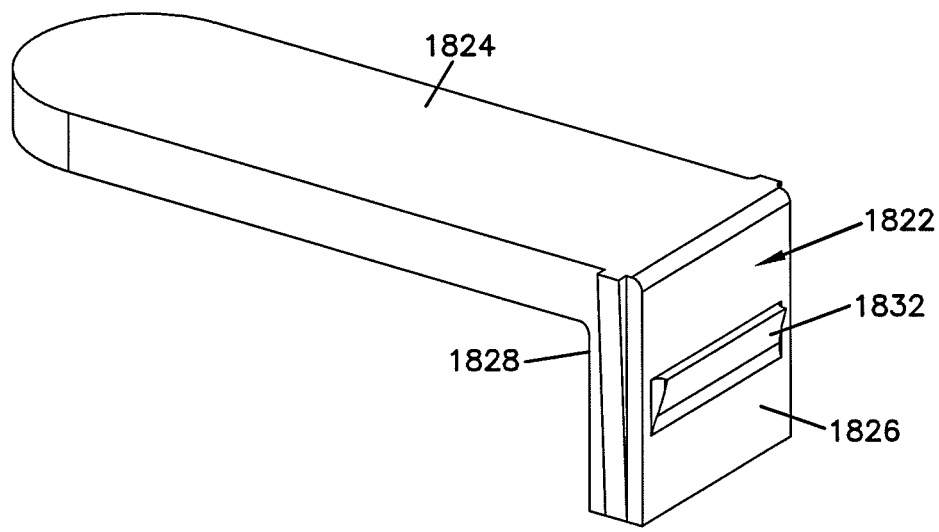
Figure 124:
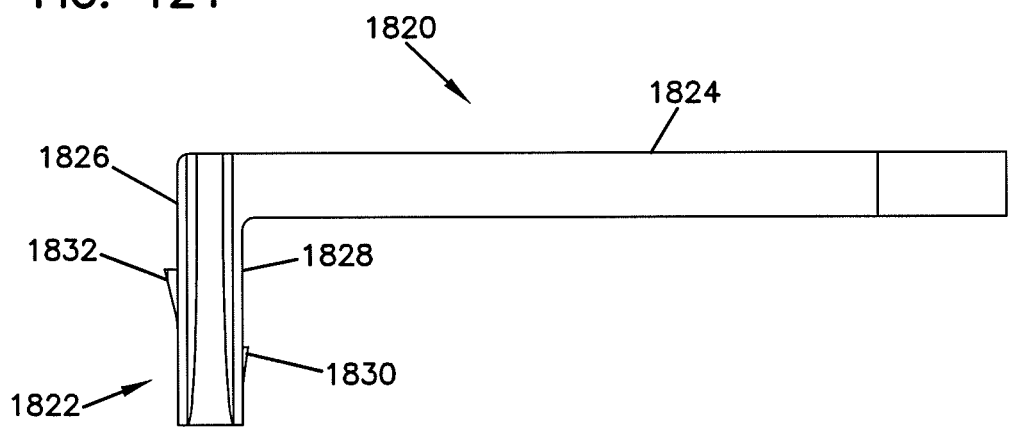

Referring now to FIGS. 122-124, an alternate embodiment of a cable management finger 1820 is shown. The cable management finger 1820 is generally L-shaped and includes a vertical leg 1822 and a horizontal leg 1824. The vertical leg 1820 includes a first surface 1826 and an oppositely disposed second surface 1828. A snap-fit member 1830 is disposed on the second surface 1828 and is adapted to engage a complementary snap-fit member in the corresponding receptacles 1102 disposed around the cable spooling region 1228 provided in the base 916.

The first surface 1826 of the vertical leg 1822 includes a protrusion 1832 that extends outwardly from the first surface 1826. In the subject embodiment, the protrusion 1832 abuts a first face of the corresponding receptacle 1102 which keeps the first surface 1826 immediately adjacent to a second face, which is oppositely disposed from the first face, of the corresponding receptacle to assist in the engagement of the snap-fit member 1830 and the complementary snap-fit member.

In order to install the cable management finger 1820 in the corresponding receptacle 1102, the vertical leg 1822 is inserted into the corresponding receptacle 1102 of the cable spooling region 1228 and pushed into the receptacle 1102. The vertical leg 1822 is inserted until the snap-fit member 1830 engages the complementary snap-fit member in the receptacle 1102.

In order to remove the cable management finger 1820 from the corresponding receptacle 1102, an end portion of the horizontal leg 1824 is pushed toward the base 916. As the horizontal leg 1824 is pushed toward the base 916, the snap-fit member 1830 of the second surface 1828 is disengaged from the complementary snap-fit member. With the snap-fit member 1830 disengaged from the complementary snap-fit member, the cable management finger 1820 can be removed by pulling the vertical leg 1822 from the corresponding receptacle 1102.

Figure 98:
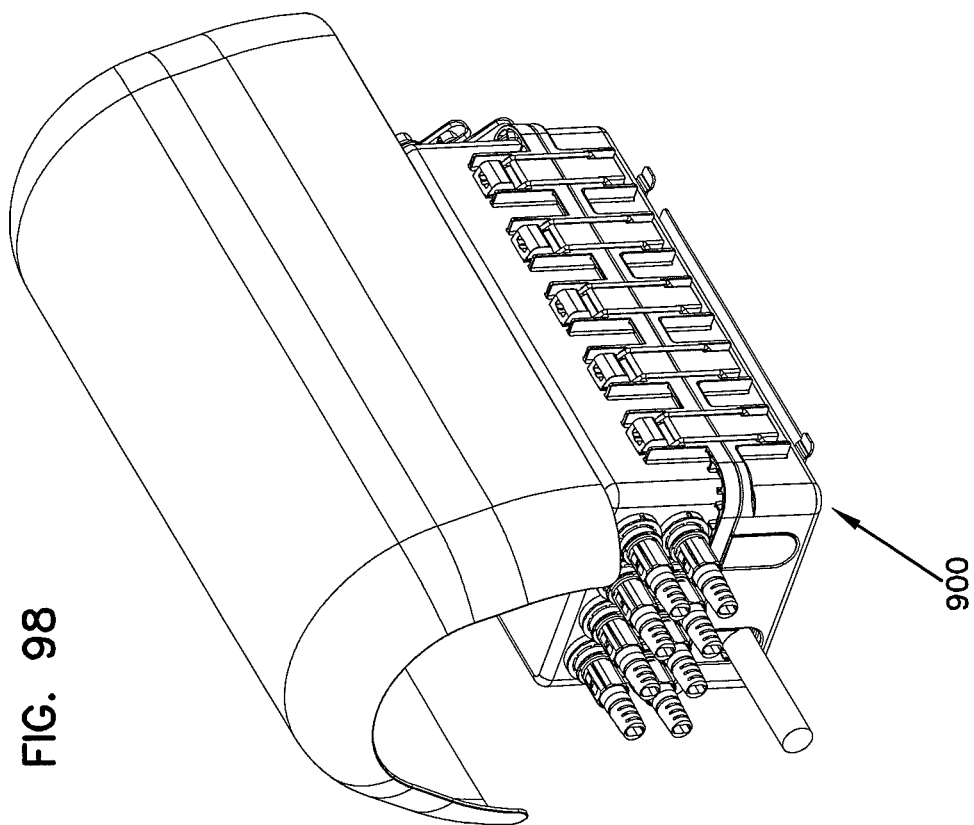
FIGS. 97-100 show shroud arrangements for covering the wall box of FIGS. 3-13.
Figure 97:
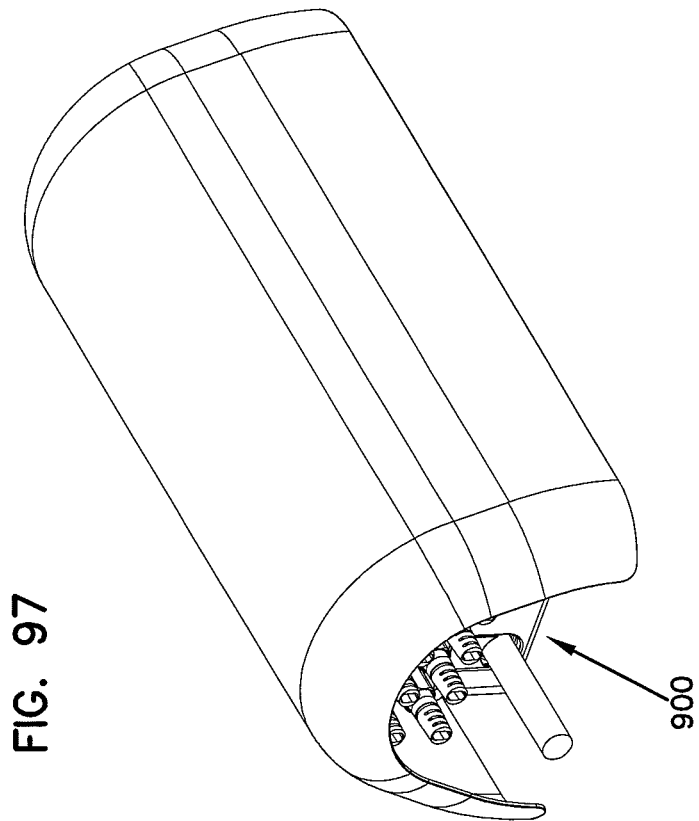
Figure 100:
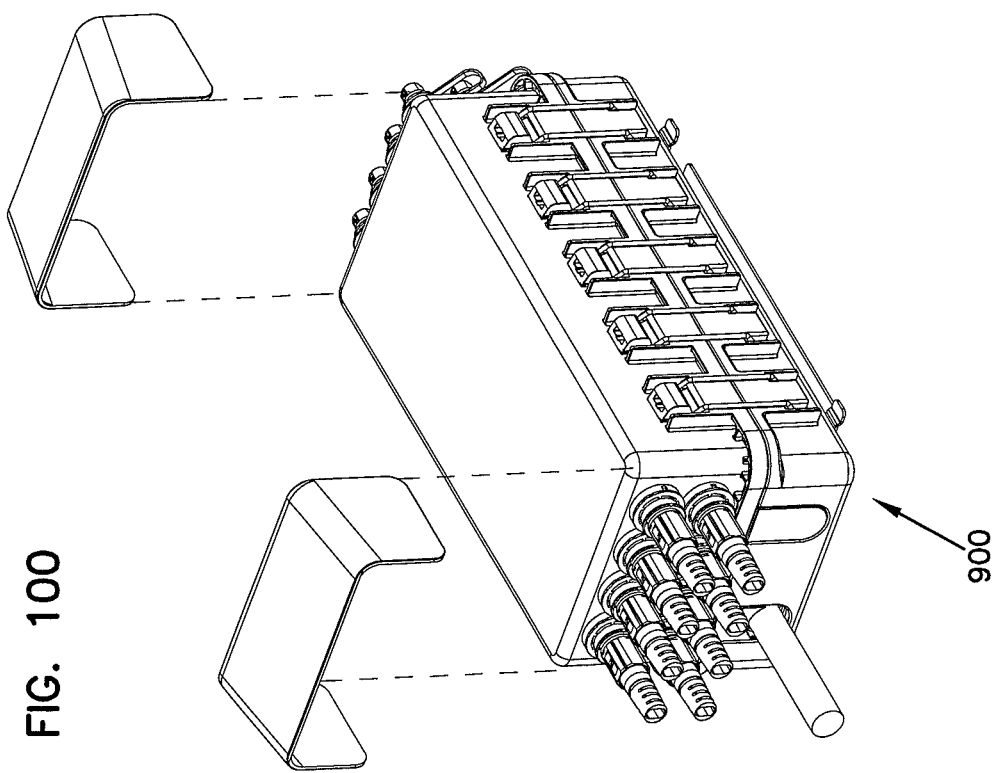
Figure 99:
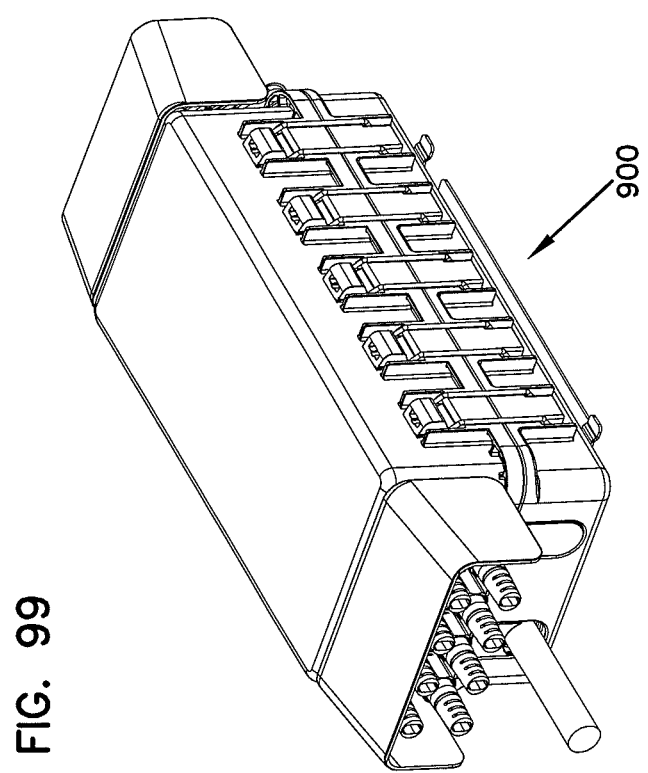
Figure 101:
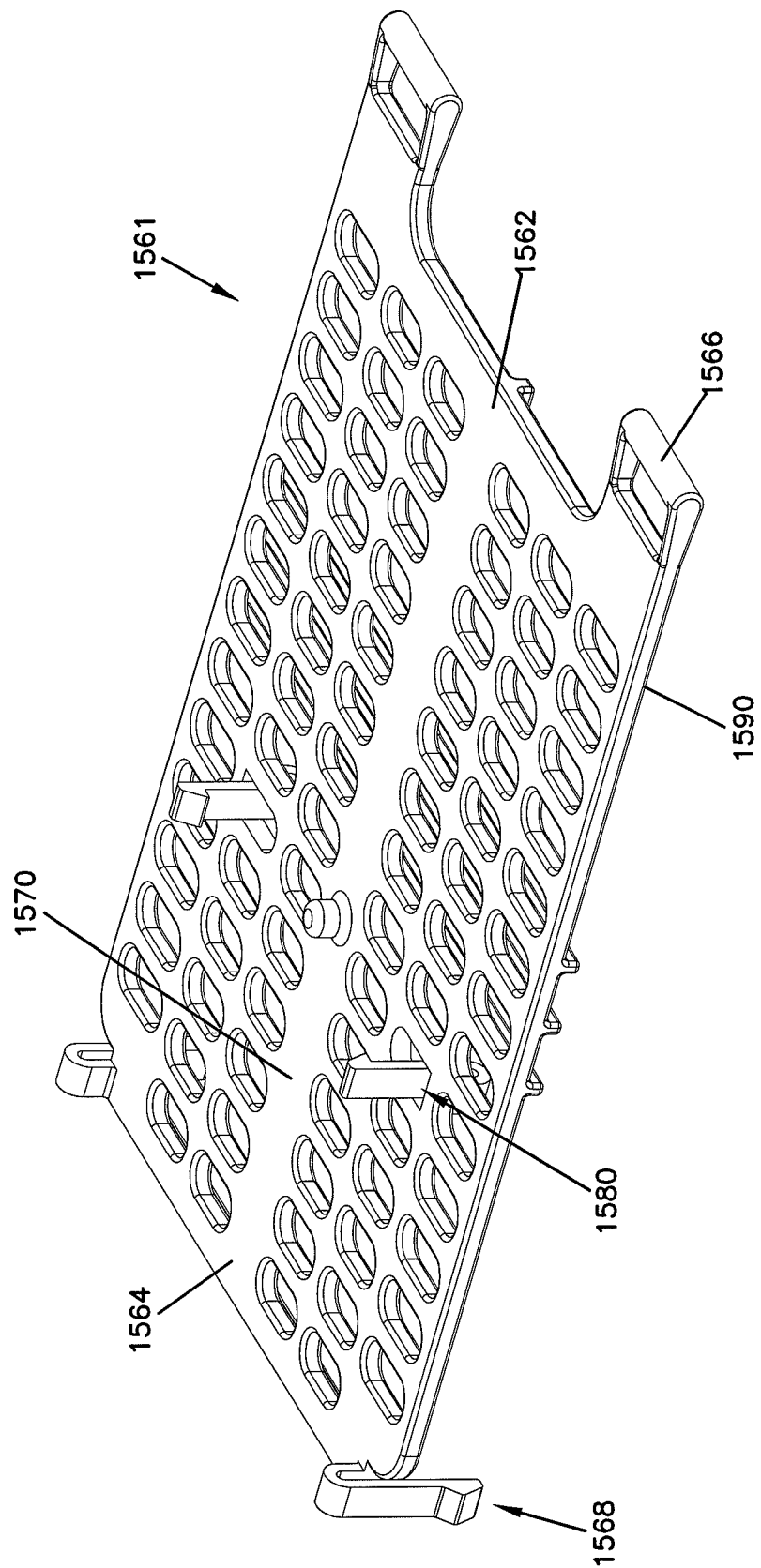
FIGS. 101-105 show various views of an alternate embodiment of a tray mount suitable for use within the wall box of FIG. 3.
Figure 102:
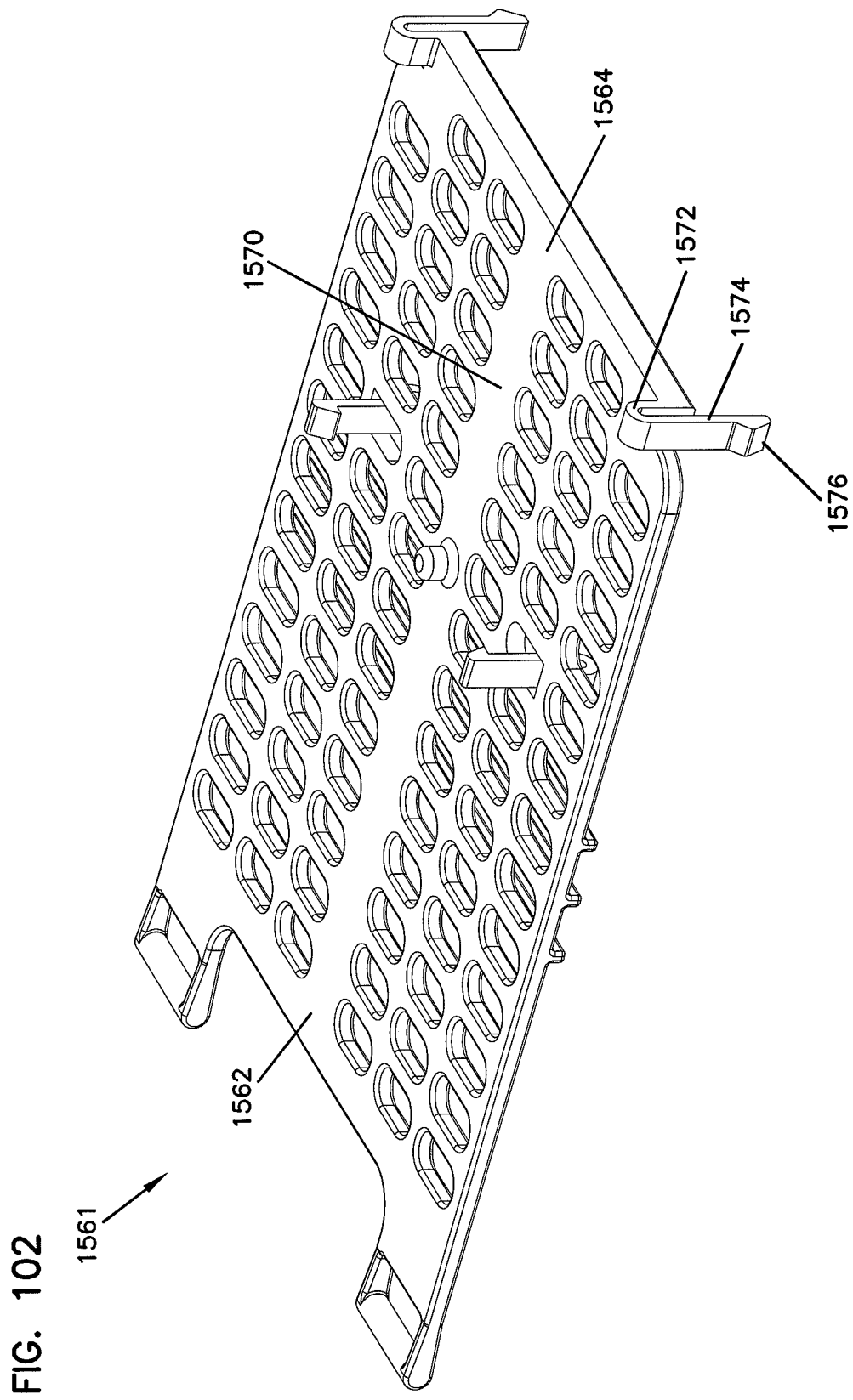
Figure 103:
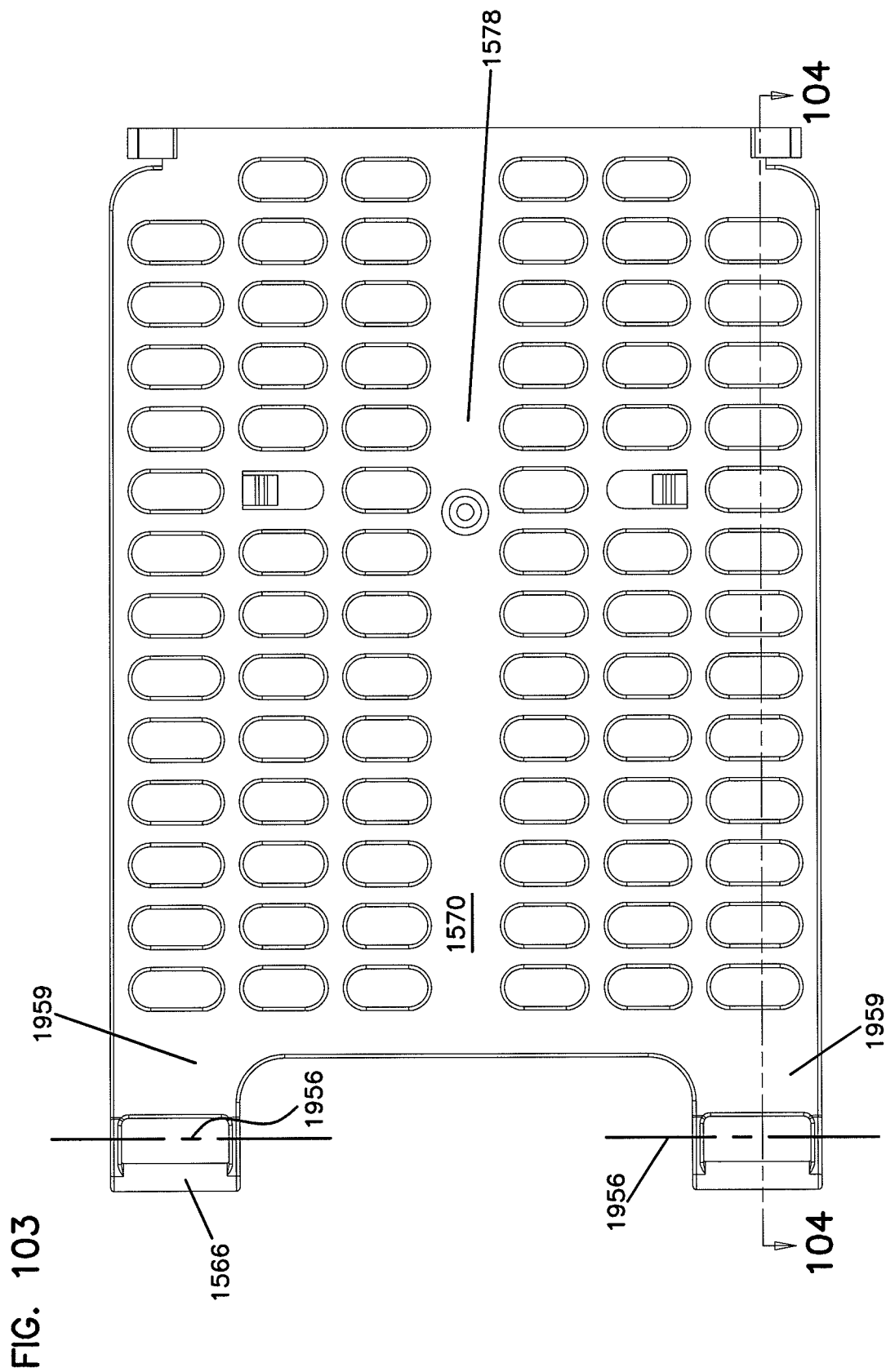
Figure 104:
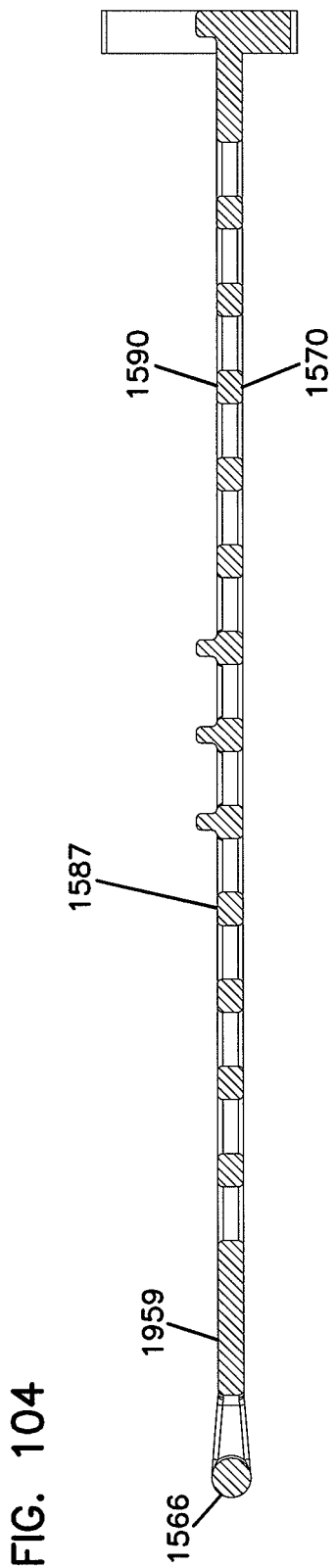
Figure 105:
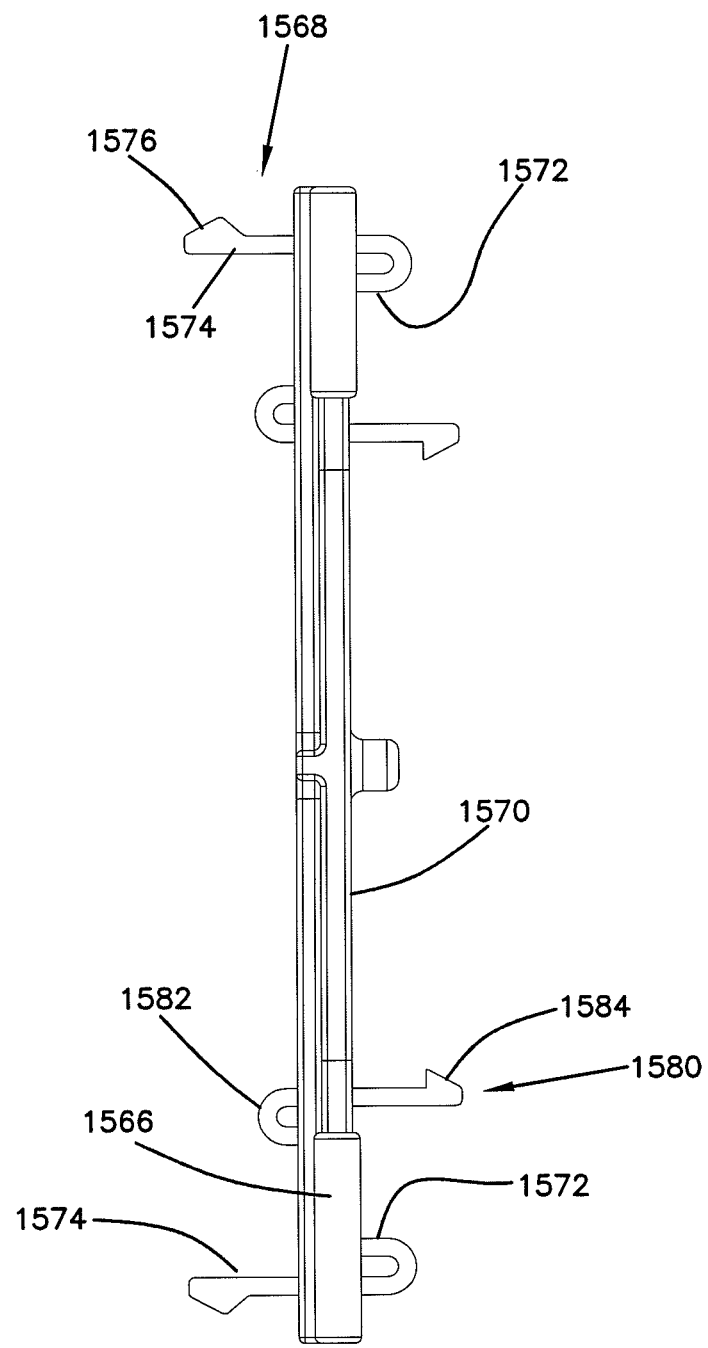

FIGS. 97 and 98 show an additional shroud or cover that can be mounted over the enclosure 902 to provide enhanced protection and to limit access to the exterior connectors. FIGS. 99 and 100 show an alternative version where end covers are secured to the enclosure 902 to enclose the otherwise exposed portions of the fiber optic connectors.

Figure 125:
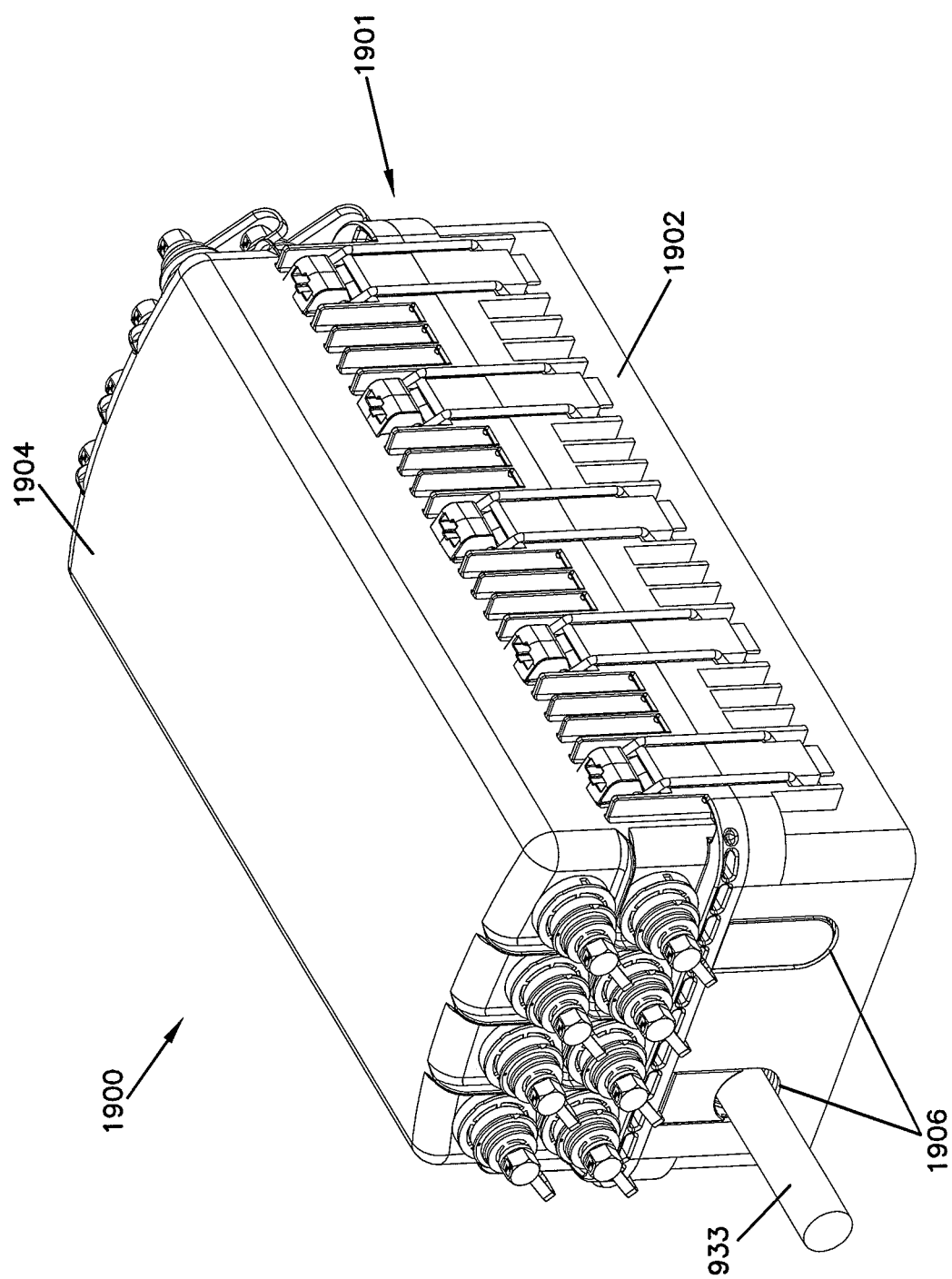
FIGS. 125-126 show various views of an alternate embodiment of a wall box in accordance with the principles of the present disclosure.
Figure 126:
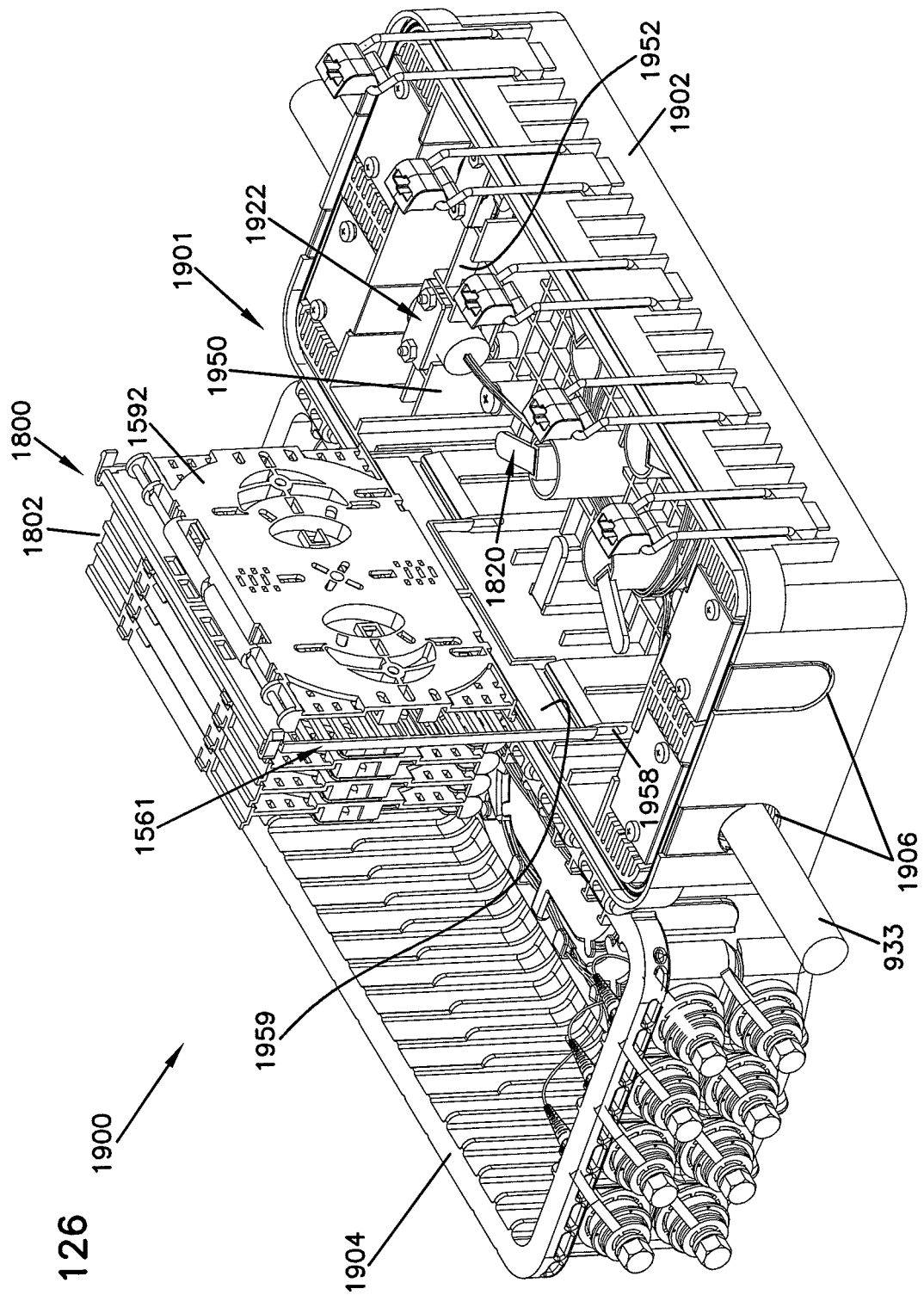
Figure 127:
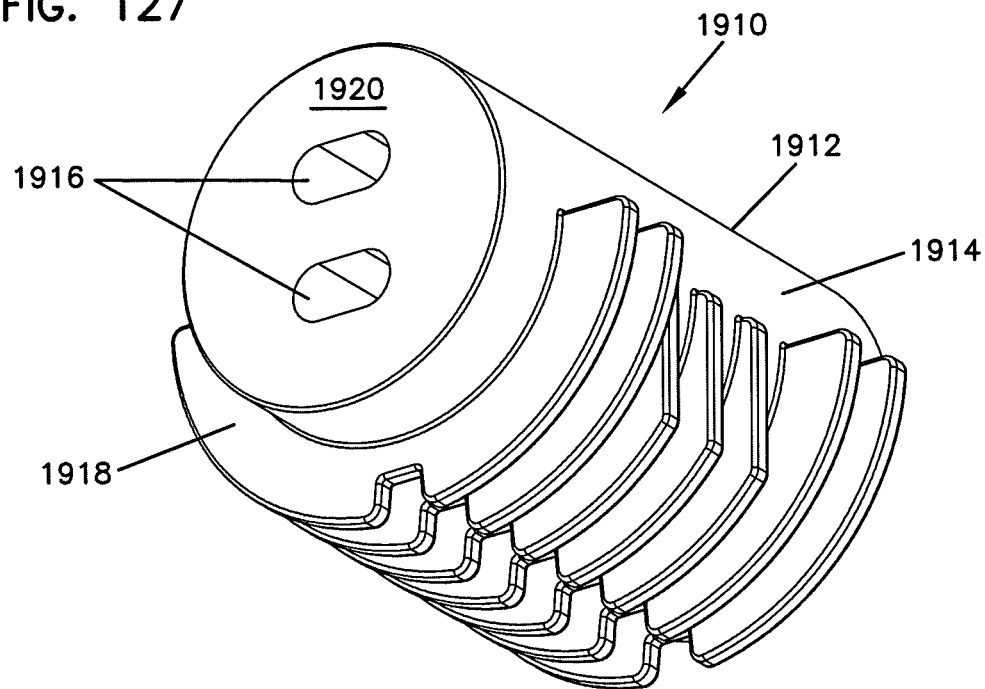
FIGS. 127-128 show various views of a grommet for use in the wall box of FIG. 125.
Figure 128:
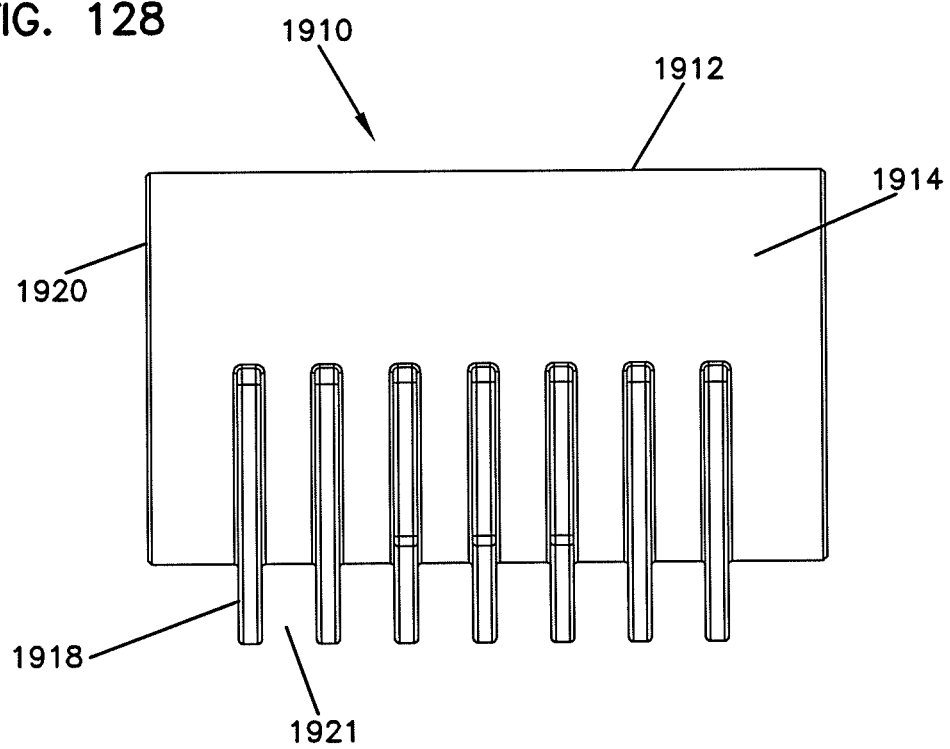

Referring now to FIGS. 125 and 126, an alternate embodiment of a wall box 1900 is shown. In the subject embodiment, the wall box 1900 is a rectangular-shaped enclosure 1901 having a base 1902 and a cover 1904.

Figure 138:
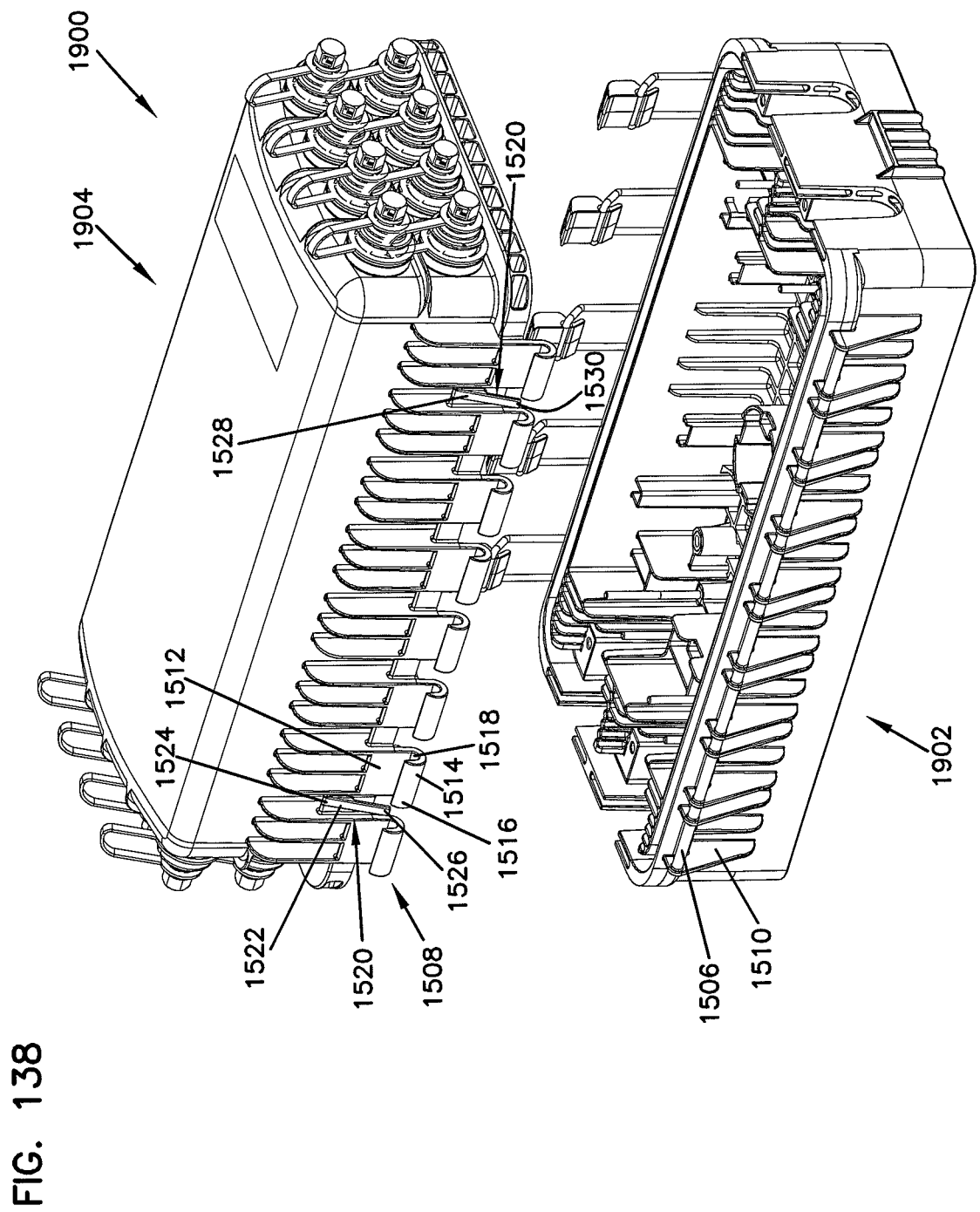
FIG. 138 is an exploded perspective view of a base and a cover of the wall box of FIG. 125.
Figure 139:
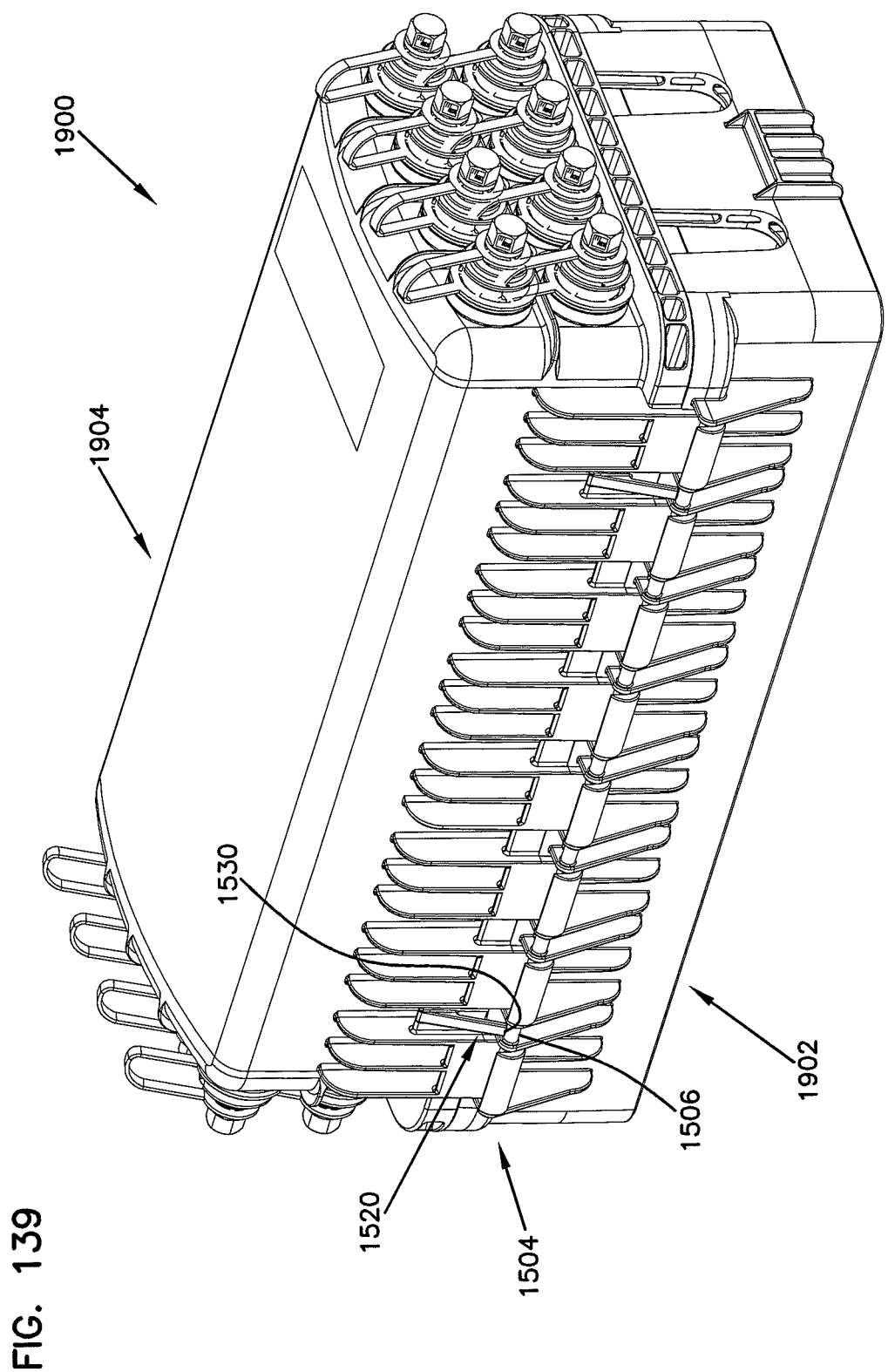
FIG. 139 is a perspective view of a hinge assembly suitable for use with the wall box of FIG. 125.

Referring now to FIGS. 138 and 139, a hinge assembly, generally designated 1504, pivotally engages the base 1902 to the cover 1904. The hinge assembly 1504 includes a pin member 1506 and a hinge portion 1508. In the subject embodiment, the hinge assembly 1504 includes multiple pin members 1506 and multiple hinge portions 1508. In one embodiment, the pin members 1506 are disposed on one of the sides of the base 1902 and extend longitudinally along the side of the base 1902 while the hinge portions 1508 are disposed on one of the sides of the cover 1904.

The pin members 1506 are generally cylindrical members. The pin members 1506 extend between adjacent supports 1510. The supports 1510 generally support the pin members 1506 and are intermittently disposed along the length of the side of the base 1902. The supports 1510 are generally disposed such that the supports 1510 extend outwardly from the side of the base 1902. The pin members are disposed on the base 1902 such that there is a space disposed between the side of the base 1902 and the pin members 1506. In the subject embodiment, this space is adapted to receive a portion of the hinge portions 1508 during installation and/or pivotal movement of the base 1902 and the cover 1904.

Each of the hinge portions 1508 includes a base end 1512 and an opposite free end 1514. In the subject embodiment, the base ends 1512 of the hinge portions 1508 are mounted (e.g., fixed, bonded, fastened, molded, etc.) to one of the sides of the cover 1904.

The free ends 1514 include hook portions 1516 having openings 1518 that are adapted to receive the pin members 1506 of the base 1902. With the pin members 1506 disposed in the openings 1518 of the hook portions 1516 of the hinge portions 1508, the cover 1904 can pivot between an open position and a closed position with respect to the base 1902.

The cover 1904 includes a retention member 1520 that is adapted to retain the pin member 1506 in the opening 1518 of the hook portion 1516 of the hinge portion 1508. The retention member 1520 is adapted to prevent or reduce the risk of inadvertent disengagement of the pin members 1506 and the hinge portions 1508. In the subject embodiment, the cover 1904 includes two retention members 1520.

The retention member 1520 is a resilient member that includes a body 1522 having a first end portion 1524 and a second end portion 1526. In the subject embodiment, the first end portion 1524 is mounted between adjacent hinge portions 1508 on the cover 1904 at opposite ends of one of the sides of the cover 1904. The second end portion 1526 extends outwardly from the side of the cover 1904 such that the second end portion 1526 is generally aligned with the openings 1518 of the hinge portions 1508. With the first end portion 1524 of the retention member 1520 mounted to one of the sides of the cover 1904 and the second end portion generally aligned with the opening 1518 of the hinge portion 1508, the body is disposed at an angle relative to the side of the cover 1904.

The insertion of the pin members 1506 into the hinge portions 1508 of the hinge assembly 1504 will now be described. With the pin members 1506 vertically aligned with the openings 1518 of the hook portions 1516, the pin members 1506 are inserted into the openings 1518. As the pin members 1506 are inserted, the pin members 1506 contact an outer surface 1528 of the retention members 1520. As the pin members 1506 are pushed into the openings 1518, the retention members 1520 flex inwardly toward the side of the cover 1904 to a flexed position. With the pin members 1506 engaged in the openings 1518, the retention members 1520 snap back to a relaxed position such that the second end portions 1526 of the retention members 1520 block at least a portion of the openings 1518 and retain the pin members 1506 in the openings 1518. In the subject embodiment, an end surface 1530 of the second end portion 1526 abuts one of the pin members 1506 to retain the pin members 1506 in the openings 1518.

In order to disengage the hinge assembly 1504, the retention members 1520 are manually flexed toward the side of the cover 1904. With the retention members 1520 manually flexed toward the cover 1904, the pin members 1506 can be removed from the openings 1518.

Referring again to FIGS. 125 and 126, the base 1902 defines two sets of cable openings 1906 for allowing the telecommunications cable 933 to be routed through the enclosure 1901. The sets of cable openings 1906 are aligned along axes 1908 defining cable pass-through paths that extend through the enclosure 1901.

Referring now to FIGS. 125-128, in one embodiment, branch cables exit the enclosure 1901 through the cable openings 1906. Branch cables are fiber optic cables having at least one optical fiber that is spliced to an optical fiber of the telecommunication cable 933 at the splice tray 1802. The branch cables are routed from the enclosure 1901 to a subscriber location or an intermediate access location. In order to seal these branch cables as they leave the enclosure, the branch cables are routed through grommets 1910 that are disposed in the cable exit/enter openings 1906. Each grommet 1910 includes a body 1912 having an outer surface 1914 and defining at least one cable bore 1916 through which the branch cable is routed. In the subject embodiment, and by way of example only, the body 1912 defines two cable bores 1916. In another embodiment, and by way of example only, the body 1912 defines one cable bore 1916.

The outer surface 1914 of the body 1912 includes a plurality of fins 1918 that extend outwardly from the outer surface 1914. In the subject embodiment, the plurality of fins 1918 is generally parallel to an end surface 1920 of the grommet 1910 and extends around a portion of the circumference of the outer surface. The plurality of fins 1918 of the grommet 1910 is adapted to be received in channels or grooves 1921 in the base 1902. The disposition of the fins 1918 in the channels 1921 prevents the grommet 1910 from being axially displaced in the cable opening 1906 and also increases a leakage path for fluid.

Figure 129:
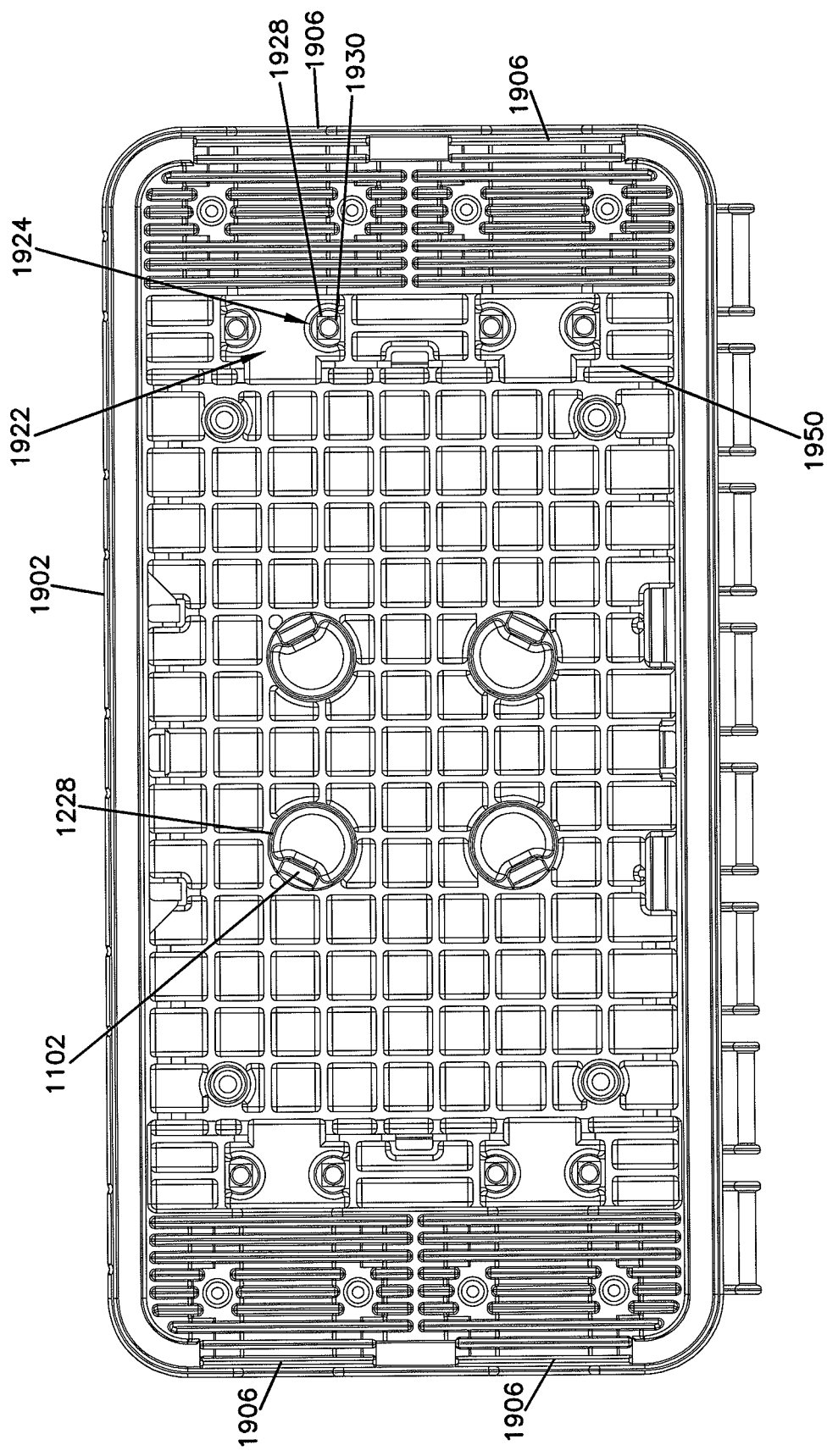
FIG. 129 is a top view of a base of the wall box of FIG. 125.

Referring now to FIGS. 126 and 129, the base 1902 includes cable clamping areas 1922 disposed adjacent to the cable openings 1906. Each cable clamping area 1922 includes recess 1924 adapted to receive a fastener 1926 (shown in FIGS. 130 and 131). In the subject embodiment, the recess 1924 includes a first portion 1928 that is generally cylindrical in shape and a second portion 1930. In the subject embodiment, the second portion 1930 includes sides that are not equidistant from the center of the second portion 1930.

Referring now to FIGS. 126, 130 and 131, the fastener 1926 is shown. The fastener 1926 includes a first axial end portion 1932 and a second axial end portion 1934. The first axial end portion 1932 includes a first retention portion 1936 and a second retention portion 1938.

The first retention portion 1936 is generally cylindrical in shape and is sized such that the outer diameter is slightly larger than the inner diameter of the first portion 1928 of the recess 1924. In the subject embodiment, an outer surface of the first retention portion 1936 is texturized (e.g., knurled, etc.). The slightly larger outer diameter and the texturization of the outer surface of the first retention portion 1936 assists in the axial retention of the fastener 1926 in the recess 1924.

In the subject embodiment, the second retention portion 1938 includes sides having a plurality of points that are not equidistant from a center of the recess 1928. By having sides that are not equidistant from the center of the recess 1924, the second retention portion 1938 prevents the fastener 1926 from rotating about the center of the recess 1924 when installed.

In the subject embodiment, the second axial end portion 1934 is adapted for engagement with a through-hole of a cable clamping member. A plurality of threads disposed at the second axial end portion 1934 is adapted for engagement with a nut that secures the cable clamping member to the base 1902 via the fastener 1926, thereby securing or clamping the telecommunications cable 933 in the cable openings 1906.

Referring now to FIGS. 126 and 129, each of the cable clamping areas 1922 includes an end wall 1950. The end wall 1950 includes an opening through which the buffer of the termination cable 933 passes. In one embodiment, the opening is smaller than the outer diameter of the jacket of the telecommunications cable 933. By having an opening that is smaller than the outer diameter of the jacket of the telecommunications cable 933, the end wall 1950 prevents the telecommunications cable 933 from being axially displaced or pushed inside the enclosure 1901 beyond the end wall 1950.

Each of the cable clamping areas 1922 further includes a plurality of support walls 1952. The support walls 1952 prevent or reduce the risk of lateral (side-to-side) movement of the telecommunications cable 933 inside the enclosure 1901. In the subject embodiment, each of the support walls 1952 extends outwardly from the cable clamping area 1922 in a direction that is generally parallel to the end wall 1950. In the subject embodiment, the support walls 1952 are generally aligned with the recesses 1924.

Referring now to FIGS. 101-105 and 123, the base 1902 further includes a plurality of mounts 1954 adapted for engagement with pin members 1566 disposed on the tray mount 1561. With the pin members 1566 of the tray mount 1561 disposed in the mounts 1954 of the base 1902, the tray mount 1561 can pivot about an axis 1956 of the pin members 1566 between an open position (shown in FIG. 126) and a closed position (shown in FIG. 132).

Each of the mounts 1954 includes a slot 1958 (best shown in FIG. 126). With the tray mount 1561 in the open position, the pin members 1566 can be pushed into the slots 1958 until the pin members 1566 abut ends of the slots 1958. With the pin members 1566 abutting the ends of the slots 1958, an edge portion 1959 of the tray mount 1561 is disposed in the slot 1958 such that the tray mount 1561 is unable to pivot about the axis 1956 of the pin members 1566.

In one embodiment, the tray mount 1561 with the splice tray stack 1800 disposed on the top surface 1570 and the splitter tray 1592 disposed on the bottom surface 1590 of the tray mount would be pivoted about the axis 1956 of the pin members 1566 to the open position. In the open position, the splitter tray 1592 would be accessible. In order to prevent the tray mount 1561 from inadvertently being pivoted to the closed position, the pin members 1566 of the tray mount 1561 are pushed into the slot 1958 until the pin members 1566 abut the end of the slot 1958. After the splitter tray 1592 has been accessed, the tray mount 1561 can be pivoted to the closed position by pulling the tray mount 1561 in a direction such that the pin members 1566 no longer abut the ends of the slots 1958 and the edge portion 1959 is no longer disposed in the slot 1958. With the edge portion 1959 of the tray mount 1561 no longer disposed in the slot 1958, the tray mount 1561 can be pivoted to the closed position. In this closed position, each of the slice trays 1802 of the splice tray stack 1800 can be accessed.

Figure 132:
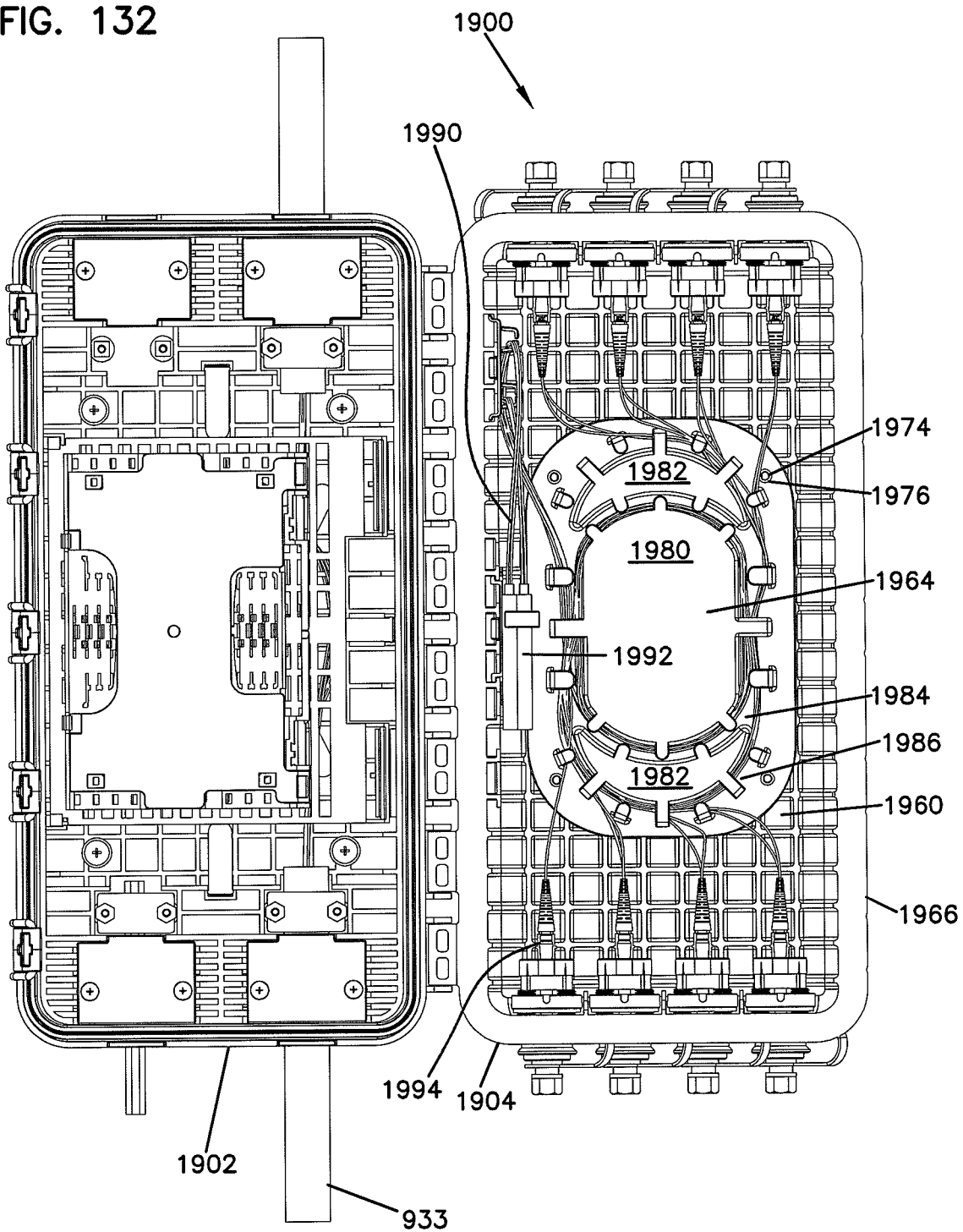
FIG. 132 is a view of an interior cavity of the wall box of FIG. 125.
Figure 133:
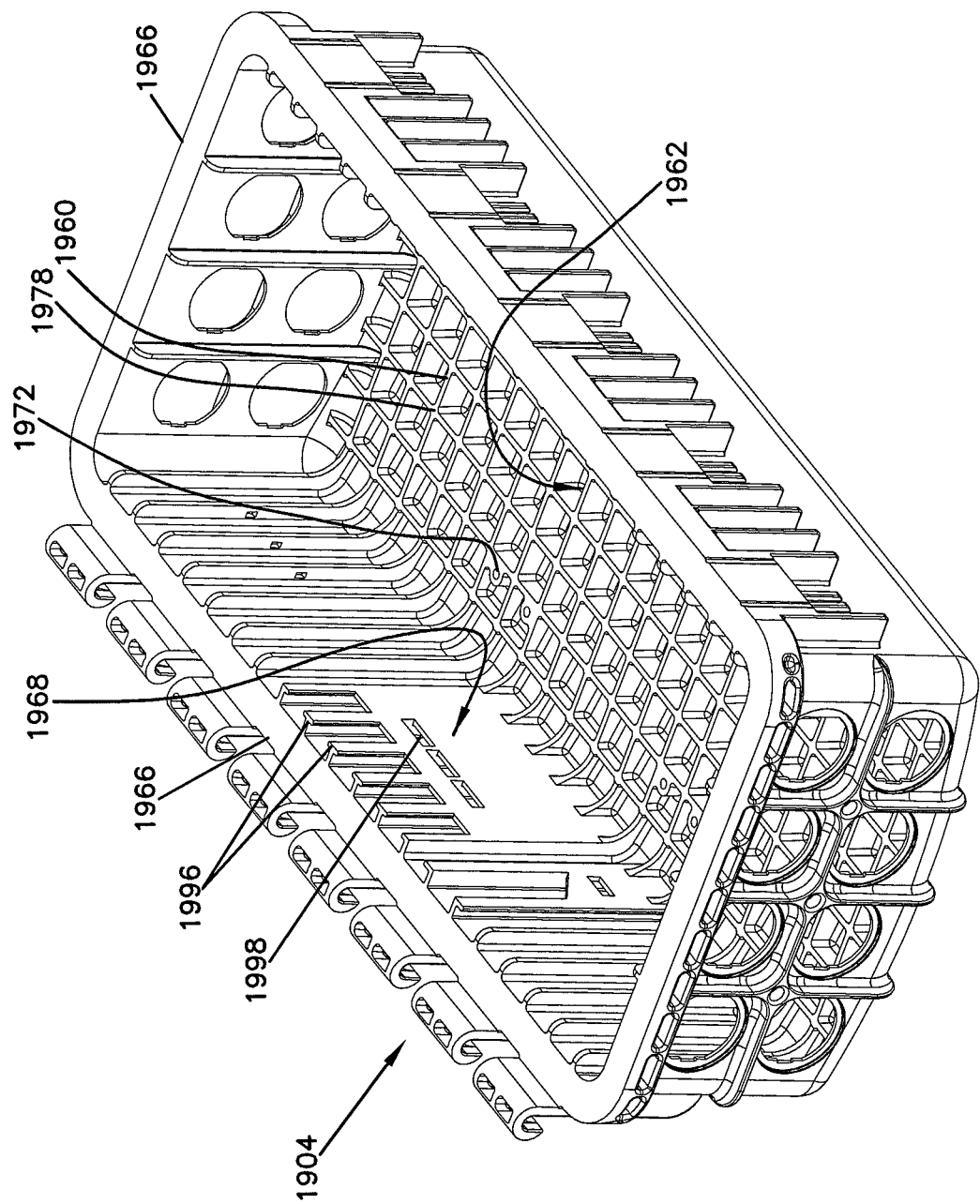
FIG. 133 is a perspective view of a cover of the wall box of FIG. 125.
Figure 135:
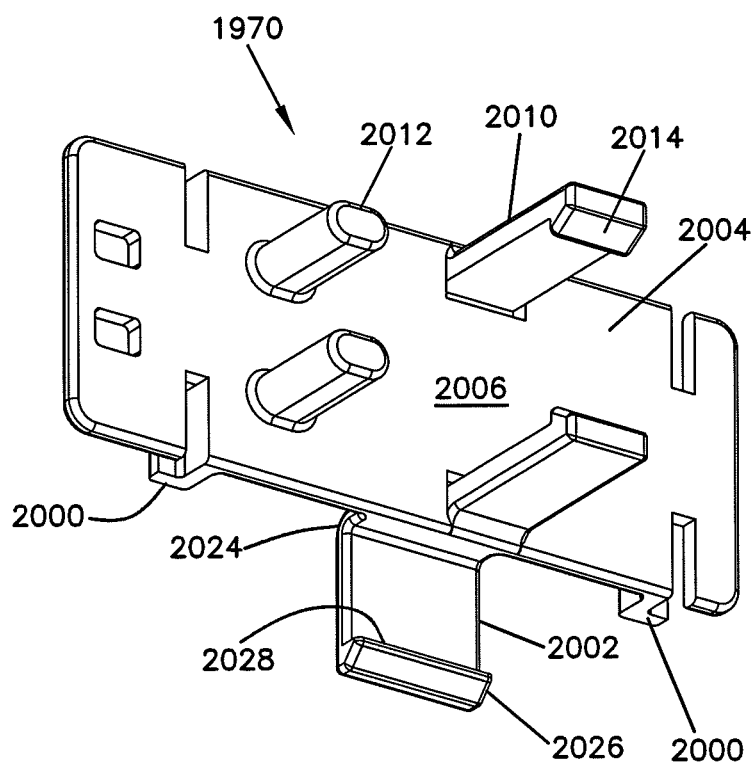
FIGS. 135-136 are various views of a fanout holder suitable for use with the wall box of FIG. 125.
Figure 136:
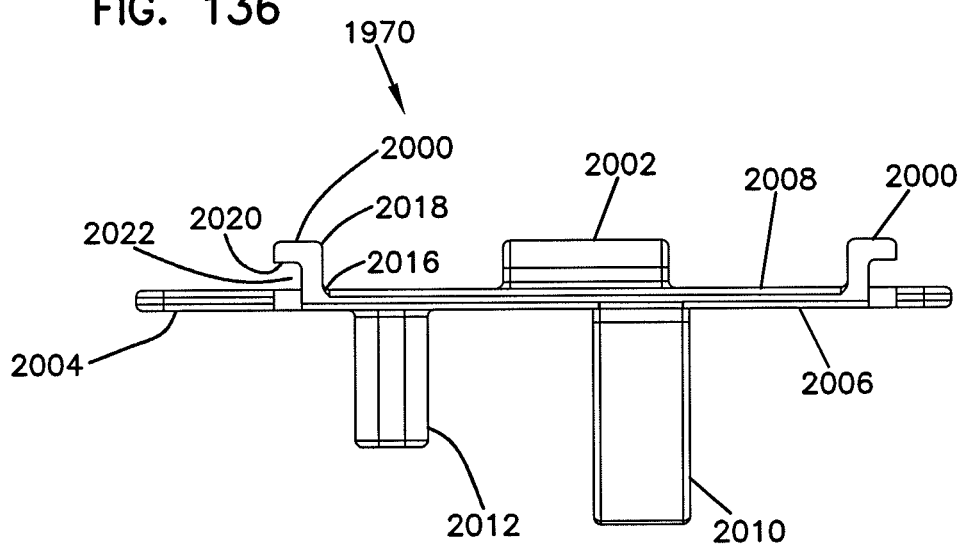

Referring now to FIGS. 126, 132 and 133, the cover 1904 includes a base wall 1960 having a cable management mounting area 1962 that is adapted for receiving a cable management tray 1964 and a plurality of sidewalls 1966 having a fanout mounting area 1968 adapted for receiving a fanout holder 1970 (shown in FIGS. 135, 136).

The cable management mounting area 1962 of the base wall 1960 includes a plurality of mounting holes 1972. The mounting holes 1972 are adapted to receive fasteners 1974 that are disposed through holes 1976 in the cable management tray 1964. In the subject embodiment, the cable management mounting area 1962 is disposed on a plurality of ridges 1978 that provide support to the base wall 1960.

Referring now to FIGS. 132 and 134, the cable management tray 1964 is shown. The cable management tray 1964 includes a center portion 1980 and a plurality of end portions 1982. In the subject embodiment, the center portion 1980 includes ends that are generally semi-circular in shape while the end portions 1982 are generally quarter-moon shaped. The center portion 1980 and the end portions 1982 cooperatively define a first fiber loop 1984 and a second fiber loop 1986. In the subject embodiment, the first fiber loop 1984 is disposed interior to the second fiber loop 1986. A plurality of retention fingers 1988 extend partially across top of the first and second fiber loops 1984, 1986. As best shown in FIG. 132, optical fibers 1990 are routed from fanouts 1992 disposed in the fanout holder 1970 to connectors 1994 disposed in the sidewalls 1966 of the cover through the first and/or second fiber loops 1984, 1986 of the cable management tray 1964.

Referring now to FIGS. 132 and 133, the fanout area 1968 on the sidewalls 1966 includes a plurality of retention ribs 1996 and at least one latch opening 1998. The retention ribs 1996 are adapted to receive retention latches 2000 on the fanout holder 1970 in a sliding engagement while the latch opening 1998 is adapted to receive a resilient latch 2002 on the fanout holder 1970 in a snap-fit engagement. Referring now to FIGS. 135 and 136, the fanout holder 1970 is shown.

In the subject embodiment, the fanout holder 1970 is adapted to receive a plurality of fanouts. In one embodiment, and by way of example only, the fanout holder 1970 is adapted to receive at least two fanouts. In another embodiment, and by way of example only, the fanout holder 1970 is adapted to receive four fanouts.

The fanout holder 1970 includes a base 2004 having a front surface 2006 and an oppositely disposed rear surface 2008. The fanout holder 1970 is adapted to retain a plurality of fanouts. In the subject embodiment, a plurality of retention members 2010 and a plurality of locators 2012 retain the plurality of fanouts to the fanout holder 1970.

The plurality of retention members 2010 extend outwardly from the front surface 2006 of the fanout holder 1970. In the subject embodiment, the retention members 2010 are adapted to capture the fanouts disposed on the fanout holder 1970. In the subject embodiment, the retention members 2010 are resilient latches having a latch end 2014 that is adapted to retain the plurality of fanouts to the holder.

In the subject embodiment, the plurality of locators 2012 extends from the front surface 2006 of the fanout holder 1970. In the subject embodiment, and by way of example only, there are two locators 2012. The locators 2012 are adapted to engage a receptacle in the fanout.

Extending from the rear surface 2008 is the plurality of retention latches 2000 and the resilient latch 2002. The retention latches 2000 include a base end 2016 that is attached to the rear surface 2008 and a free end 2018. The free end 2018 includes a lip 2020 and defines a channel 2022 between the lip 2020 and the rear surface 2008 of the fanout holder 1970. Each channel 2022 is adapted to engage one of the retention ribs 1996 of the fanout area 1968 of the cover 1904. In the subject embodiment, the engagement between the channels 2022 and the retention ribs 1996 is sliding engagement.

The resilient latch 2002 includes a base portion 2024 and a free portion 2026. The free portion 2026 includes a lip 2028 that is adapted to engage the latch opening 1998. With the retention ribs 1996 engaged in the channels 2022 of the fanout holder 1970, the fanout holder 1970 is pushed toward the base wall 1960 of the cover 1904. The fanout holder 1970 is pushed until the free portion 2026 of the resilient latch 2002 is engaged with the latch opening 1998.

Figure 137:
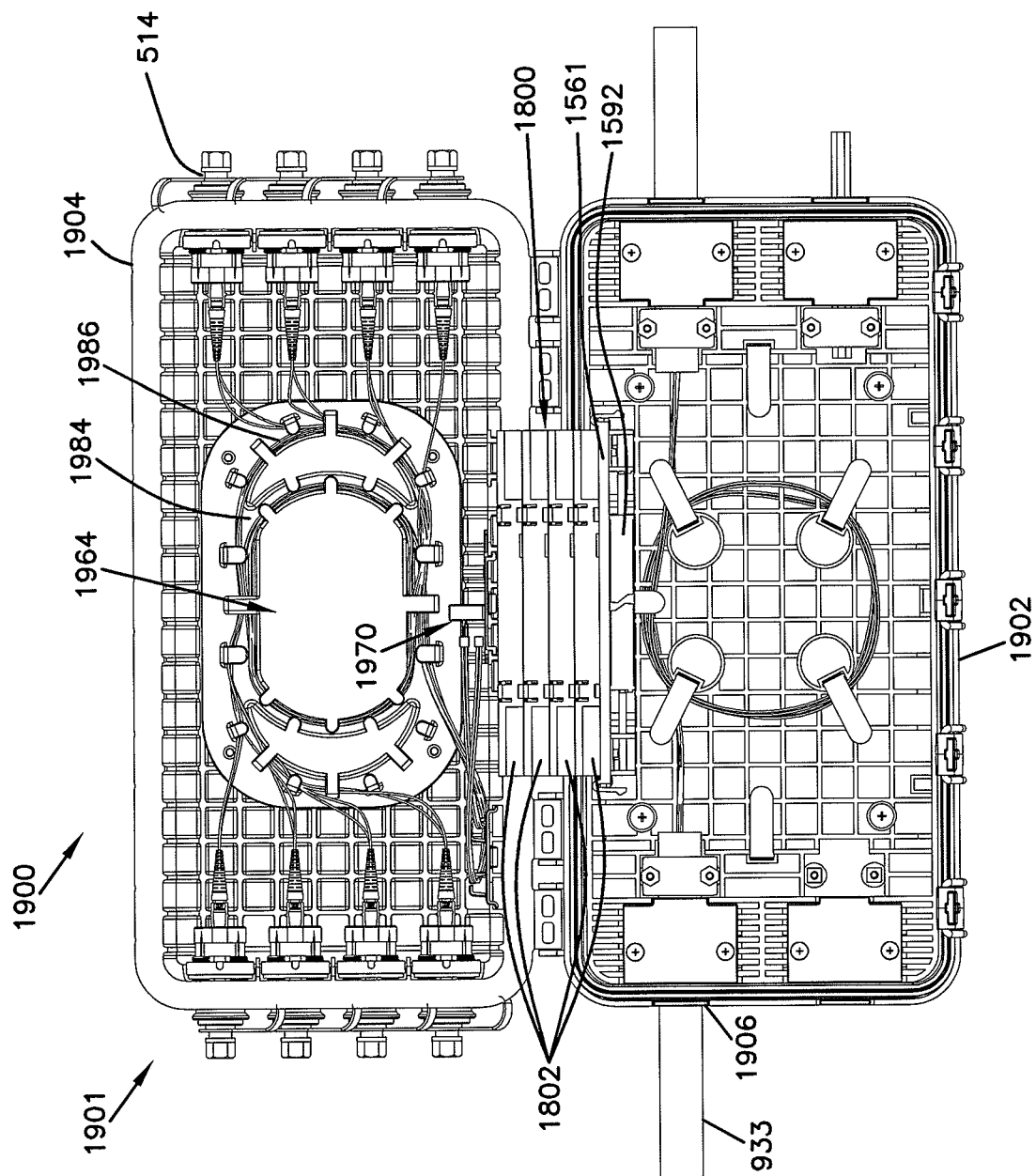
FIG. 137 is a view of the wall box of FIG. 125 showing an exemplary cable routing scheme.

Referring now to FIG. 137, an exemplary cable routing scheme will be described. The telecommunication cable 933 enters the enclosure 1901 through the cable opening 1906 in the base 1902. Optical fibers of the telecommunication cable 933 are routed to the splice trays 1802 of the tray stack 1800. In the splice tray 1802, the optical fibers are optically connected to an input fiber of the splitter. The input fiber is routed to the bottom surface 1590 of the tray mount 1561 to the splitter mounted on the splitter tray 1592.

Output fibers are routed from the splitter to the fanout mounted on the fanout holder 1970. In one embodiment, the output fibers are disposed in a ribbon cable that is disposed in a furcation tube. Upjacketed individual optical fibers having connectorized ends are then routed from the fanout to the inner ports of the fiber optic adapters 514 disposed on the cover 1904 and plugged into those inner ports. In the subject embodiment, excess optical fibers between the fanout and the inner port of the fiber optic adapters 514 are routed around the first and/or second loops 1984, 1986 of the cable management tray 1964.

The above specification provides examples of how certain aspects may be put into practice. It will be appreciated that the aspects can be practiced in other ways than those specifically shown and described herein without departing from the spirit and scope of the present disclosure.

What is claimed is:

1. A box comprising:
   an enclosure defining an interior;
   a main tray mount pivotally disposed within the interior of the enclosure, the main tray mount including a top surface and an oppositely disposed bottom surface, wherein a first splice tray mounting area is disposed on the top surface and a second splice tray mounting area is disposed on the bottom surface;

the first splice tray mounting area including a first splice tray mount that allows a plurality of trays to be pivotally mounted so as to allow each of the trays that are to be mounted to the first splice tray mount to be individually pivotable with respect to the other of the plurality of trays;

the second splice tray mounting area including a second splice tray mount that allows at least one tray to be pivotally mounted to the second splice tray mount;

a plurality of trays pivotally mounted to the first splice tray mount, each tray mounted to the first splice tray mount being individually pivotable with respect to the others of the plurality of trays disposed on the first splice tray mounting area; and at least one tray pivotally mounted to the second splice tray mount.

2. The box of claim 1, wherein the enclosure comprises a base and a cover pivotally connected to the base, wherein the base and the cover cooperate to enclose the interior defined by the enclosure.

3. The box of claim 1, wherein the box comprises a wall box configured to be mounted at a mid-span location along a length of a fiber optic telecommunications cable.

4. The box of claim 1, wherein the second splice tray mount is configured such that the second splice tray mount allows a plurality of trays to be pivotally mounted so as to allow each of the trays that are to be mounted to the second splice tray mount to be individually pivotable with respect to the other of the plurality of trays.

5. The box of claim 2, wherein the main tray mount is pivotally connected to the cover of the enclosure.

6. The box of claim 1, wherein at least one of the trays disposed in the first splice tray mounting area is a splice tray.

7. The box of claim 6, wherein the splice tray includes two splice mounting locations.

8. The box of claim 7, wherein a fiber storage region is disposed between the two splice mounting locations.

9. The box of claim 8, wherein the fiber storage region includes two spaced apart half spools about which excess fiber can be spooled.

10. The box of claim 9, wherein the fiber storage region includes two full spools positioned in an area defined between the two half spools.

11. The box of claim 1, wherein the at least one tray disposed in the second splice tray mounting area is a splitter tray having a splitter mounted thereon.

12. The box of claim 1, wherein the first splice tray mount defines a plurality of hinge receivers each configured for receiving a hinge of a tray.

13. The box of claim 1, wherein the second splice tray mount defines at least one hinge receiver configured for receiving a hinge of a tray.

14. The box of claim 13, wherein the second splice tray mount defines a plurality of hinge receivers each configured for receiving a hinge of a tray.

* * * * *